(12) United States Patent
Pednault et al.

(10) Patent No.: US 8,392,153 B2
(45) Date of Patent: Mar. 5, 2013

(54) METHOD FOR CONSTRUCTING SEGMENTATION-BASED PREDICTIVE MODELS

(75) Inventors: Edwin Peter Dawson Pednault, Cortlandt Manor, NY (US); Ramesh Natarajan, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 12/204,670

(22) Filed: Sep. 4, 2008

(65) Prior Publication Data

US 2009/0030864 A1 Jan. 29, 2009

Related U.S. Application Data

(63) Continuation of application No. 10/096,474, filed on Mar. 11, 2002, now Pat. No. 7,451,065.

(51) Int. Cl.
*G06F 7/60* (2006.01)
*G06F 17/10* (2006.01)

(52) U.S. Cl. .......................................................... 703/2

(58) Field of Classification Search ........ 703/2; 706/12, 706/15, 45; 707/101, 103 R
See application file for complete search history.

(56) References Cited

U.S. PATENT DOCUMENTS

| | | | |
|---|---|---|---|
| 4,866,645 A * | 9/1989 | Lish | 706/38 |
| 5,371,809 A * | 12/1994 | Desieno | 382/159 |
| 5,684,929 A * | 11/1997 | Cortes et al. | 706/25 |
| 6,026,397 A | 2/2000 | Sheppard | |
| 6,112,126 A * | 8/2000 | Hales et al. | 700/29 |
| 6,430,539 B1 | 8/2002 | Lazarus et al. | |
| 6,542,894 B1 * | 4/2003 | Lee et al. | 707/101 |
| 6,662,158 B1 | 12/2003 | Hon et al. | |
| 6,810,368 B1 | 10/2004 | Pednault | |
| 6,839,682 B1 | 1/2005 | Blume et al. | |
| 6,907,591 B1 | 6/2005 | Teig et al. | |
| 2002/0133320 A1 | 9/2002 | Wegerich et al. | |
| 2003/0009467 A1 | 1/2003 | Perrizo | |
| 2003/0018601 A1 | 1/2003 | Lee et al. | |
| 2003/0068610 A1 | 4/2003 | Rzhetsky et al. | |
| 2003/0077586 A1 | 4/2003 | Pavlovic et al. | |

* cited by examiner

*Primary Examiner* — Kandasamy Thangavelu
*Assistant Examiner* — Luke Osborne
(74) *Attorney, Agent, or Firm* — Daniel P. Morris; McGinn IP Law Group, PLLC

(57) ABSTRACT

The present invention generally relates to computer databases and, more particularly, to data mining and knowledge discovery. The invention specifically relates to a method for constructing segmentation-based predictive models, such as decision-tree classifiers, wherein data records are partitioned into a plurality of segments and separate predictive models are constructed for each segment. The present invention contemplates a computerized method for automatically building segmentation-based predictive models that substantially improves upon the modeling capabilities of decision trees and related technologies, and that automatically produces models that are competitive with, if not better than, those produced by data analysts and applied statisticians using traditional, labor-intensive statistical techniques. The invention achieves these properties by performing segmentation and multivariate statistical modeling within each segment simultaneously. Segments are constructed so as to maximize the accuracies of the predictive models within each segment. Simultaneously, the multivariate statistical models within each segment are refined so as to maximize their respective predictive accuracies.

15 Claims, 39 Drawing Sheets

METHOD FOR CONSTRUCTING SEGMENTATION-BASED PREDICTIVE MODELS

This application is a continuation application of U.S. patent application Ser. No. 10/096,474, filed on Mar. 11, 2002, now U.S. Pat. No. 7,451,065, issued on Nov. 11, 2008.

BACKGROUND OF THE INVENTION

1. Field of the Invention

The present invention generally relates to computer databases and, more particularly, to data mining and knowledge discovery. The invention specifically relates to a method for constructing segmentation-based predictive models, such as decision-tree classifiers, wherein data records are partitioned into a plurality of segments and separate predictive models are constructed for each segment.

2. Background Description

Data mining is emerging as a highly advantageous application of computer databases that addresses the problem of extracting useful information from large volumes of data. As Matheus, Chan, and Piatetsky-Shapiro point out (see C. J. Matheus, P. K. Chan, and G. Piatetsky-Shapiro, "Systems for knowledge discovery in databases," *IEEE Transactions on Knowledge and Data Engineering*, Special Issue on Learning and Discovery in Knowledge-Based Databases, Vol. 5, No. 6, pp. 903-913, December 1993):

> "The corporate, governmental, and scientific communities are being overwhelmed with an influx of data that is routinely stored in on-line databases. Analyzing this data and extracting meaningful patterns in a timely fashion is intractable without computer assistance and powerful analytical tools. Standard computer-based statistical and analytical packages alone, however, are of limited benefit without the guidance of trained statisticians to apply them correctly and domain experts to filter and interpret the results. The grand challenge of knowledge discovery in databases is to automatically process large quantities of raw data, identify the most significant and meaningful patterns, and present these as knowledge appropriate for achieving the user's goals."

Because the data-mining/knowledge-discovery problem is broad in scope, any technology developed to address this problem should ideally be generic in nature, and not specific to particular applications. In other words, one should ideally be able to supply a computer program embodying the technology with application-specific data, and the program should then identify the most significant and meaningful patterns with respect to that data, without having to also inform the program about the nuances of the intended application. Creating widely applicable, application-independent data-mining technology is therefore an explicit design objective for enhancing the usefulness of the technology. It is likewise a design objective of database technology in general.

Predictive modeling is an area of data mining and knowledge discovery that is specifically directed toward automatically extracting data patterns that have predictive value. In this regard, it should be discerned that constructing accurate predictive models is a significant problem in many industries that employ predictive modeling in their operations.

For example, predictive models are often used for direct-mail targeted-marketing purposes in industries that sell directly to consumers. The models are used to optimize return on marketing investment by ranking consumers according to their predicted responses to promotions, and then mailing promotional materials only to those consumers who are most likely to respond and generate revenue.

The credit industry uses predictive modeling to predict the probability that a consumer or business will default on a loan or a line of credit of a given size based on what is known about that consumer or business. The models are then used as a basis for deciding whether to grant (or continue granting) loans or lines of credit, and for setting maximum approved loan amounts or credit limits.

Insurance companies use predictive modeling to predict the frequency with which a consumer or business will file insurance claims and the average loss amount per claim. The models are then used to set insurance premiums and to set underwriting rules for different categories of insurance coverage.

On the Internet, predictive modeling is used by ad servers to predict the probability that a user will click-through on an advertisement based on what is known about the user and the nature of the ad. The models are used to select the best ad to serve to each individual user on each Web page visited in order to maximize click-though and eventual conversion of user interest into actual sales.

The above applications are but a few of the innumerable commercial applications of predictive modeling. In all such applications, the higher the accuracy of the predictive models, the greater are the financial rewards.

The development of application-independent predictive modeling technology is made feasible by the fact that the inputs to a predictive model (i.e., the explanatory data fields) can be represented as columns in a database table or view. The output(s) of a predictive model can likewise be represented as one or more columns.

To automatically construct a predictive model, one must first prepare a table or view of training data comprising one or more columns of explanatory data fields together with one or more columns of data values to be predicted (i.e., target data fields). A suitable process must then be applied to this table or view of training data to generate predictive models that map values of the explanatory data fields into values of the target data fields. Once generated, a predictive model can then be applied to rows of another database table or view for which the values of the target data fields are unknown, and the resulting predicted values can then be used as basis for decision making.

Thus, a process for constructing a predictive model is essentially a type of database query that produces as output a specification of a desired data transformation (i.e., a predictive model) that can then be applied in subsequent database queries to generate predictions.

To make predictive modeling technology readily available to database applications developers, extensions to the SQL database query language are being jointly developed by the International Organization for Standardization (ISO) and the International Electrotechnical Commission (IEC) to support the construction and application of predictive models within database systems (see, for example, ISO/IEC FCD 13249-6: 200x(E), "Information technology—Database languages—SQL Multimedia and Application Packages—Part 6: Data Mining," Document Reference Number ISO/IEC JTC 1/SC 32N0647, May 21, 2001, D9C73B3214960D5988256A530060C50C/$FILE/32N0647T.PDF; for an overview see J. Melton and A. Eisenberg, "SQL Multimedia and Application Packages (SQL/MM)," SIGMOD Record, Vol. 30, No. 4, pp. 97-102, 2001. This ISO/IEC standard aims to provide SQL structured types and associated functions for creating data mining task specifications, executing data mining tasks, querying data mining results, and, in cases where the results are predictive models, applying data mining results to row data to generate predictions. For example, the standard requires that both data mining task specifications and data mining results be stored as Character Large Objects (CLOBs). The standard likewise specifies sets of functions to be used for manipulating these database objects. By providing a standard application programming interface (API) for utilizing data mining technology with database systems, the standard is expected to promote wide use of data mining technology by enabling database application developers to readily apply such technology in business applications simply by writing SQL queries. In so doing, the standard effectively makes data mining a component technology of database systems.

Many methods are known for automatically constructing predictive models based on training data. It should be discerned that segmentation-based models afford the flexibility needed to attain high levels of predictive accuracy, and that previously unknown and potentially useful information about a company's operations and customer base can be extracted from corporate databases by first constructing segmentation-based predictive models from the data and then examining those models in detail to identify previously unknown facts.

An example of a segmentation-based predictive model is a decision tree classifier. Well-known procedures exist for constructing such models. The usual method is summarized as follows by Quinlan (see J. R. Quinlan, "Unknown attribute values in induction," *Proceedings of the Sixth International Machine Learning Workshop*, pp 164-168, Morgan Kaufmann Publishers, 1989):

"The 'standard' technique for constructing a decision tree classifier from a training set of cases with known classes, each described in terms of fixed attributes, can be summarized as follows:
  If all training cases belong to a single class, the tree is a leaf labeled with that class.
  Otherwise,
    select a test, based on one attribute, with mutually exclusive outcomes;
    divide the training set into subsets, each corresponding to one outcome; and
    apply the same procedure to each subset."

Details on the individual method steps can be found, for example, in the on-line statistics textbook provided over the Internet as a public service by StatSoft, Inc. Note that each subset of data mentioned in the above method steps is called a segment in the terminology employed herein.

Decision trees provide a convenient example of the flexibility and interpretability of segmentation-based predictive models. Table 1 below shows the data definition for a data set commonly known within the predictive modeling community as the "Boston Housing" data (D. Harrison and D. L. Rubinfield, "Hedonic prices and the demand for clean air," *Journal of Environmental Economics and Management*, Vol. 5, pp 81-102, 1978). Table 2 below shows twelve of the rows from this data set. A complete copy of the data set can be obtained over the Internet from the UCI Machine Learning Repository.

TABLE 1

Data definition for the Boston Housing data set. Data fields have been assigned more intuitive names. The original names appear in the "a.k.a." column.

| Data Field | a.k.a. | Description |
| --- | --- | --- |
| PRICE | MEDV | Median value of owner-occupied homes (recoded into equiprobable HIGH, MEDIUM, and LOW ranges) |

TABLE 1-continued

Data definition for the Boston Housing data set. Data fields have been assigned more intuitive names. The original names appear in the "a.k.a." column.

| Data Field | a.k.a. | Description |
| --- | --- | --- |
| ON_RIVER | CHAS | Charles River indicator (value is 1 if tract bounds Charles River; else 0) |
| CRIME_RT | CRIM | Per capita crime rate by town |
| % BIGLOTS | ZN | Percentage of residential land zoned for lots over 25,000 square feet |
| % INDUSTY | INDUS | Percentage of non-retail business acres per town |
| NOXLEVEL | NOX | Concentration of nitric oxides (recoded into equiprobable high, medium, and low ranges) |
| AVGNUMRM | RM | Average number of rooms per dwelling |
| % OLDBLDG | AGE | Percentage of owner-occupied units built prior to 1940 |
| DIST2WRK | DIS | Weighted distances to five Boston employment centers |
| HWYACCES | RAD | Index of accessibility to radial highways |
| TAX_RATE | TAX | Full-valued property tax rate per $10,000 |
| CLASSIZE | PTRATIO | Pupil-teacher ratio by town |
| % LOWINCM | LSTAT | Percent lower status of the population |

TABLE 2

Twelve sample records from the Boston Housing data set.

| | PRICE | ON_RIVER | CRIME_RT | % BIGLOTS | % INDUSTY |
| --- | --- | --- | --- | --- | --- |
| 1 | HIGH | 0 | 0.006 | 18.00 | 2.31 |
| 2 | MEDIUM | 0 | 0.027 | 0.00 | 7.07 |
| 3 | HIGH | 0 | 0.032 | 0.00 | 2.18 |
| 4 | MEDIUM | 0 | 0.088 | 12.50 | 7.87 |
| 5 | LOW | 0 | 0.211 | 12.50 | 7.87 |
| 6 | MEDIUM | 0 | 0.630 | 0.00 | 8.14 |
| 7 | MEDIUM | 0 | 0.154 | 25.00 | 5.13 |
| 8 | MEDIUM | 0 | 0.101 | 0.00 | 10.01 |
| 9 | LOW | 0 | 0.259 | 0.00 | 21.89 |
| 10 | LOW | 1 | 3.321 | 0.00 | 19.58 |
| 11 | LOW | 0 | 0.206 | 22.00 | 5.86 |
| 12 | LOW | 1 | 8.983 | 0.00 | 18.10 |

| | NOXLEVEL | AVGNUMRM | % OLDBLDG | DIST2WRK |
| --- | --- | --- | --- | --- |
| 1 | medium | 6.58 | 65.20 | 4.09 |
| 2 | low | 6.42 | 78.90 | 4.97 |
| 3 | low | 7.00 | 45.80 | 6.06 |
| 4 | medium | 6.01 | 66.60 | 5.56 |
| 5 | medium | 5.63 | 100.00 | 6.08 |
| 6 | medium | 5.95 | 61.80 | 4.71 |
| 7 | low | 6.14 | 29.20 | 7.82 |
| 8 | medium | 6.71 | 81.60 | 2.68 |
| 9 | high | 5.69 | 96.00 | 1.79 |
| 10 | high | 5.40 | 100.00 | 1.32 |
| 11 | low | 5.59 | 76.50 | 7.96 |
| 12 | high | 6.21 | 97.40 | 2.12 |

| | HWYACCES | TAX_RATE | CLASSIZE | % LOWINCM |
| --- | --- | --- | --- | --- |
| 1 | 1 | 296 | 15.30 | 4.98 |
| 2 | 2 | 242 | 17.80 | 9.14 |
| 3 | 3 | 222 | 18.70 | 2.94 |
| 4 | 5 | 311 | 15.20 | 12.43 |
| 5 | 5 | 311 | 15.20 | 29.93 |
| 6 | 4 | 307 | 21.00 | 8.26 |
| 7 | 8 | 284 | 19.70 | 6.86 |
| 8 | 6 | 432 | 17.80 | 10.16 |
| 9 | 4 | 437 | 21.20 | 17.19 |
| 10 | 5 | 403 | 14.70 | 26.82 |
| 11 | 7 | 330 | 19.10 | 12.50 |
| 12 | 24 | 666 | 20.20 | 17.60 |

Harrison and Rubinfield collected and analyzed these data to determine whether air pollution had any effect on house values within the greater Boston area. One approach to addressing this question is to build a model that predicts house price as a function of air pollution and other factors that could potentially affect house prices.

FIG. 1 shows a decision tree generated from the Boston Housing data using the CART algorithm (L. Breiman, J. H. Friedman, R. A. Olshen, and C. J. Stone, *Classification and Regression Trees*, New York: Chapman & Hall, 1984) as implemented in STATISTICA for Windows (*STATISTICA for Windows [Computer program manual]*, Version 5.5, 1995, StatSoft, Inc., 2300 East 14th Street, Tulsa, Okla., 74104-4442). The STATISTICA program was told to construct a decision tree model that predicts PRICE (i.e., the median value of owner-occupied homes broken down into high, medium, and low ranges) using all of the other columns in the data table as potential inputs to the model (i.e., as explanatory data fields).

Each node 1 through 13 in the tree shown in FIG. 1 corresponds to a data segment (i.e., a subset of the data). Illustrated at each node are histograms of the proportions of high-, medium-, and low-priced neighborhoods that belong to the corresponding data segments. The price range that corresponds to each histogram bar is indicated by legend 14. Each node in FIG. 1 is also labeled with the dominant price range within the corresponding segment (i.e., the price range that has the largest histogram bar). Thus, for node 1, the dominant price range is medium, whereas for nodes 2 and 3 the dominant price ranges are high and low, respectively.

Tree branches correspond to tests on the values of the inputs to the predictive model and it is these tests that define the data segments that correspond to each node in the tree. For example, in FIG. 1, node 1 is the root of the tree and it corresponds to the entire set of data. Test 15 (i.e., % LOWINCM$\leq$14.4) defines the data segments that correspond to nodes 2 and 3. Left-going branches in FIG. 1 are followed when the outcome of the corresponding test is "yes" or "true;" right-going branches are followed when the outcome of the test is "no" or "false." Thus, node 2 corresponds to the subset of data for which % LOWINCM is less than or equal to 14.4, and node 3 corresponds to the subset of data for which % LOWINCM is greater than 14.4. Similarly, node 4 corresponds to the subset of data for which % LOWINCM is less than or equal to 14.4 and AVGNUMRM is less than or equal to 6.527, and so on.

The leaves of the tree (i.e., nodes 4, 5, 7, 8, 10, 12, and 13) correspond to the subsets of data that are used to make predictions in the decision tree model. In this example, the predictions are the dominant price ranges at the leaves of the tree. Thus, at node 4 the prediction would be "medium," at node it would be "high," at node 7 it would be "low," etc.

FIG. 1 demonstrates the ability of decision tree programs to automatically extract meaningful patterns from collections of data. As the tree model indicates, air pollution does have an effect on house prices, but only for neighborhoods that have a sufficiently large percentage of low-income housing. For all other neighborhoods, house prices are primarily affected by the size of the house, as indicated by the average number of rooms per house in the neighborhood. When air pollution is a factor, but the air pollution level is sufficiently small, then the next most predictive factors that affect house prices are crime rate, the percentage of non-retail industrial land, and the distance to a major center of employment, with the more desirable (i.e., higher-priced) neighborhoods being those with low crime rates (i.e., node 8) and those with sufficiently large percentages of non-retail industrial land located away from centers of employment (i.e., node 13).

To demonstrate that decision tree algorithms are not application-specific, but can be applied to any application simply by providing application-specific data as input, the STATISTICA program was executed again, but this time it was told to predict the air pollution level (i.e., NOXLEVEL) using all of the other data columns as explanatory variables, including PRICE. FIG. 2 shows the resulting tree model. As this tree illustrates, the majority of neighborhoods that have the highest levels of air pollution (i.e., node 28) are those with sufficiently large percentages of non-retail industrial land, sufficiently large percentages of older buildings, and sufficiently high tax rates. Not surprisingly, these factors characterize downtown Boston and its immediate vicinity. The majority of neighborhoods that have the lowest levels of air pollution (i.e., node 26) are those with sufficiently small percentages of non-retail industrial land, sufficiently large percentages of houses on large lots, and that are sufficiently far from centers of employment. These characteristics are typical of outlying suburbs. The majority of neighborhoods that have moderate levels of air pollution (i.e., node 29) are those with sufficiently small percentages of non-retail industrial land, sufficiently small percentages of houses on large lots, and easy access to radial highways that lead into Boston. These characteristics are typical of urban residential neighborhoods favored by commuters.

For both FIGS. 1 and 2, the relationships described above make intuitive sense once the tree models are examined in detail. However, it is important to keep in mind that the STATISTICA program itself has no knowledge of these intuitions nor of the source of data. The program is merely analyzing the data to identify patterns that have predictive value.

Nevertheless, the program produces meaningful results. The decision tree models that are produced as output are useful, concrete, and tangible results that have specific meaning with respect to the input data and the user-specified modeling objectives (i.e., which data field to predict in terms of which other data fields). From a database perspective, the specification of the input data and the modeling objectives constitutes a query, and the decision tree model that is produced as output constitutes a query result.

The usefulness of decision tree algorithms, in particular, and automated predictive modeling technology, in general, derives from the fact that they can perform their analyses automatically without human intervention, and without being told what kinds of relationships to look for. All that they need to be told is which data values are to be predicted, and which data values can be used as inputs to make those predictions. The generic nature of such technology makes the technology extremely useful for the purpose of knowledge discovery in databases. Moreover, it is the generic nature of predictive modeling technology that permits the technology to be incorporated into general-purpose database systems.

Note that, once a decision tree has been constructed—or, for that matter, once any type of predictive model has been constructed—the step of applying that model to generate predictions for an intended application is conventional, obvious, and noninventive to those skilled in the art of predictive modeling.

Although decision tree methods yield models that can be interpreted and understood for the purposes of knowledge discovery, the predictive accuracy of decision tree models can be significantly lower than the predictive accuracies that can be obtained using other modeling methods. This lower accuracy stems from the fact that decision trees are piecewise-constant models; that is, within each data segment defined by the leaves of the tree, the predictions produced by the model are the same for all members of that segment. FIG. 3 illustrates this effect in the case of regression trees, which are decision trees used to predict numerical values instead of categorical values. As FIG. 3 indicates, the output 39 of a piecewise-constant model (such as one produced by conventional decision tree algorithms) is stair-like in nature and is therefore inherently inaccurate when used to model data 38 that exhibits smooth variations in values relative to the inputs of the model.

Data analysts and applied statisticians have long realized this deficiency of decision tree methods and have typically employed such methods only as exploratory tools to "get a feel" for the data prior to constructing more traditional statistical models. In this use of decision tree methods, the resulting decision trees are analyzed to identify predictive explanatory variables that should considered for inclusion in the final model. Decision trees are also analyzed to identify potential interaction terms (i.e., arithmetic products of explanatory variables) to include in the final model, as well as potential nonlinear transformations that should be performed on the explanatory variables prior to their inclusion in the final model.

In many cases, the models that are produced using the above statistical methodology are, in fact, segmentation-based models, wherein the data are partitioned into pluralities of segments and separate predictive models are constructed for each segment. Such models are analogous to decision trees; however, unlike traditional decision tree, the predictive models associated with the data segments can be multivariate statistical models.

One popular approach for producing segmentation-based models using statistical methodologies involves first segmenting the data using statistical clustering techniques (see, for example, J. A. Hartigan, *Clustering Algorithms*, John Wiley and Sons, 1975; A. D. Gordon, "A review of hierarchical classification," *Journal of the Royal Statistical Society, Series A*, Vol. 150, pp. 119-137, 1987; and J. D. Banfield and A. E. Raftery, "Model-based Gaussian and non-Gaussian clustering," *Biometrics*, Vol. 49, pp. 803-821, 1993). Once the data has been segmented, separate multiple regression models are then constructed for each segment. The deficiency of this approach is that the clustering techniques that are typically employed are unsupervised. Specifically, such clustering techniques are concerned with grouping data based on spatial density, spatial proximity, or other similar criteria; they are not concerned with the effects that alternative segmentations have on the predictive accuracies of the models that will later be constructed for each segment. Because of this deficiency, there is no guarantee that the segmentation obtained will be advantageous for predictive modeling purposes.

SUMMARY OF THE INVENTION

The present invention contemplates a computerized method for automatically building segmentation-based predictive models that substantially improves upon the modeling capabilities of decision trees and related technologies, and that automatically produces models that are competitive with, if not better than, those produced by data analysts and applied statisticians using traditional, labor-intensive statistical techniques.

The invention achieves these properties by performing segmentation and multivariate statistical modeling within each segment simultaneously. Segments are constructed so as to maximize the accuracies of the predictive models within each segment. Simultaneously, the multivariate statistical models within each segment (i.e., the segment models) are refined so as to maximize their respective predictive accuracies. To prevent overfitting, which results in inaccurate predictions on future (i.e., unseen) data, an optimization is performed to strike the right balance between, on the one hand, the number of segments that appear in the final model and, on the other hand, the degrees of freedom of the multivariate segment models (i.e., choices in the number of input variables, transformations of the input variables, etc., made during the construction of the segment models that affect the degree with which the segment models could potentially overfit the training data).

Thus, in a first aspect, the present invention discloses a process performed on a computer for constructing segmentation-based predictive models, the method steps comprising:
1) accessing a collection of training data records comprising examples of input values that are available to the segmentation-based predictive model together with corresponding desired output value(s) that the segmentation-based predictive model is intended to predict;
2) generating a plurality of data segments defined by tests on some, all, or none of the available inputs, and generating one or more segment models for each generated data segment, the generation method comprising the steps of
   a) for at least one generated data segment in the final plurality, generating a plurality of candidate data segments and associated segments models wherein at least one segment model for at least one candidate data segment is a multivariate segment model, and
   b) selecting from among the plurality of candidate data segments for that generated data segment a best candidate data segment that optimizes a degree of fit measure based on one or more of the multivariate statistical models generated for the selected candidate data segment;

and
3) pruning the plurality of generated data segments and associated segment models by selecting a subset of generated data segments, together with one generated segment model for each data segment selected, so as to optimize the predictive accuracy of the resulting segmentation-based predictive model.

As a matter of terminology, a multivariate segment model in the above description refers to a segment model whose output(s) depend(s) on two or more of the explanatory data fields that are available as potential inputs to the segmentation-based predictive model.

Method Steps 2 and 3 are important features of the above process. Although methods are known for automatically constructing segmentation-based predictive models in which the segment models can be multivariate statistical models, many of these methods fix which of the available inputs are used in the segment models; thus, all segment models utilize the same inputs (see, for example, R. A. Bottenberg and R. E. Christal, "An iterative technique for clustering criteria which retains optimum predictive efficiency," DTIC Document AD261615, National Technical Information Service, Springfield, Va., 1961, a paper of the same title is also published in *The Journal of Experimental Education*, Vol. 36, pp. 28-34, 1968; J. H. Ward, "Hierarchical grouping to optimize an objective function," *Journal of the American Statistical Association*, Vol. 58, pp. 236-244, 1963; J-M. Beaulieu and M. Goldberg, "Hierarchy in picture segmentation: a stepwise optimization approach," *IEEE Transactions on Pattern Analysis and Machine Intelligence*, Vol. 11, pp. 150-163, 1989; G. Healey, "Hierarchical segmentation-based approach to motion analysis," *Image and Vision Computing*, Vol. 11, pp. 570-576, 1993; P. Chaudhuri, M.-C. Huang, W.-Y. Loh, and R. Yao, "Piecewise-polynomial regression trees" *Statistica Sinica*, vol. 4, pp. 143-167, 1994; R. Kohavi, "Scaling up the accuracy of naïve Bayes classifiers: a decision-tree hybrid," *Proc. 2nd International Conference on Knowledge Discovery and Data Mining*, pp. 202-207, 1996; A. Karalic, I. Bratko, "First order regression," *Machine Learning*, Vol. 26, pp. 147-176, 1997).

Other known methods allow different segment models to employ different inputs, but they restrict the segment models to employ only a single input (see, for example, W. P. Alexander and S. D. Grimshaw, "Treed regression," *Journal of Computational and Graphical Statistics*, Vol. 5, pp. 156-175, 1996). The segment models are thus at most univariate, not multivariate.

Still other known methods allow different multivariate segment models to employ different inputs, but they do not use multivariate segment models to select among candidate data segments, as is done in Method Steps 2a and 2b of the above novel process (see, for example, J. R. Quinlan, "Learning with continuous classes," *5th Australian Joint Conference on Artificial Intelligence*, World Scientific Press, Singapore, pp. 343-348, 1992). Instead, constant models (i.e., models with no inputs) are used to select among candidate data segments during segment generation. Multivariate segment models are then constructed for the generated data segments only after the selection among candidate data segments has been completed. By contrast, Method Steps 2a and 2b of the above novel process construct multivariate segment models for candidate data segments in order to provide a superior basis for comparisons among candidate data segments. Segment generation and multivariate statistical modeling within each segment are thus performed simultaneously, thereby increasing the predictive accuracy of the overall segmentation-based model.

The above novel process also allows the degrees of freedom of the segment models to vary in ways other than simply varying the number of inputs to these models. As a matter of terminology, models that differ in their degrees of freedom are considered to be different models, even though each may belong to the same class of models (e.g., linear regression models). Thus, when varying the degrees of freedom of a model within a data segment, one (implicitly or explicitly) constructs a plurality of segment models. Differences in degrees of freedom may arise when different numbers of explanatory variables are incorporated into models, or when different regularization parameters are used when estimating model parameters (e.g., as in the case of ridge regression; see, for example, N. R. Draper and H. Smith, *Applied Regression Analysis*, John Wiley & Sons, 1998), or when other model variations are considered that affect the degree to which overfitting can occur (e.g., as measured in terms of VC-dimension, Pollard pseudo-dimension, or related measurements; see, for example, V. N. Vapnik, *Statistical Learning Theory*, John Wiley & Sons, 1998; L. Devroye, L. Gyorfi, and G. Lugosi, *A Probabilistic Theory of Pattern Recognition*, Springer-Verlag, 1996).

As Alexander and Grimshaw point out (see W. P. Alexander and S. D. Grimshaw, 1996 cited above), varying the degrees of freedom of segment models poses many technical challenges:

"One could also consider performing a variable selection for the linear models or more general leaf regression models like polynomials. However, the computational burden involved is overwhelming for current resources. To be feasible, the number of candidate models must be limited in some fashion. Also, issues such as collinearity, model interpretability, and over-parameterization become increasingly critical as leaf models grow in complexity."

In its generalized expression, the above novel process according to the invention overcomes the difficulties identified by Alexander and Grimshaw by carefully structuring the search space in order to make the computations feasible. Specifically, the process decomposes the overall method into three separate tasks: searching over possible segmentations (Method Step 2a), exploring alternative models and choices of variables within each segment (Method Steps 2a and 2b), and pruning the segments and segments models so as to avoid over-parameterization and other issues (Method Step 3).

By overcoming the difficulties identified by Alexander and Grimshaw, the novel process can realize significant advantages because it can automatically produce models that are competitive with, if not better than, those produced by data analysts and applied statisticians using traditional, labor-intensive statistical techniques Numerous particularized expressions are possible when implementing the above novel process. For example, generating pluralities of data segments (Method Step 2) can be accomplished in a top-down fashion using techniques that improve upon decision tree methods. Alternatively, pluralities of data segments can be generated in a bottom-up fashion starting from an initial fine-grained segmentation using techniques akin to hierarchical agglomerative clustering. A combined method can also be employed that first generates a fine-grained segmentation in a top-down fashion and then agglomerates this fine-grained segmentation in a bottom-up fashion. A fourth method according to the invention is to adopt a nearest-neighbor approach and define data segments in terms of the shortest distance of each data record to a set of seed records. Starting with a large number of seed records to obtain a fine-grained segmentation, seed records are then successively removed to obtain successively coarser-grained segmentations. Other segmentation methods are also possible.

Generating one or more segment models for each data segment (Method Step 2) can, for example, be accomplished using stepwise linear regression, stepwise naive Bayes (a variant of logistic regression), or stepwise piecewise-linear additive modeling.

Pruning the segments and segment models (Method Step 3), can, for example, be accomplished using various methods for optimizing the predictive accuracy of the selected subset of data segments and segment models on separate hold-out data not used in the previous method steps for generating segments and segment models. Various cross-validation methods and regularization methods can likewise be employed for this purpose.

Because many particularized expressions are possible, the above novel process is highly advantageous in that it provides a substantial degree of flexibility. Such flexibility is needed to generate highly accurate predictive models because each particular expression imposes its own limitations on the models that are constructed using the invention.

As Alexander and Grimshaw point out, "the number of candidate models must be limited in some fashion." An exhaustive search is computationally intractable. Different limitations on the candidate models are imposed by each of the above mentioned particularized expressions. Which of these limitations are acceptable depends on the application one is considering. The flexibility of particularizing the various aspects of the novel process in different ways enables the process and its accompanying limitations to be adapted to the application at hand. This flexibility enables the process to be used to construct high-quality models for a wide variety of applications, such as predicting customer response in direct-mail targeted-marketing, predicting the probability of defaulting on a loan or a line of credit of a given size in the credit industry, predicting the frequency of claims and the average loss amount per claim in the insurance industry, and predicting the probability of click-though and eventual conversion of user interest into actual sales in when serving ads on the Internet. As is the case for predictive modeling in general, the above exemplars are but a few of the numerous possible applications of the above novel process.

The flexibility of the above novel process derives from the fact that the invention decomposes the problem of constructing segmentation-based models into three separate tasks. Each of these tasks can be performed independently without specific knowledge of how the other tasks are performed.

In particular, to generate suitable data segments according to the invention, all that one needs to know are numeric scores that represent the degrees of fit between the various segment models and the corresponding segment training data for different degrees of freedom. The specific details of the statistical models used for the segment models are not relevant to segment generation.

Similarly, the specific details of the segmentation method used to generate segments are not relevant to fitting segment models to segment training data for different degrees of freedom. All that matters is the segment data used for training.

To select the best subset of data segments and the best segment models for those segments, all that is needed are numeric scores that represent the estimated degrees of fit for the various segment models for different degrees of freedom on segment data as yet unseen to which the models will be applied in the future. The latter can be estimated, for example, by applying the models to hold-out data not used for training. Alternatively, one could use cross-validation or regularization methods to estimate degrees of fit on future data. The specific details of the segmentation methods and the statistical models used within each segment are not relevant to pruning the segments and segment models so as to optimize predictive accuracy.

To take full advantage of the flexibility of the above novel process, a very unique and highly advantageous embodiment of the invention is disclosed in which the above novel process is implemented using an object-oriented programming language, such as C++ or Java. In this embodiment, segmentation algorithms and segment models are both implemented as different derived classes of model objects that inherit from a single base class that defines a common application programming interface used to implement all modeling techniques. Pruning objects for selecting the best segments and segment models would likewise be derived from a single pruning base class and would be used by segmentation objects to produce a final model.

An advantage of this object-oriented embodiment is that it enables one segmentation algorithm to be substituted for another simply by changing the segmentation object that is to be invoked. Likewise, segments models and pruning methods can be substituted simply by changing the objects that are invoked. Which objects are invoked can be specified, for example, at run time by means of a task specification file or other form of task specification input, such as the task specification objects defined in the proposed ISO/IEC SQL Multimedia standard (see document reference number ISO/IEC JTC 1/SC 32N0647 cited above). The object-oriented embodiment therefore takes full advantage of the flexibility inherent in the above novel process and it makes that flexibility readily available to users of the process.

Another novel aspect of the disclosed object-oriented embodiment is that model objects do not access training data directly from the source of the data; instead, data is supplied to model objects one data record at a time, or in groups of data records, by means of object interface functions. This method of supplying data applies to all types of model objects, including those that implement segment modeling techniques and those that implement segmentation methods.

This approach to data access is the opposite of how known predictive modeling techniques are implemented; hence, it is a distinguishing feature of the invention. The usual approach is to structure modeling algorithms as sets of nested loops, wherein the outer loops consider possible variants of a model and/or possible model refinement steps, and the inner loops access training data in order to calculate the statistics needed to fit model variants to the data and/or to perform model refinement steps.

The disclosed object-oriented embodiment of the invention, on the other hand, effectively reverses the order of the loops. An outer loop runs over the data. Within this outer loop, data records are presented to model objects by calling suitable interface functions to those model objects. The inner loops of the interface functions then calculate the statistics needed to fit possible variants of the model to the data and/or to perform possible model refinement steps.

Thus, in a second aspect, the present invention discloses a process performed on a computer for training multivariate segment model objects, the method steps comprising:

1) accessing a collection of training data records comprising examples of input values that are available to the multivariate segment model object together with corresponding desired output value(s) that the model is intended to predict;

2) presenting the training data records to a multivariate segment model object by calling one or more scan-data-record interface functions;
and 3) repeating method steps 1 and 2 until the multivariate segment model object indicates that it does not need to have the training records presented over again.

Method Step 3 is needed because many modeling techniques iterate over training data multiple times before producing a final model. Examples include segmentation-based modeling techniques, such as decision tree methods.

One consequence of using the above second novel process is that it requires modeling techniques to be implemented in a somewhat non-intuitive fashion compared to known methods. However, any inconveniences imposed by the process are far outweighed by the advantages that the process entails.

One immediate advantage of the above second novel process is that modeling techniques implemented according to the process can be highly scalable with respect to the volume of data that they are able to handle. Many known predictive modeling methods require training data to be stored in main/virtual memory. However, this approach limits the volume of data that can be handled to the size of main/virtual memory. The above second novel process, on the other hand, places no such restrictions on the volume of training data because it requires training data to be supplied by a source external to the model object. In addition, no restrictions are imposed on where that data resides. The data can, for example, be supplied by a terabyte-sized relational database system running on a parallel computer.

From the point of view of segmentation-based modeling, another advantage of the above second novel process is that it provides a vehicle for cleanly separating the search over possible segmentations from the fitting of segment models to segment data. The process calls for both segmentation-based modeling techniques and segment models to be implemented as model objects. Segmentation objects are responsible for searching over possible segmentations. Segment model objects are embedded within segmentation objects, with one segment model object created for each data segment generated by a segmentation object. Segment model objects are responsible for fitting themselves to training data in their corresponding data segments. As data records are presented to a segmentation object, the segmentation object first determines to which data segments the records belong. The segmentation object then presents those records to the corresponding segment model objects for training by calling the scan-data-record interface functions of the segment model objects. After training their embedded segment model objects, segmentation objects query the segment model objects to obtain degree-of-fit scores as needed to make further segment refinements and/or to make final choices of segments and segment models (e.g., by apply pruning objects to the resulting pluralities of segments and segment objects).

Thus, segmentation objects do not need to make any allowances for the internal workings of segment model objects. From the point of view of a segmentation object, it is simply providing training data to segment model objects and querying them to obtain degree-of-fit scores. Likewise, segment model objects need not make any allowances for the fact that they are embedded within segmentation objects. From their point of view, some outside entity is simply presenting them with training data, and they are then providing that entity with degree-of-fit scores.

A tremendous advantage of this approach to structuring the modeling process is that any segmentation algorithm can be combined with any modeling algorithm for the data segments when both are implemented according to the above second novel process. The invention therefore achieves an unprecedented level of generality and interoperability in its ability to combine modeling techniques in a highly flexible manner.

For example, in exemplary expressions of the invention, one can employ top-down, decision-tree-like segmentation algorithms, bottom-up agglomerative-clustering-like segmentation algorithms, or hybrid segmentation algorithms that combine aspects of the two. Likewise, for segment models, one can employ in exemplary expressions of the invention generalized least-squares algorithms, naive-Bayes logistic-regression algorithms, or generalized additive modeling algorithms. One can even use a segmentation algorithm as a segment model.

It should also be discerned that the above second novel process can also be used in conjunction with any predictive modeling technique that employs component submodels in order to construct an over all model. A segmentation-based model is just one species of this larger genus, which also includes bagging and boosting methods (see, for example, E. Bauer and R. Kohavi, "An empirical comparison of voting classification algorithms: bagging, boosting, and variants," *Machine Learning*, Vol. 36, No. 1-2, pp. 105-139, 1999), wrapper-based methods (see, for example, R. Kohavi and G. H. John, "The wrapper approach," in H. Liu and H. Motoda, editors, *Feature Selection for Knowledge Discovery and Data Mining*, pp. 33-50, Kluwer Academic Publishers, 1998), as well as other learning strategies for combining multiple predictive models. The above second novel process can be readily employed within such multiple-model methods in order to train a plurality of component submodels.

BRIEF DESCRIPTION OF THE DRAWINGS

The foregoing and other objects, aspects, and advantages will be better understood from the following detailed description of various embodiments of the invention with reference to the drawings, in which.

DETAILED DESCRIPTION OF THE INVENTION

Figure 4:
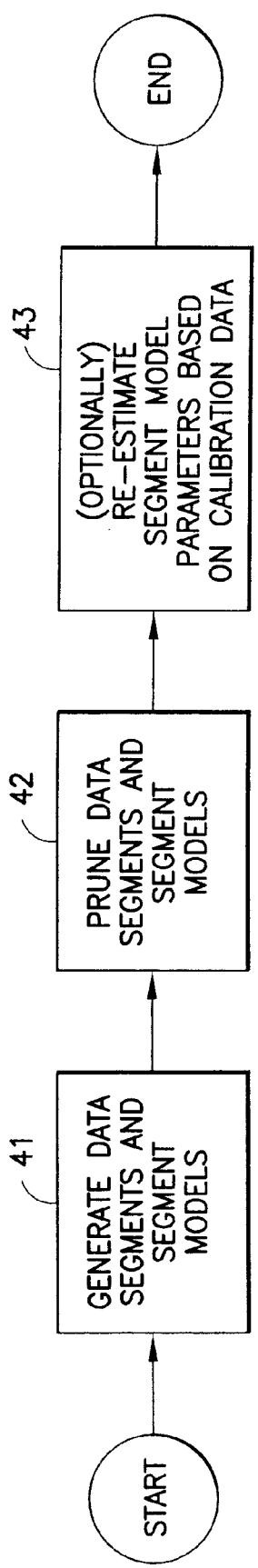
FIG. 4 shows a flow chart of the overall process for an embodiment of the invention.

Referring to FIG. 4, the overall operation of the method for generating segmentation-based predictive models is illustrated in the form of a flow chart. Beginning with block 41, the method first generates a plurality of data segments and associated segment models. Data segments and segment models are generated based on input training data that is made available to the process. For at lest one data segment, a plurality of segments models is generated wherein the segment models vary with respect to their degrees of freedom.

At block 42, the plurality of data segments and associated segment models is pruned by selecting a subset of data segments from the plurality together with one segment model per selected data segment.

At block 43, the model parameters of the segment models are optionally re-estimated based on (optional) calibration data that is made available to the process. This optional process step can be beneficial in applications in which a tremendous amount of training data is available. For such applications, the process execution time can be greatly reduced by constructing segmentation-based models on the basis of smaller, randomly-sampled subsets of available (training) data and to then recalculate model parameters on the remaining (calibration) data, which should be much larger in volume (see, for example, C. Apte, E. Grossman, E. P. D. Pednault, B. K. Rosen, F. A. Tipu, and B. White, "Probabilistic estimation-based data mining for discovering insurance risks," IEEE Intelligent Systems, Vol. 14, No. 6, pp. 49-58, 1999).

Figure 5:
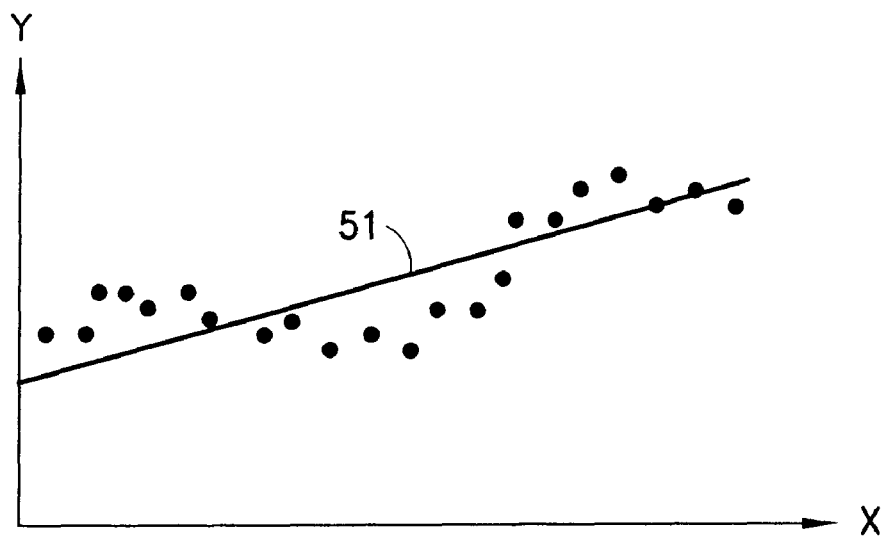
FIG. 5 illustrates a modeling problem for which simple least-squares linear regression produces a poor model.

FIGS. 5 through 8 illustrate some of the technical issues that are addressed by the embodiments disclosed below of blocks 41 and 42 of FIG. 4. FIG. 5 illustrates an example of a simple modeling problem in which the objective is to predict the value of data field Y given the value of data field X. In a direct-mail targeted marketing application, for example, data field Y might be the amount that a customer purchases and data field X might be the amount that the same customer purchased in the same quarter a year ago. In an insurance risk modeling application, on the other hand, data field Y might be the size of a claim filed by a policyholder and data field X might be the age of the policyholder. The exact meanings of data fields X and Y are not material to the technical issues discussed below. The technical issues and the disclosed methods for addressing those issues are the same for all applications. However, it is important to keep in mind that in any specific application of the invention, data fields X and Y will have specific meanings.

The straight line 51 that runs through the middle of the data points in FIG. 5 illustrates the predictive model that one would obtain using standard linear regression techniques. As can be seen in FIG. 5, the data in this example exhibits an undulating pattern that is not adequately modeled by a conventional linear regression model.

Figure 6:
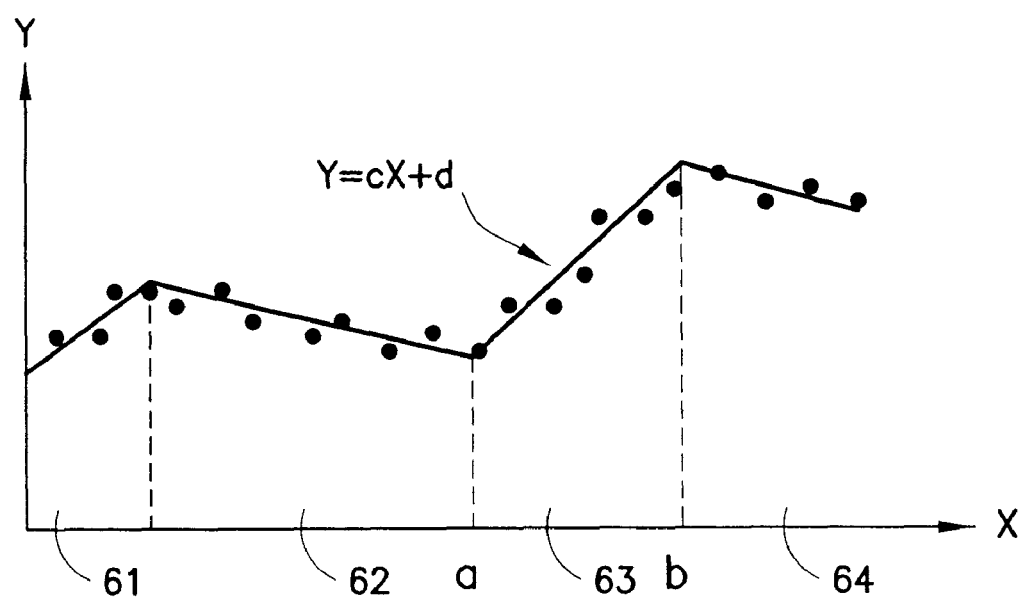
FIG. 6 illustrates the kind of model that can be obtained using the invention for the modeling problem illustrated in FIG. 5.

FIG. 6 illustrates the kind of predictive model that can be obtained using the present invention. In this example, the data is divided into four segments 61 through 64. In addition, separate linear regression models are constructed in each segment to obtain segment models. FIG. 6 illustrates one of these segment models for segment 63 in which the predicted value of Y is given by the equation $Y=cX+d$ when X lies in the range $a \leq X \leq b$. Unlike standard linear regression without segmentation, FIG. 6 shows that a segmentation-based model can adequately model the undulating pattern in the data.

In more general settings in which predictions can be made using a plurality of model inputs, it should be noted that even complex, multidimensional surfaces can be modeled to arbitrary accuracy by dividing the space of possible input values into a number of regions (i.e., data segments) and constructing multivariate models within each region.

Thus, one aspect of constructing a segmentation-based model is to search over possible segmentations and possible models within each segment, and to do so in a computationally feasible manner. This step is performed at block 41 of FIG. 4.

Another aspect of constructing a segmentation-based model is to balance the number of segments and the degrees of freedom of the segment models against the volume of available training data. This step is performed at block 42 of FIG. 4.

Figure 7:
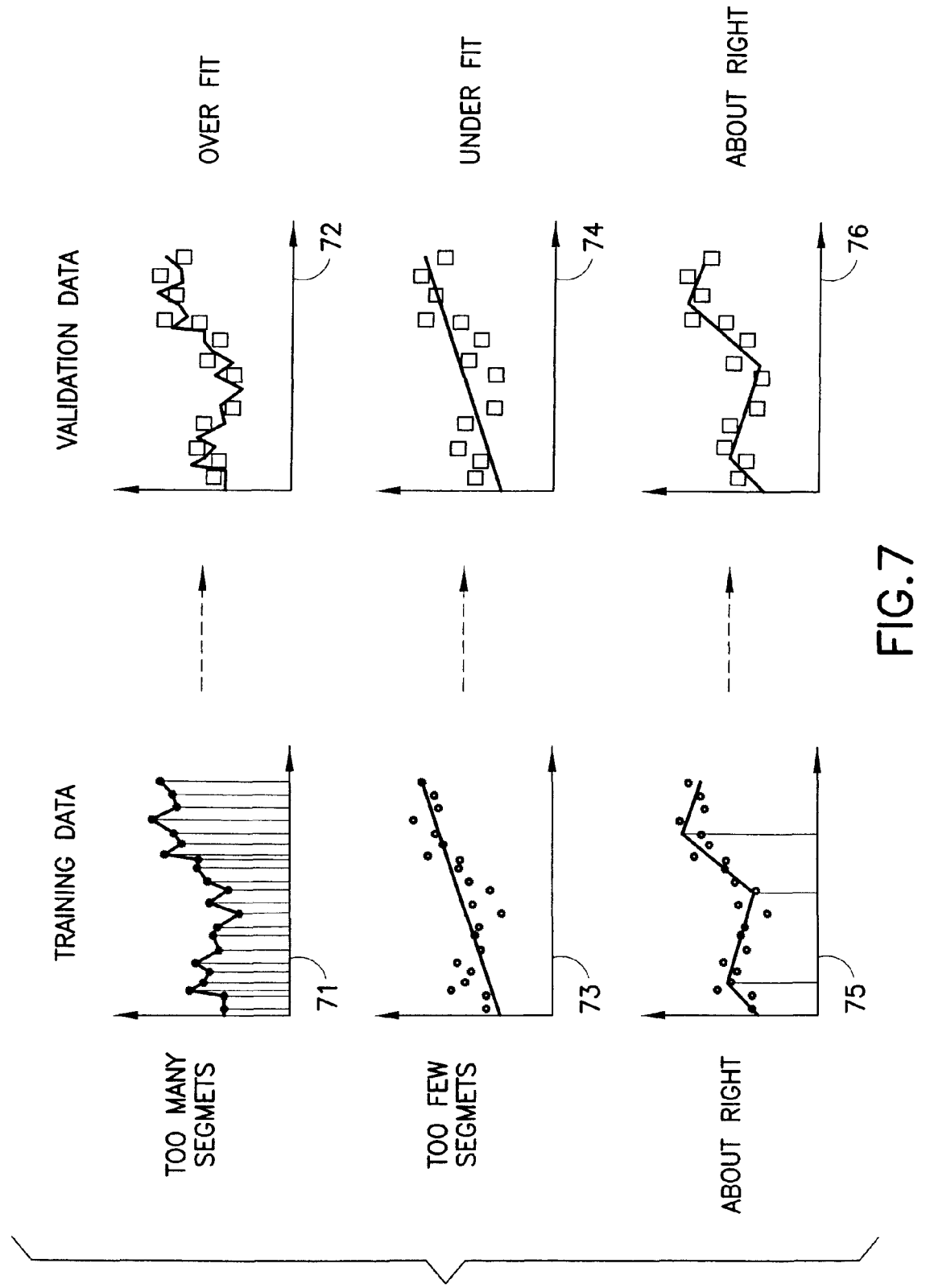
FIG. 7 illustrates the effects of model overfitting and model underfitting as the number of segments in the model are varied.

FIG. 7 illustrates the technical issues involved in performing this latter aspect of model building from the point of view of the number of data segments. As shown in FIG. 7, one could, for example, segment the data so finely that each segment contains only one training record. The result 71 would be an exact fit to the training data. However, when evaluating the quality of the model by applying it to validation data 72 (i.e., data not used for training), one is likely to observe large discrepancies between the predictions made by the model and the actual values observed in the validation data.

On the other hand, placing all data records in a single segment (i.e., not performing segmentation) is likely to produce a model that poorly fits the training data 73 and makes poor predictions on validation data 74.

In many cases, the best model will employ a moderate number of segments and will be characterized by a moderate degree of fit on the training data 75 with good predictions on validation data 76.

It should be discerned that the general relationships illustrated in FIG. 7 likewise hold when the degrees of freedom of the segment models are allowed to vary, as in the case of the present invention; however, the relationships are more complicated in this more general setting. As previously discussed, the degrees of freedom of a segment model can be varied by varying the number of explanatory variables that are used as inputs to the model. The degrees of freedom can likewise be varied by varying regularization parameters used when estimating model parameters (as in the case of ridge regression), or by any other means of changing the effective VC-dimension (see, for example, Vapnik, 1998, cited above) or Pollard pseudo-dimension (see, for example, Devroye, Gyorfi, and Lugosi, 1996, cited above) of the model as it is being fitted to the segment training data.

Varying the degrees of freedom of each segment model produces the same general effects as does varying the number of segments. Specifically, a segment model with too many degrees of freedom will fit the segment training data well but will produce inaccurate predictions on segment validation data. Similarly, a segment model with too few degrees of freedom will yield a poor fit to the segment training data as well as produce inaccurate predictions on segment validation data. A segment model with the right number of degrees of freedom will be characterized by a moderate degree of fit on the segment training data with good predictions on the segment validation data.

Figure 8:
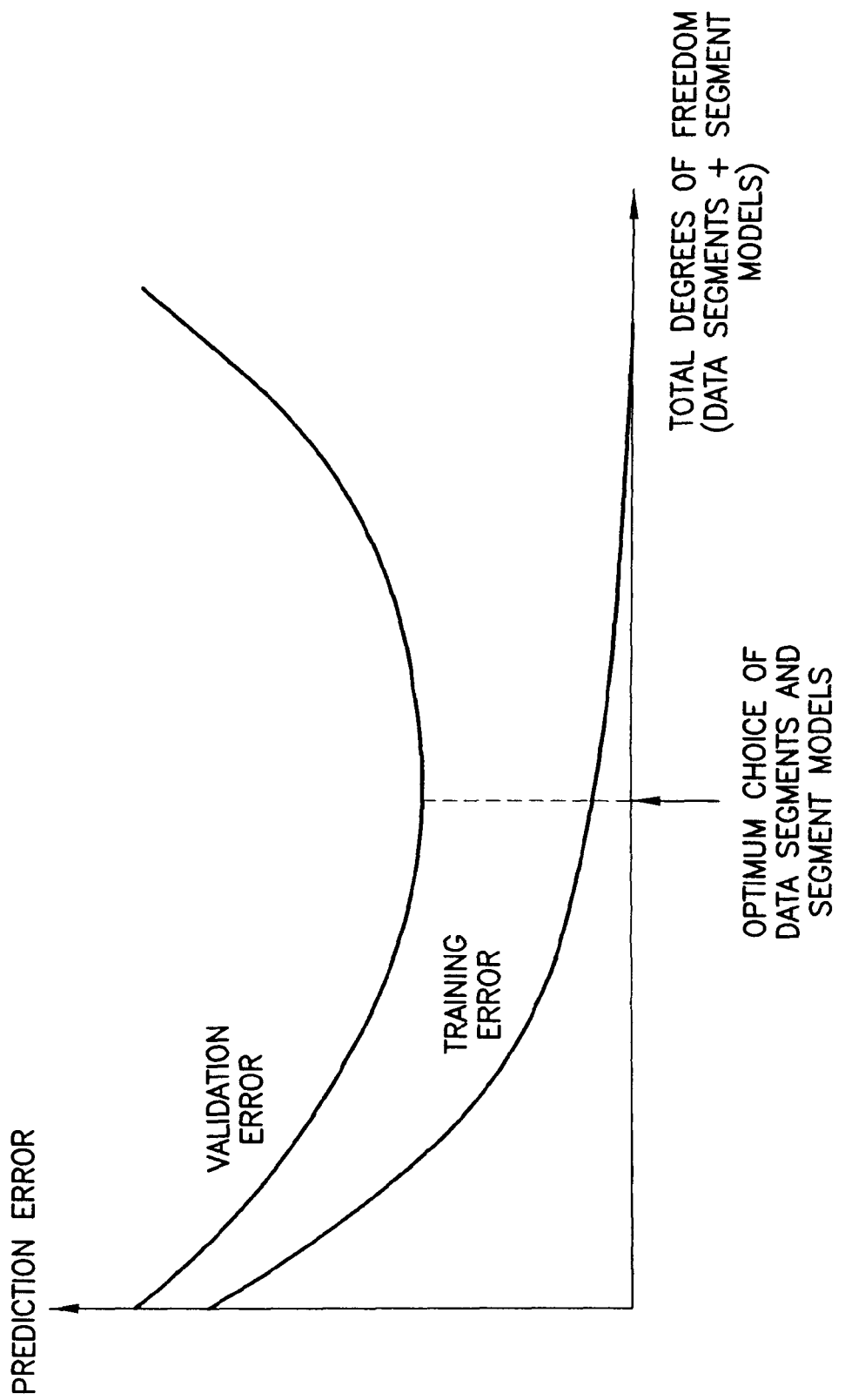
FIG. 8 illustrates how the predictive accuracy of a selected model can be optimized by choosing data segments and segments models so as to minimize prediction error as estimated on validation data.

To optimize the predictive accuracy of the final segmentation-based model, one must consider the total degrees of freedom of the overall model—that is, the number of data segments (because segmentation itself contributes degrees of freedom) together with the degrees of freedom of the individual segment models. Optimizing the number of data segments without considering the degrees of freedom of the segment models can produce suboptimal models. Similarly, optimizing the degrees of freedom of the segment models without considering the number of data segments can also produce suboptimal models. As illustrated in FIG. 8, the total number of degrees of freedom must be optimized by simultaneously considering both the number of data segments and the degrees of freedom of the segment models in order to maximize the predictive accuracy (i.e., minimized the prediction error) of the overall model.

The step of optimizing the total degrees of freedom is performed at block 42 of FIG. 4. Performing this optimization for both the number of data segments and the degrees of freedom of the segment models is a distinguishing aspect of the present invention.

The input to block 42 of FIG. 4 comprises a plurality of generated data segments together with one or more generated segment models per data segment. In the case of a plurality of segment models generated for a data segment, the segment models vary with respect to their degrees of freedom.

Figure 9:
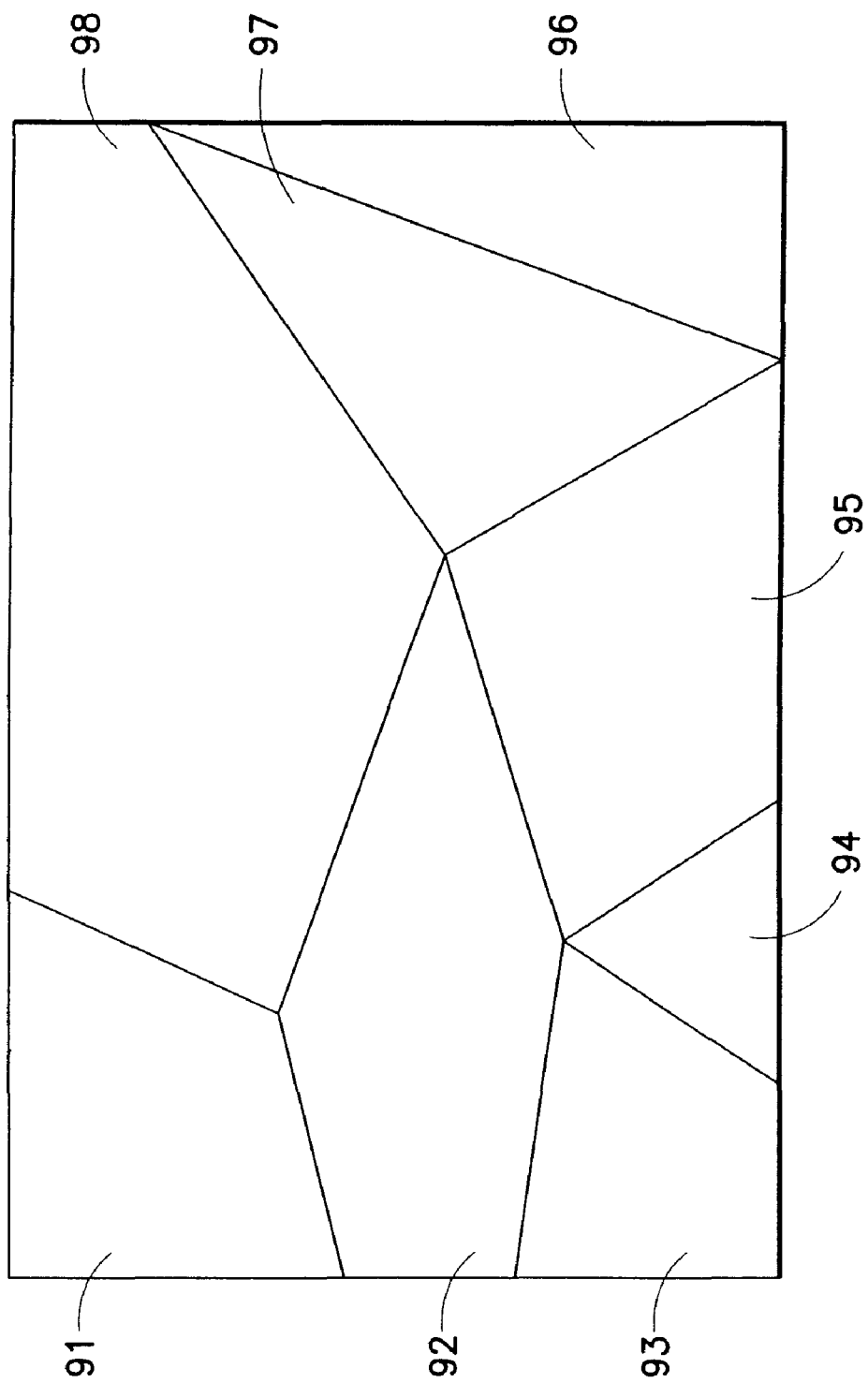
FIG. 9 shows a Venn diagram that illustrates an example of a segmentation.

Different configurations of generated data segments are possible. FIG. 9 provides an example that illustrates the simplest case in the form of a Venn diagram. In this example, the generated data segments 91 through 98 in the plurality are mutually exclusive (i.e., non-overlapping) and exhaustive (i.e., they cover all possible input values). Such a segmentation might be produced, for example, by applying conventional clustering techniques, such as k-means clustering. In this simplest case of a plurality of mutually exclusive and exhaustive data segments, all data segments must be selected in order to produce a complete model. In addition, an appropriate segment model must be selected for each data segment.

Figure 10:
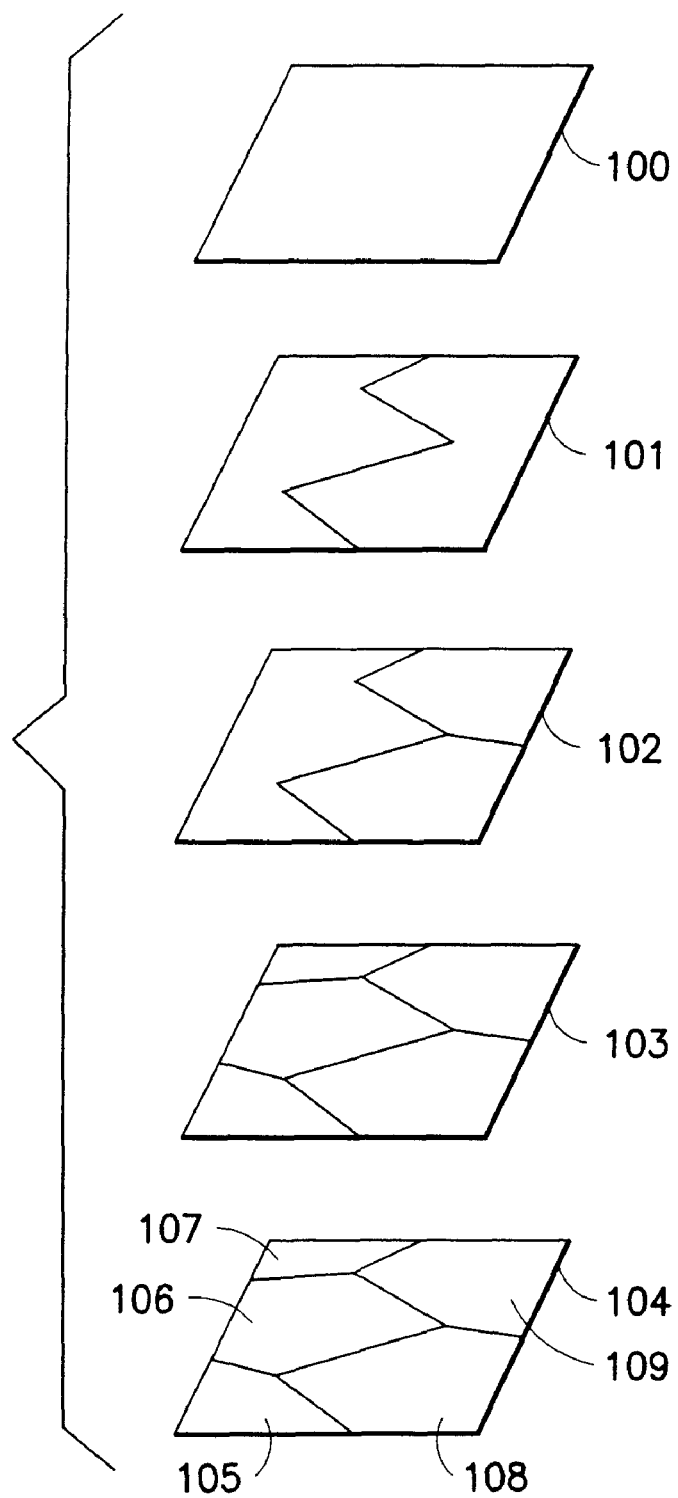
FIG. 10 shows a collection of Venn diagrams that illustrate a collection of alternative segmentations.

FIG. 10 provides as example that illustrates a more general case in which the plurality of generated data segments comprises the union of several distinct pluralities 100 through 104 of mutually exclusive and exhaustive data segments, wherein each distinct plurality corresponds to an alternate segmentation of the data. In this more general case, one of the segmentations 100 through 104 must be selected to produce a complete model. In addition, an appropriate segment model must be selected for each data segment in the selected segmentation.

Selecting among alternative segmentations and segment models is a distinguishing aspect of the present invention. As previously discussed, it is necessary to balance the number of data segments against the degrees of freedom of the segment models in order to maximize predictive accuracy. Therefore, as shown in FIG. 10, several alternative segmentations should be explored that vary in terms of the number of data segments that comprise each segmentation.

In general, there need not be any relationship among the alternative segmentations that are generated. For example, alternate segmentations could be generated by applying k-means clustering wherein the number of clusters (i.e., k) is varied among the segmentations. However, an important special case occurs when the data segments that belong to the alternative segmentations are related by a tree structure. This important special case happens to hold in FIG. 10. Specifically, segmentation 103 of FIG. 10 can be obtained from segmentation 104 by merging data segments 108 and 109. Similarly, segmentation 102 can be obtained from segmentation 104 by merging data segments 105, 106, and 107. Segmentation 101 can be obtained from segmentation 104 by merging segments 105, 106, and 107, and by merging segments 108 and 109. Finally, segmentation 100 can be obtained from segmentation 104 by merging all five data segments 105 through 109.

Figure 11:
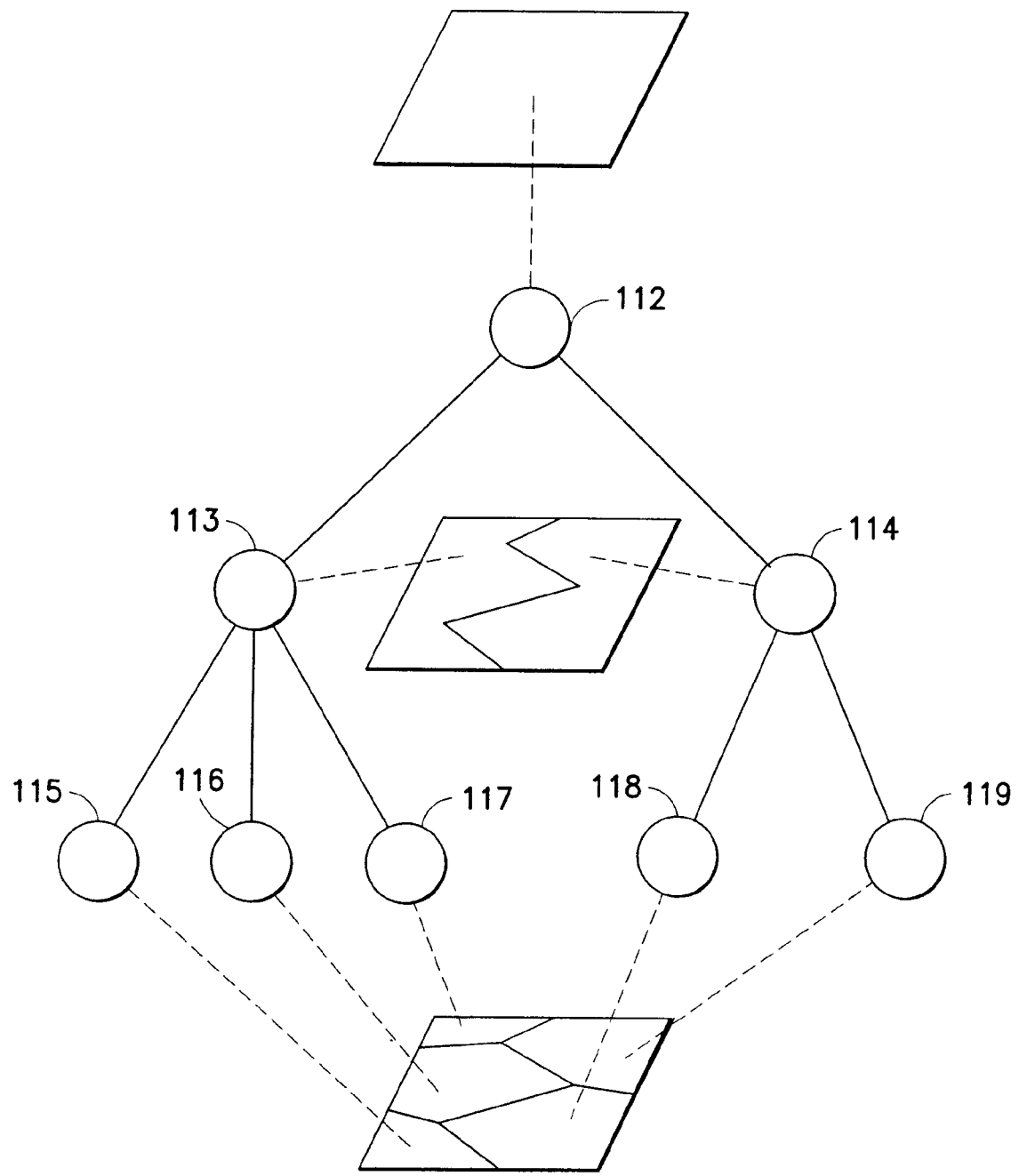
FIG. 11 shows a tree structure that encodes the same collection of alternative segmentations as does FIG. 10.

The above relationships among the alternative segmentations that appear in FIG. 10 can be represented in the form of a tree as shown in FIG. 11. The leaf nodes 115, 116, 117, 118, and 119 of the tree illustrated in FIG. 11 correspond, respectively, to data segments 105, 106, 107, 108, and 109 in FIG. 10. Node 113 of the tree in FIG. 11 corresponds to the union of data segments 105, 106, and 107 in FIG. 10. Similarly, node 114 in FIG. 11 corresponds to the union of data segments 108 and 109 in FIG. 10. Finally, node 112 in FIG. 11 corresponds to the union of all five data segments 105 through 109 in FIG. 10.

The alternative segmentations 100 through 104 shown in FIG. 10 correspond to the subtrees that can be generated by pruning the tree shown in FIG. 11. The entire tree of FIG. 11 corresponds to segmentation 104 in FIG. 10. If nodes 118 and 119 in FIG. 11 are removed (i.e., pruned), so that node 114 becomes a leaf node, then the resulting tree corresponds to segmentation 103 in FIG. 10. If instead nodes 115, 116, and 117 in FIG. 11 are pruned, so that node 113 becomes a leaf node, then the resulting tree corresponds to segmentation 102 in FIG. 10. If all five leaf nodes 115 through 119 in FIG. 11 are pruned, so that nodes 113 and 114 both become leaf nodes, then the resulting tree corresponds to segmentations 101 in FIG. 10. Finally, if nodes 113 through 119 in FIG. 11 are pruned, so that root node 112 becomes a leaf node, then the resulting tree corresponds to segmentation 100 in FIG. 10.

Figure 12:
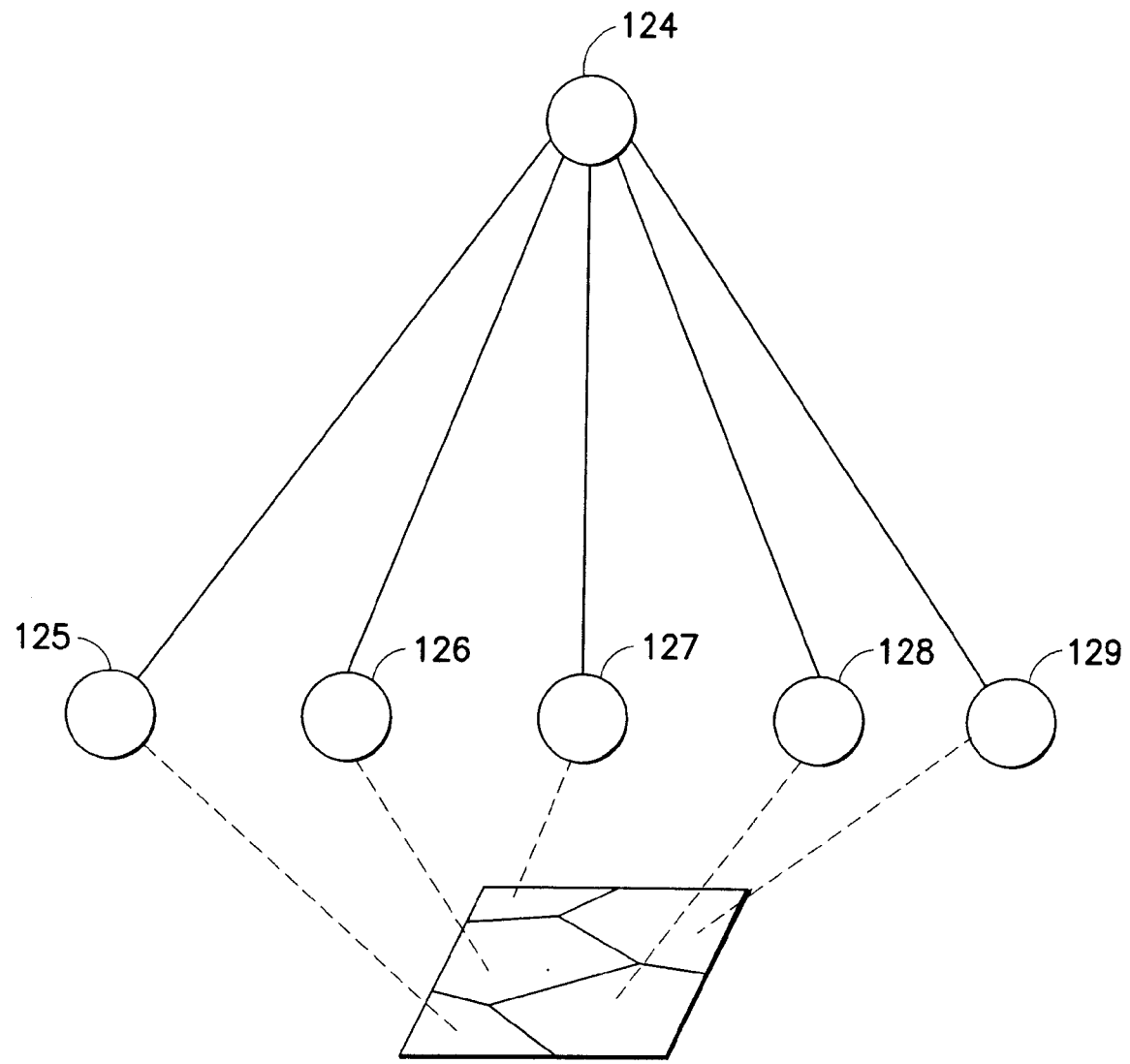
FIG. 12 illustrates how any segmentation can be represented as a tree.

It should be discerned that tree structures can, in fact, be used to represent arbitrary segmentations. For example, any distinct segmentation can be represented by a two-level tree, such as the one shown in FIG. 12. The tree in FIG. 12 represents segmentation 104 in FIG. 10, wherein nodes 125, 126, 127, 128, and 129 in FIG. 12 correspond, respectively, to segments 105, 106, 107, 108, and 109 in FIG. 10. Node 124 in FIG. 12 corresponds to segmentation 100 in FIG. 10 (i.e., no segmentation). The introduction of a root node is what enables arbitrary segmentations to be represented as trees. The introduction of a root node explicitly acknowledges the fact that one should always consider not segmenting the data when constructing a model. For the purposes of the invention, root nodes always represent entire sets of data (i.e., no segmentation).

Figure 13:
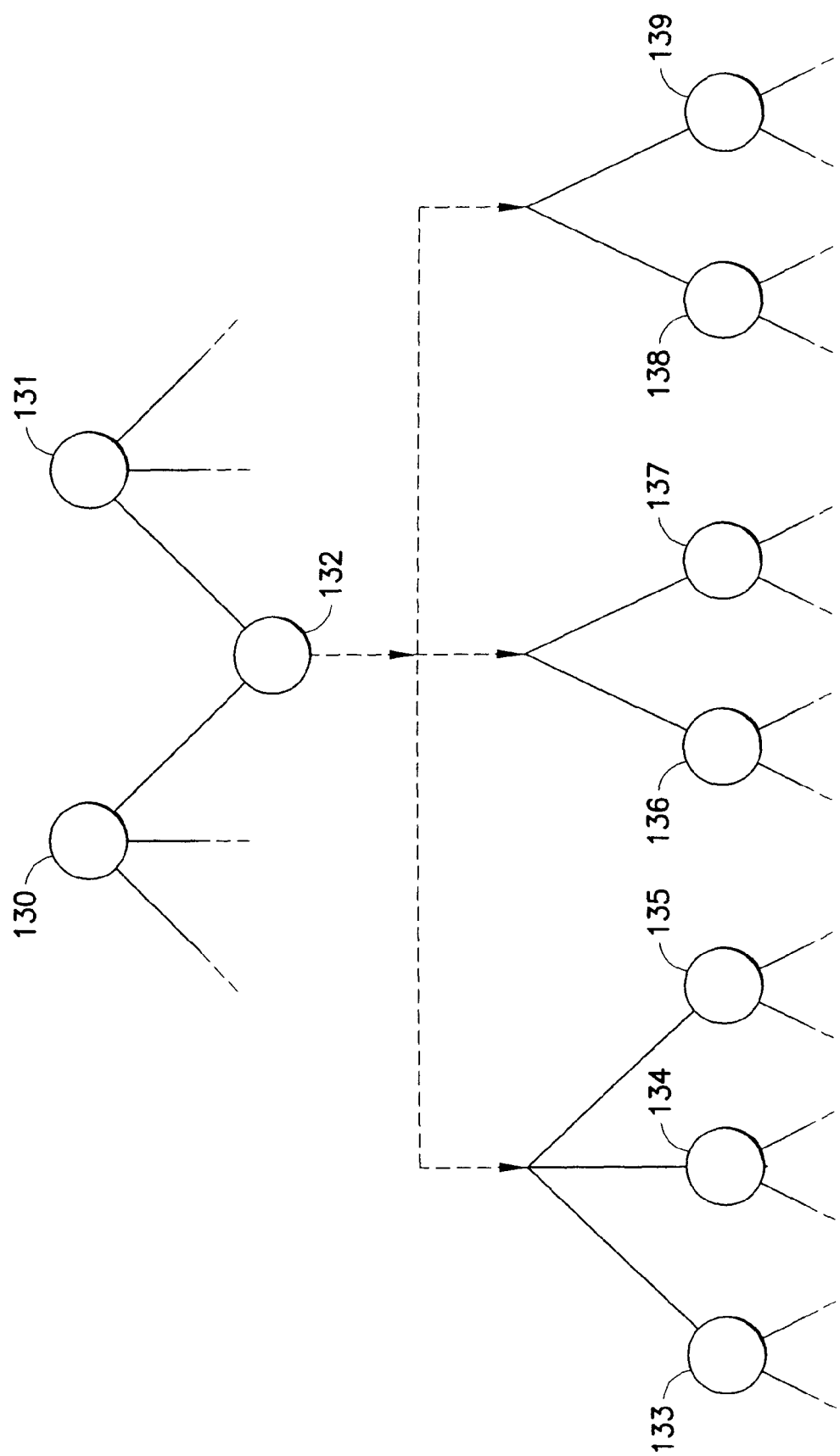
FIG. 13 illustrates how generalized tree structures can encode alternate ways of segmenting subsegments, as well as how they can encode segments that share common subsegments.

Simple tree structures, however, are not general enough to represent all pluralities of data segments. In order for the representation to be fully general, it must account for the fact that a plurality of alternative segmentations can be generated that cannot be related by means of simple tree structures. This consideration is accounted for by generalizing the notion of a tree to allow nodes in a tree to have alternative sets of children that represent alternative ways of decomposing a data segment into subsegments. An example of the above generalization is illustrated in FIG. 13. In this example, node 132 of FIG. 13 can alternatively be decomposed into nodes 133, 134, and 135, or nodes 136 and 137, or nodes 138 and 139. When pruning the tree, one must either select one of these alternative decompositions, or all of the alternatives must be discarded in favor of converting node 132 or one of its parents into a leaf node.

It is also possible to generate alternative segmentations that share one or more data segments in common, but that otherwise cannot be related by means of simple tree structures. This second consideration is accounted for by allowing nodes in a tree to have multiple parents, as illustrated by the example in FIG. 13. In this example, node 132 has two parent nodes 130 and 131. Thus, the data segments that correspond to nodes 130 and 131 share as a subsegment the data segment that corresponds to node 132.

Tree structures that contain nodes with multiple parents can be generated when exploring alternative segmentations. For example, such tree structures are generated by one of the embodiments disclosed below for block 41 in FIG. 4. In this embodiment, a simple tree structure is first generated using a top-down splitting process analogous to those found in decision-tree algorithms. The leaves of the resulting tree are then merged using a bottom-up process analogous to those found in hierarchical agglomerative clustering algorithms. Each leaf node of the resulting generalized tree structure has two parents. In addition, the root node has two alternative decompositions: one that corresponds to the top-down portion of the generalized tree, and the other that corresponds to the bottom-up portion of the generalized tree. Pruning the resulting generalized tree structure involves pruning both the top-down and bottom-up portions of the tree, and then selecting the portion (top-down or bottom-up) that maximizes the overall predictive accuracy of the resulting model.

Figure 14:
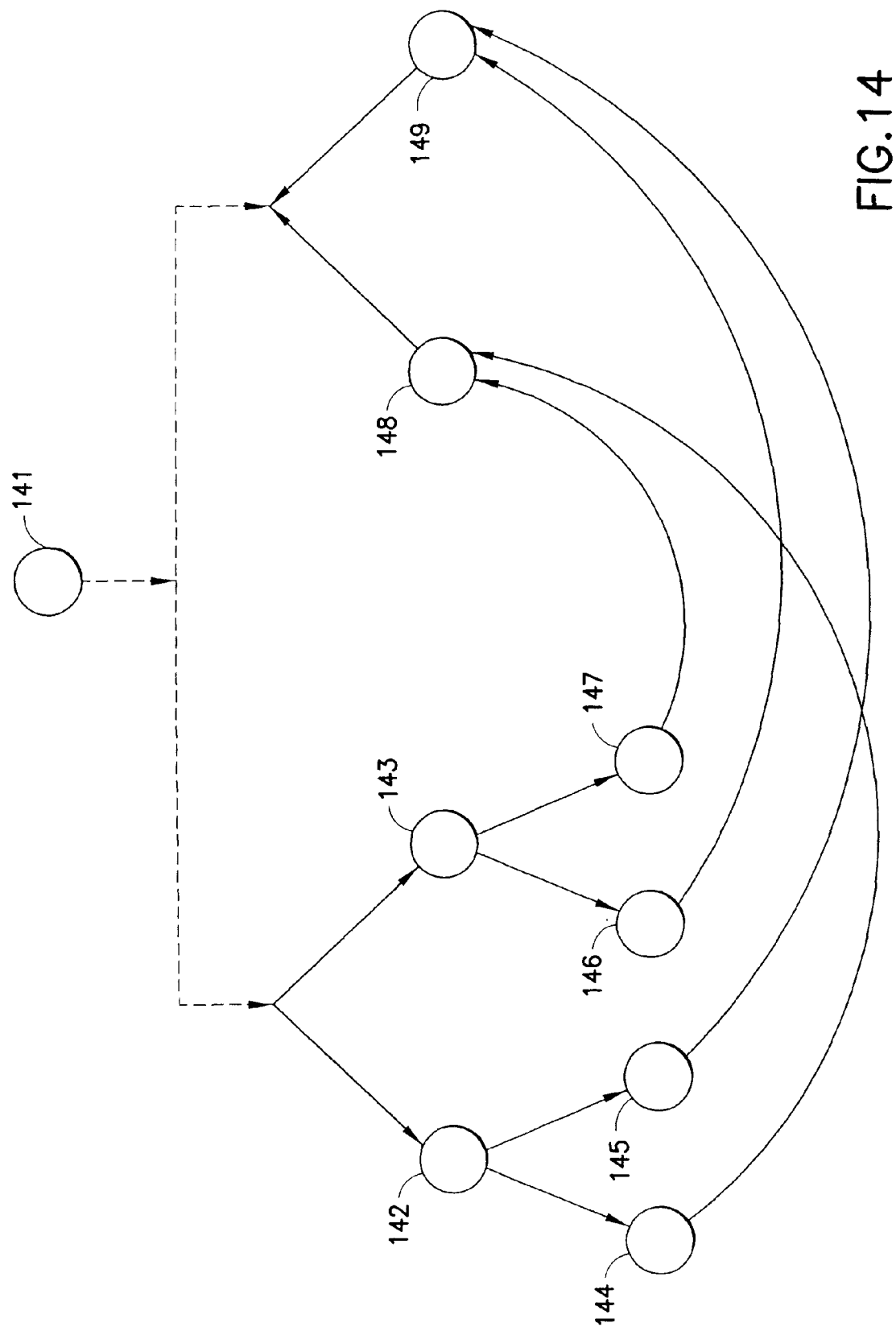
FIG. 14 illustrates a generalized tree structure obtained by performing a top-down decision-tree-like segmentation process followed by a bottom-up agglomerative-clustering-like segmentation process.

FIG. 14 shows an example of the kinds of generalized tree structures that are produced by the embodiment described above of block 41 in FIG. 4. In FIG. 14, the top-down splitting process produces nodes 142 through 147. The bottom-up merging process produces nodes 148 and 149. The root node 141 therefore has two alternate decompositions—the top-down portion of the generalized tree in which the root node is decomposed into nodes 142 and 143, and the bottom-up portion of the generalized tree in which the root node is decomposed into nodes 148 and 149.

Note that even if some of the nodes of a generalized tree have multiple parents, there must always be exactly one root node in a generalized tree because root nodes are special in that they represent entire sets of data (i.e., no segmentation). The root node can, however, have several alternative decompositions, as can any of the internal nodes of a generalized tree.

Directional arrows on the links between nodes in FIG. 14 indicate which nodes were constructed using top-down splitting and which were constructed using bottom-up merging. Arrows pointing from parent nodes to child nodes indicate that the child nodes were obtained via top-down splitting. For example, nodes 142 and 143 were generated from node 141 using top-down splitting. Similarly, top-down splitting was used to generate nodes 144 and 145 from node 142. Arrows pointing from child nodes to parent nodes indicate that the parent nodes were obtained via bottom-up merging. Thus, node 141 is obtained by merging nodes 148 and 149. Similarly, node 148 is obtained by merging nodes 144 and 147.

Figure 1:
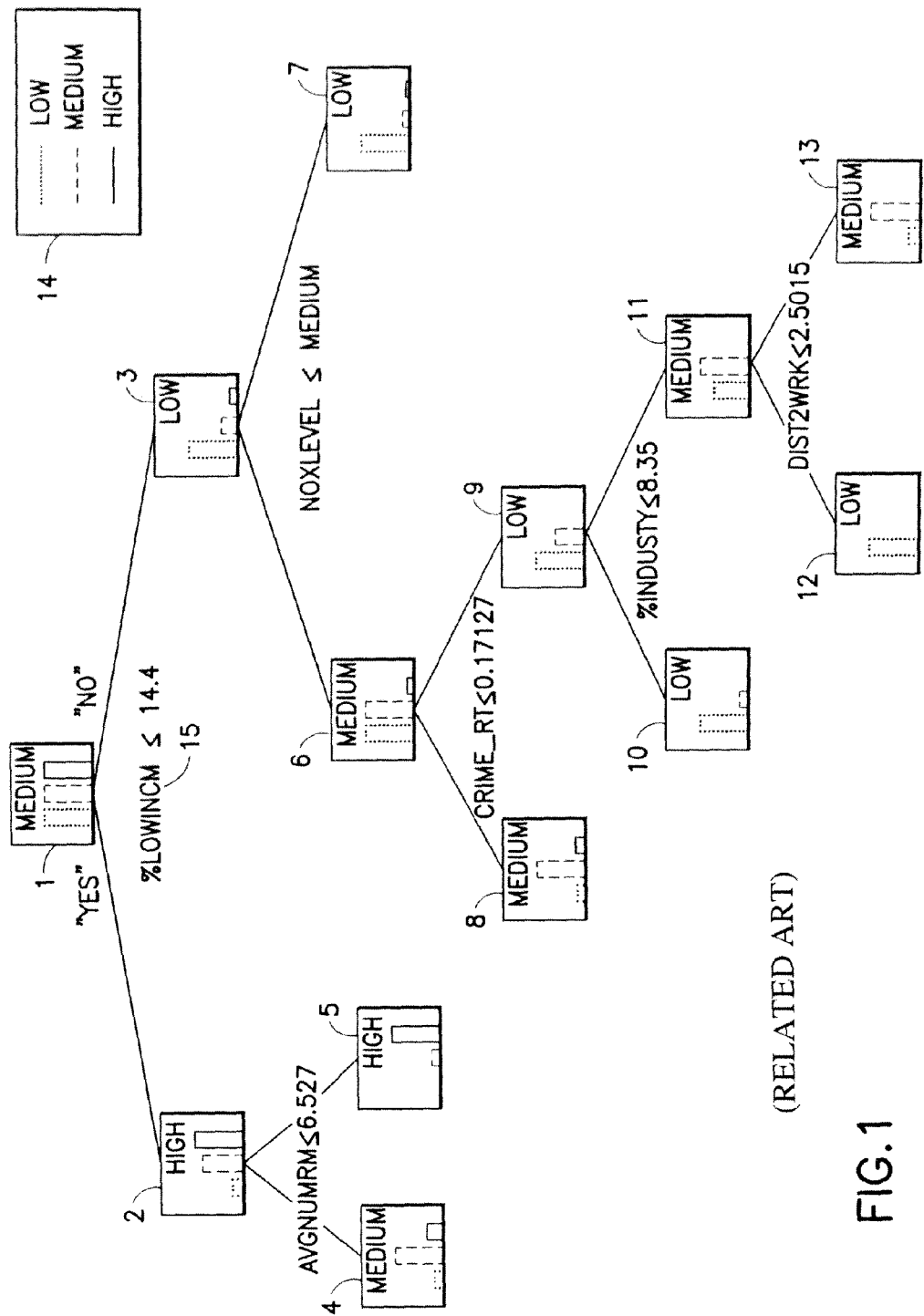
FIG. 1 shows a decision tree that predicts PRICE using all other columns in the Boston Housing data as explanatory data fields.
Figure 2:
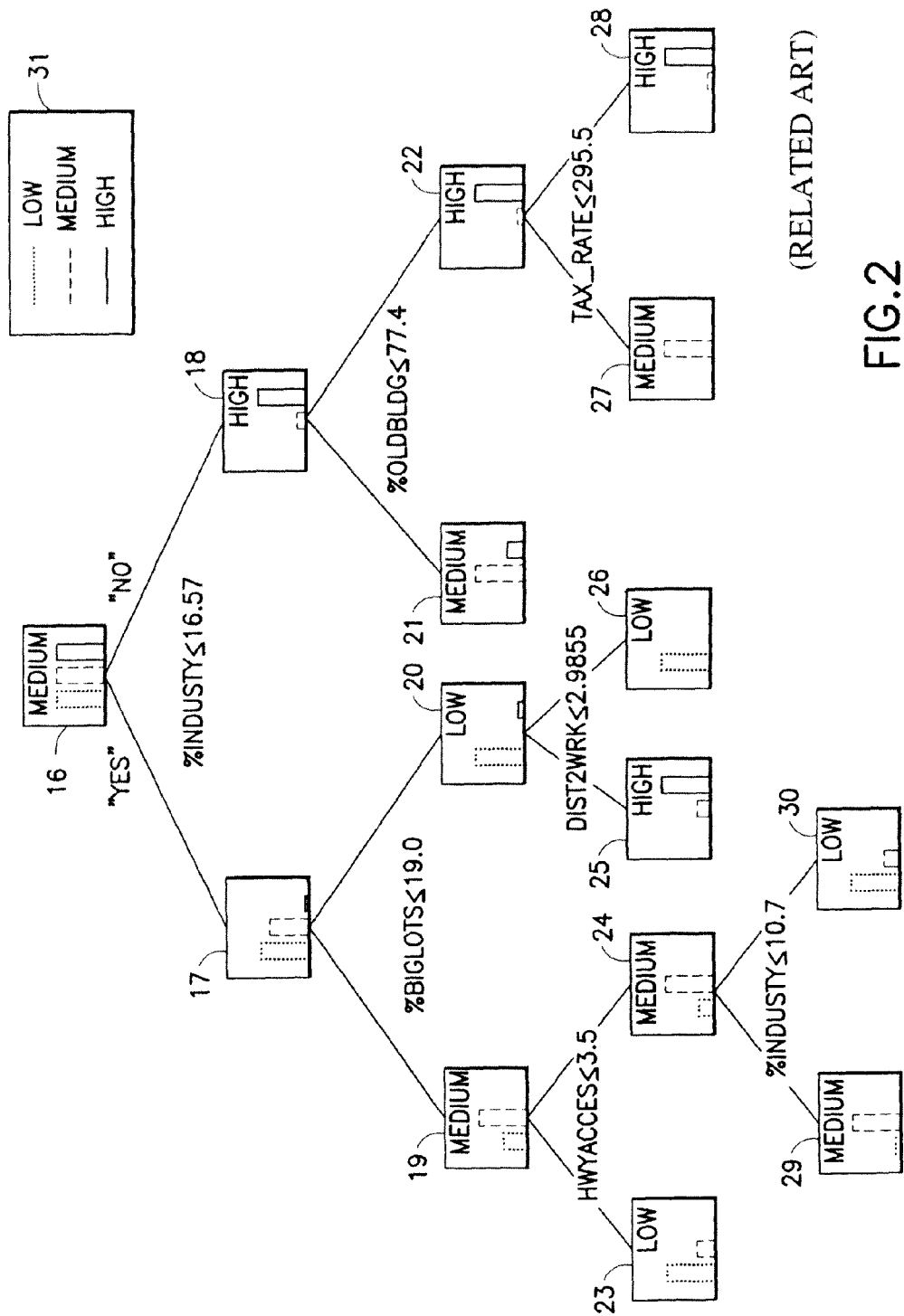
FIG. 2 shows a decision tree that predicts NOXLEVEL using all other columns in the Boston Housing data as explanatory data fields.
Figure 3:
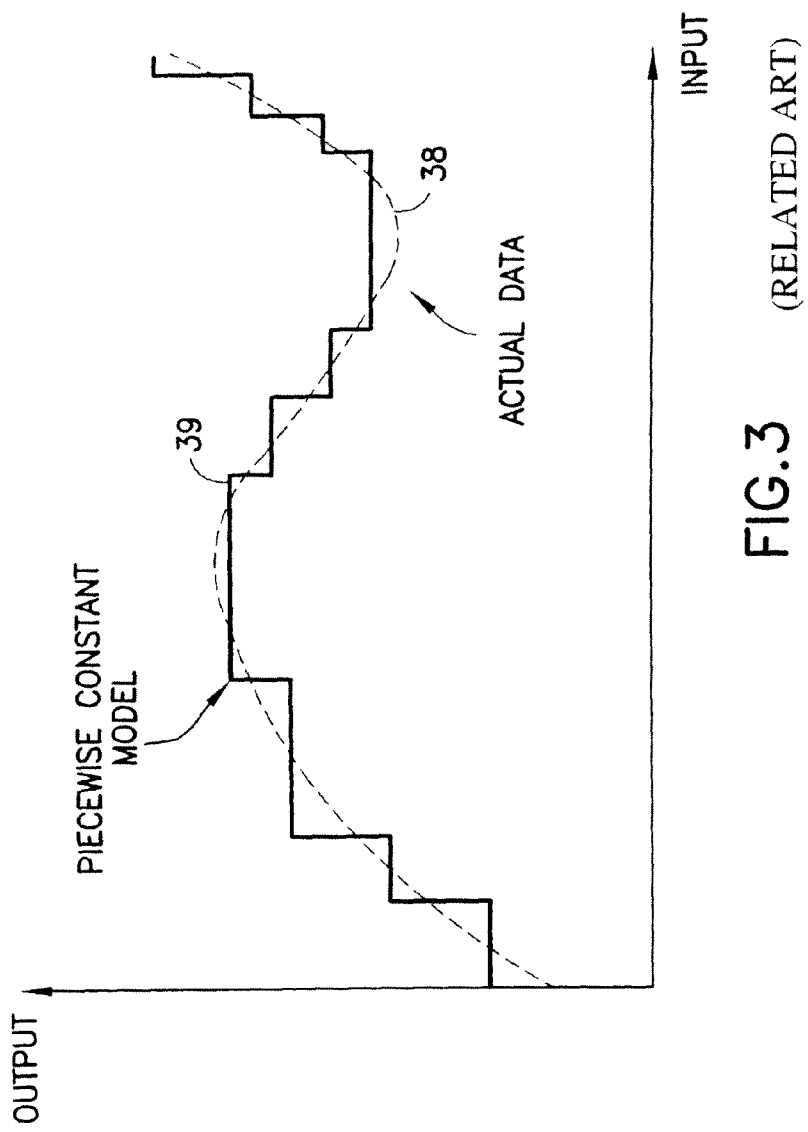
FIG. 3 illustrates that stair-like nature of piecewise-constant predictive models makes such models inherently inaccurate when modeling smoothly varying response surfaces.

To obtain complete definitions of the data segments that correspond to each node, one must also know the splitting tests that define child nodes with respect their parents when top-down splitting is employed. Splitting tests are not illustrated in FIG. 14, but examples can be found in FIGS. 1 and 2.

As will be disclosed below, an object-oriented programming approach can be used to develop a class of splitting-test objects that have a very broad range of applicability. In particular, splitting-test objects can be used within generalized tree structures to allow multiway splits to be defined based on any computational method for defining data segments. For example, as was discussed above in the context of FIG. 9, k-means clustering could be used to generate k data subsegments and, thereby, a k-way split. Each of the resulting nodes in the tree would then correspond to one of the k centroids generated by the k-means clustering process. The splitting test would then consist of calculating the distance of the test data point to each of the k centroids and then following the branch of the tree that corresponds to the closest centroid.

When implementing generalized tree structures on a computer, it is beneficial to employ object-oriented programming techniques to represent each node as an object. The data component of a node object should comprise a list of references (e.g., pointers, index numbers, etc.) to the parent nodes of the node object (if any), a list of alternative decompositions of the node object (if any), a list of references (e.g., pointers, index numbers, etc.) to the node(s) from which the node object was originally generated (if any), and a reference (e.g., pointer, index number, etc.) to a predictive model object that is associated with the node object. Note that by maintaining references to both the parents and the children of each node object, the entire tree can be traversed starting at any node in the tree.

Each alternate decomposition of a node object should comprise a list of references (e.g., pointers, index numbers, etc.) to the child nodes of the decomposition. Alternative decompositions generated via top-down splitting should also comprise the splitting tests that define the data segments that correspond to the child nodes. Bottom-up merging, on the other hand, would result in decompositions in which child nodes are merged to produce parent nodes. Therefore, splitting tests would not be associated with these decompositions.

The list of nodes from which a node object was originally generated would be empty for the root node. For a node object generated via top-down splitting, the list would comprise the parent node from which the node object was generated. For a node object generated via bottom-up merging, the list would comprise the child nodes that were merged to produce the node object. Note that, by construction, if the list of nodes from which a node object was originally generated contains only a single node, then that node object was generated via top-down splitting. If two or more nodes appear in the list, then that node object was generated via bottom-up merging.

Without loss of generality, only a single model object need be associated with a node object. A single model objects can be configured to explore several alternate models, thereby eliminating the need to explicitly represent alternate models within a node. However, as discussed below, model objects do need to provide information about the predictive accuracies of the alternate models contained within them in order to prune generalized trees.

Figure 15:
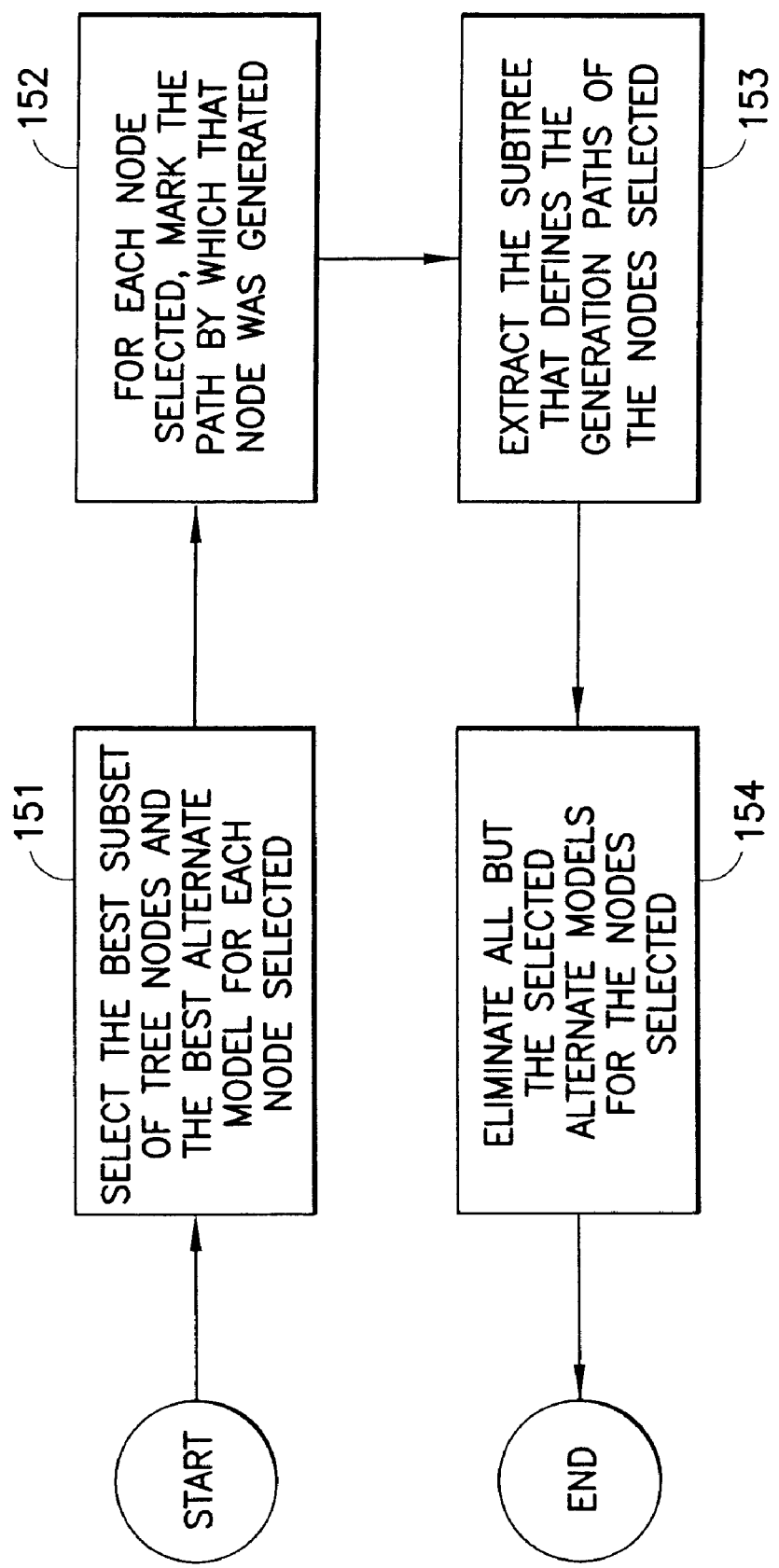
FIG. 15 illustrates an embodiment of block 42 of FIG. 4.

FIG. 15 shows an embodiment of block 42 of FIG. 4. FIG. 15 illustrates a four step process for pruning a generalized tree so as to optimize the predictive accuracy of the resulting segmentation-based model. Block 151 shows the first step which is to select the best subset of nodes from the generalized tree and the best alternative model for each node selected. Because the nodes in a generalized tree correspond to data segments, block 151 must select a subset of nodes that represent a collection of mutually exclusive and exhaustive data segments.

Two embodiments of block 151 are disclosed below. Because block 151 can have different embodiments, it is beneficial to use object-oriented programming techniques to implement a general tree-pruning object base class together with two or more derived classes that implement the different embodiments of block 151. Each embodiment has several optional variations which could be implemented as distinct derived classes. This object-oriented approach enables one to readily switch from using one embodiment, or a variation thereof, to another embodiment simply by switching from one tree-pruning object to another tree-pruning object of a different derived class. This approach also permits other unforseen embodiments of block 151 to be readily employed.

Once tree nodes and alternative models have been selected at block 151, the generalized tree should be transformed to produce a final segmentation-based model. This transformation is accomplished by blocks 152, 153, and 154 of FIG. 15.

Block 152 shows the first step of the transformation process, which is to mark the path by which each of the selected nodes were generated. This step is accomplished traversing the tree from each selected node backward to the root node by following the lists of references to the nodes from which each node in the tree was originally generated. As previously discussed, these lists of references should be stored in the data component of each node object.

To illustrate the traversal process, suppose that nodes 144, 147, and 149 of FIG. 14 were selected at block 151 of FIG. 15. In traversing the tree from node 144 to the root node 141, first node 142 would be visited, then node 141. The reason is that node 144 was generated from node 142 via top-down splitting, and node 142 was generated from node 141 via top-down splitting. Similarly, in traversing the tree from node 147 to the root node 141, first node 143 would be visited, then node 141. In the case of node 149, two paths would be traversed because node 149 was generated from nodes 145 and 146 via bottom-up merging. Along one path, first node 145 would be visited, then node 142, and finally root node 141. Along the other path, first node 146 would be visited, then node 143, and finally root node 141.

While traversing the paths from the selected nodes to the corresponding root nodes, block 152 also calls for the paths to be marked. Marking is accomplished by storing information with each node visited on how to traverse the paths in reverse direction from the root node to the appropriate selected node. The nature of this information depends on whether a node is generated via top-down splitting or bottom-up merging.

If, during a traversal, node A is visited and then node B because node A was originally generated from node B via top-down splitting, then node B would be marked with the splitting test that generated node A together with references to the child nodes that correspond to the outcomes of the splitting test. To traverse the path in the reverse direction, one would first apply the splitting test associated with node B and then visit the child node that corresponds to the outcome of the test, one of these child nodes being node A.

If, on the other hand, node A was originally generated from node B via bottom-up merging, node B would be marked only with a reference to node A without an associated splitting test. To traverse the path in the reverse direction in this case, one would simply visit node A immediately after visiting node B.

Note that to permit such marking to take place, the data component of a node object should also comprise one or more additional data elements for storing the above information.

Note also that if a node is visited that has already been marked, then no further traversal along that path is needed and the process can continue to the next path, if any.

To illustrate the traversal process, suppose once again that nodes 144, 147, and 149 of FIG. 14 were selected at block 151 of FIG. 15. In traversing the tree from node 144 to the root node 141, node 142 would be marked with references to nodes 144 and 145 together with the splitting test whose outcomes correspond to these nodes. Similarly, root node 141 would be marked with references to nodes 142 and 143 together with the corresponding splitting test. In traversing the tree from node 147 to the root node 141, node 143 would be marked with references to nodes 146 and 147 together with the corresponding splitting test. Root node 141 would be visited next, but it is already marked and there is no need to mark it again with the same information. In traversing one of the paths from node 149 to root node 141, node 145 would be marked with a reference to node 149 but with no associated splitting test. Node 142 would be visited next, but it is already marked, so no further marking along that path is needed. Along the other path, node 146 would also be marked with a reference to node 149 with no associated splitting test. Node 143 would then be visited next, but it too is already marked, so no further marking along that path is needed.

After marking the generation paths for the selected nodes at block 152 of FIG. 15, the subtree that consists only of the generations paths is extracted from the generalized tree at block 153 of FIG. 15. One method for extracting the subtree is to eliminate all nodes from the generalized tree that either are not marked or are not one of the selected nodes, and to eliminate all lists of references to parent nodes and all lists of alternative decompositions of nodes. In addition, all references to predictive model objects in the marked nodes (but not the selected nodes) should be eliminated. The remaining information should therefore comprise the traversal information that was stored during the marking process, the generation information that was traversed during the marking process, and references to predictive model objects in the nodes selected at block 151. This is precisely the information needed to traverse the subtree in order to generate predictions.

An alternative method for extracting the generation subtree is to create a new generalized tree structure that contains only the above information without modifying the original generalized tree.

Figure 16:
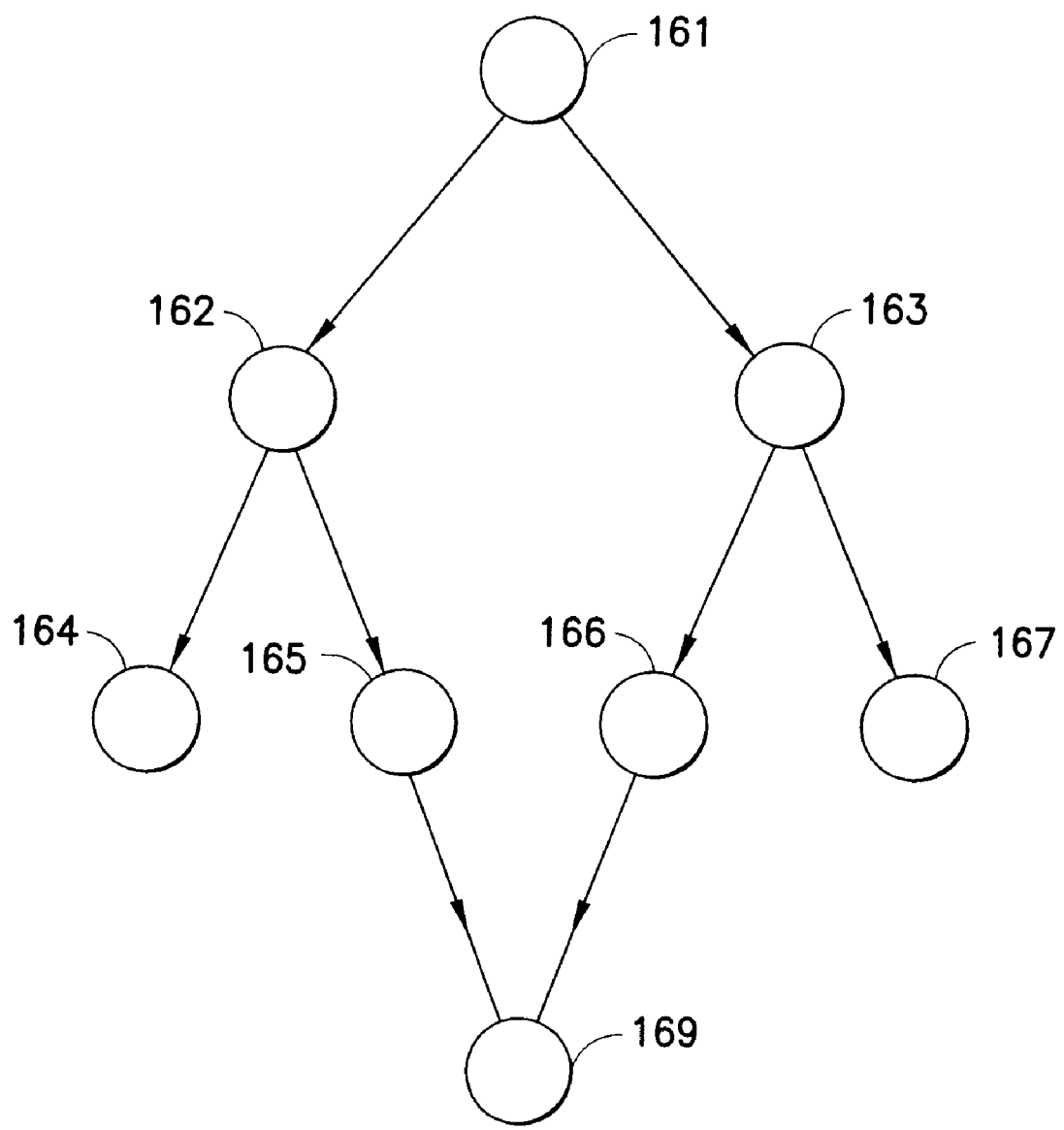
FIG. 16 illustrates the generalized tree structure that results when the process illustrated in FIG. 15 is applied to the generalized tree structure shown in FIG. 14 when the selected subset of nodes consists of nodes 144, 147, and 149.

An example of an extracted subtree is shown in FIG. 16. This subtree was obtained from the generalized tree shown in FIG. 14 assuming that nodes 144, 147, and 149 are the selected nodes. Nodes 161 through 167 of FIG. 16 correspond respectively to nodes 141 through 147 of FIG. 14, while node 169 corresponds to node 149. In FIG. 16, the links now represent the generation paths identified at block 152 of FIG. 15.

The final step of the pruning process is performed at block 154 of FIG. 15. This step eliminates all but the selected alternate models associated with the nodes selected at block 151. This step can be accomplished by using a suitably defined interface function for model objects to inform the associated model objects which of the alternate models has been selected at each node.

In order to perform the step at block 151 of FIG. 15 of selecting a subset of nodes and corresponding alternate models, information needs to be supplied by the predictive model objects that are associated with each node regarding the predictive accuracies of the alternate models that are contained within these model objects. An example of the information that needs to be supplied is shown in Table 3 below. This information can be supplied by implementing an interface function for model objects that returns a vector of predictive accuracy objects, where each predictive accuracy object in the vector corresponds to a row of information such as that illustrated in Table 3. Alternate types of interface functions are also possible for accessing such information.

TABLE 3

An example of the predictive accuracy information that is needed from each model object in a generalized tree structure in order to prune the tree so as to optimize overall predictive accuracy.

| ModNum | DegFree | TrainFit | ValFit | ValPts | ValVar |
|---|---|---|---|---|---|
| 1 | 1 | 100.0 | 110.0 | 20 | 121.0 |
| 2 | 2 | 50.0 | 60.0 | 20 | 36.0 |
| 3 | 3 | 10.0 | 80.0 | 20 | 64.0 |

In Table 3, the values of ModNum are examples of index numbers of alternative models that are contained within a model object. The index numbers need to be unique within a model object, but not across model objects. In this illustrative example, ModNum's are numbered sequentially beginning at one for each model object.

In the embodiment specified above for block 154 of FIG. 15, the ModNum's of the selected alternative models would be passed as arguments to appropriate model object interface functions in order to specify to the corresponding model objects which of their alternative models have been selected. The model objects would then respond to these function calls by eliminating all other alternative models that are contained within them.

The values of DegFree in Table 3 are used in one of the embodiments for block 151 of FIG. 15 presented below. The DegFree values are used in this embodiment to establish a preference ordering over all possible selections of nodes within a generalized tree and all possible selections of alternative models for each combination of selected nodes. The preference ordering is then used as a basis for making a final selection of nodes and alternative models so as to optimize the predictive accuracy of the resulting segmentation-based model.

For the purpose of building a preference ordering, the DegFree values should be positive integers. No other requirements are imposed. However, from a predictive modeling standpoint, the DegFree values should reflect the effective number of degrees of freedom that were utilized in fitting the corresponding alternative models to the training data that was presented to the corresponding model objects. The degrees of freedom can be measured classically in terms of the number of free parameters used in the model, or in terms of VC-dimension, Pollard pseudo-dimension, or some similar measurement (see, for example, Vapnik, 1998, cited above; Devroye, Gyorfi, and Lugosi, 1996, cited above). If Bayesian methods are used to impose a prior probability distribution over subsets of tree nodes and alternative models, then DegFree can be measured as the negative logarithm of the prior probability of the corresponding alternative model, with the negative logarithm scaled and rounded to the nearest integer.

The TrainFit values in Table 3 are the degrees of fit of the corresponding alternative models with respect to the training data that was presented to the corresponding model objects. Smaller degree-of-fit values indicate better fits to the training data. TrainFit is used in the same embodiment for block 151 of FIG. 15 in which DegFree is used. It is beneficial for each TrainFit value to correspond to the negative log-likelihood of the training data with respect to the corresponding alternative model.

The ValFit values in Table 3 are the degrees of fit of the corresponding alternative models with respect to the validation data that was presented to the corresponding model objects. Smaller degree-of-fit values indicate better fits to the validation data. ValFit is used in all three embodiments for block 151 of FIG. 15 presented below. It is beneficial for each ValFit value to correspond to the negative log-likelihood of the validation data with respect to the corresponding alternative model.

Alternatively, the ValFit values can be the values of TrainFit with adjustments made to compensate for the effective degrees of freedom that were utilized in fitting the corresponding alternative models to the training data. For example, if Bayesian modeling methods are employed, then the adjustment might be to add the negative logarithms of the prior probabilities of the alternative models to the corresponding TrainFit scores. Such an approach would be required if all available data were used for training without holding any data aside for validation purposes. However, when large volumes of data are available, holdout validation data provides a highly robust basis for assessing predictive accuracy.

The ValPts values in Table 3 are counts of the number of validation data records that were presented to the corresponding model objects. ValPts therefore has the same value for all alternative models of a given model object; however, the ValPts values will generally differ between model objects constructed for different data segments. ValPts is used in a variant of one of the embodiments for block 151 of FIG. 15 presented below. ValPts is used when confidence intervals are calculated for the degrees of fit of the resulting segmentation-based models.

Each ValVar value in Table 3 is the sum of the squared differences between the ValFit values obtained on each validation data record for the corresponding alternative model and the average of these ValFit values. Thus, if n validation data records were presented to a model object, and if alternative model i of that model object produced degree-of-fit scores $v_{i1}, \ldots, v_{in}$ for those n validation records, then the value of ValPts would be n, the value of ValFit for alternate model i would be $$ValFit_i = \sum_{j=1}^{n} v_{ij},$$

and the value of ValVar for alternate model i would be $$ValVar_i = \sum_{j=1}^{n} (v_{ij} - \overline{v_i})^2,$$

where $$\overline{v_i} = \frac{1}{n}\sum_{j=1}^{n} v_{ij}.$$

As with ValPts, ValVar is used only when calculating confidence intervals for the expected predictive accuracies (i.e., degrees of fit) of the resulting segmentation-based models on the validation data.

A first embodiment for block 151 of FIG. 15 is now disclosed. This embodiment selects a subset of tree nodes and alternative models for each selected node so as to minimize the sum of the ValFit values for the selected alternative models. This embodiment is a generalization of reduced error pruning (see, for example, J. R. Quinlan, "Simplifying decision trees," *International Journal of Man-Machine Studies*, Vol. 27, pp 221-234, 1987; J. R. Quinlan, *C4.5: Programs for Machine Learning*, Morgan Kaufmann Publishers, San Mateo, Calif., 1993). The embodiment differs from the known method of reduced error pruning by considering alternative models for each node in the tree, whereas the known method assumes that exactly one model has been constructed for each node. The embodiment disclosed below also differs in that it optimizes a more general measure of predictive accuracy (i.e., ValFit), whereas the known method of reduced error pruning simply optimizes the number of incorrect predictions that were made on a holdout validation data set. It is also appropriate to use the embodiment disclosed below when all available data is used for training and the ValFit scores are derived from the TrainFit scores using suitable adjustments for the degrees of freedom that are utilized, such as Bayesian adjustments in which negative logarithms of prior probabilities are added to the TrainFit scores. By contrast, reduced error pruning presumes that a holdout set of validation data is available. The aforementioned improvements to the known method of reduced error pruning are therefore distinguishing features of the present invention.

Figure 17:
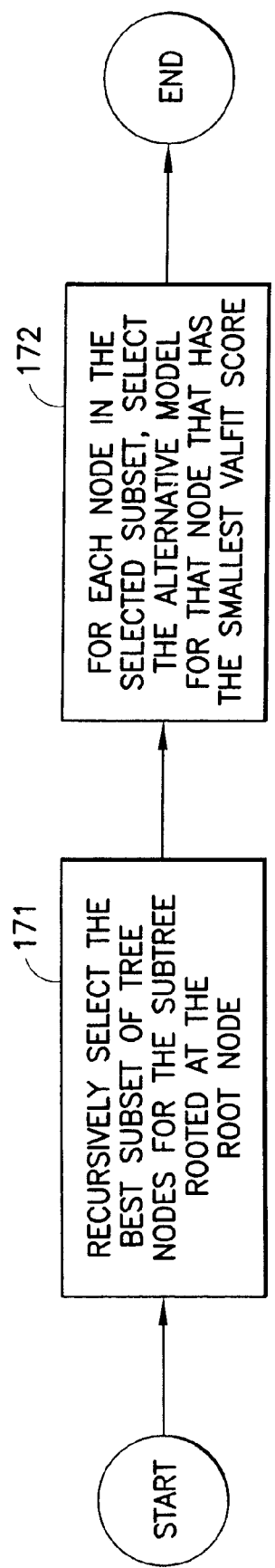
FIG. 17 illustrates an embodiment of block 151 of FIG. 15.

FIG. 17 illustrates a first embodiment for block 151 of FIG. 15. Block 171 shows the first step of the process, which is to recursively traverse the generalized tree beginning at the root node to identify the best subset of tree nodes. The next step, as shown in block 172, is to select the best alternative model for each tree node in the best subset of nodes. The best alternative model for a node according to this embodiment is the one that minimizes the ValFit score for the alternative models associated with the node. As discussed above, the selection can be accomplished by passing the ModNum's of these best alternative models to the corresponding model objects using appropriate model object interface functions. The model object interface functions then modify the internal states of the model objects to record the selection of the best alternative models.

Figure 18:
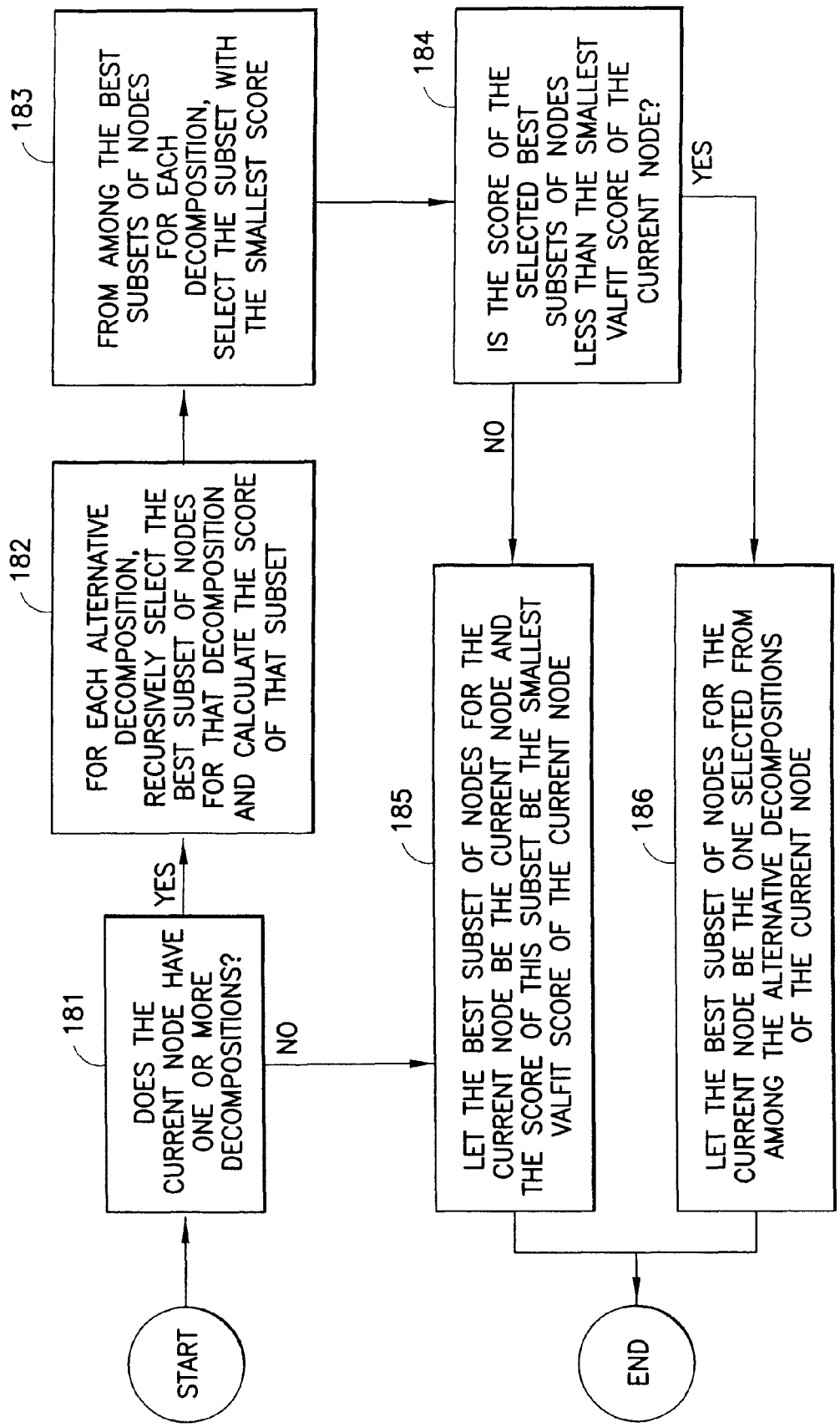
FIG. 18 illustrates an embodiment of block 171 of FIG. 17.

FIG. 18 illustrates an embodiment for block 171 of FIG. 17. The process illustrated in FIG. 18 is recursive in that is eventually applied to each node in a generalized tree as that tree is traversed. When the process is first invoked at block 171, the "current node" mentioned in FIG. 18 initially refers to the root node. When the process is subsequently applied to each successive node in the tree, the "current node" will then refer to that successive node in the context in which that successive node is being considered. The process can thus be implemented as a recursive procedure in a programming language that supports recursion, such as C++ or Java.

The first step of the process illustrated in FIG. 18 is to determine whether the current node has one or more decompositions, as exemplarily demonstrated in block 181. If it does not, then it is a leaf node of the tree and the process proceeds to block 185. At block 185, the best subset of tree nodes for the subtree rooted at the current node is set to be the current node itself. The score for this subset of tree nodes is set to the smallest ValFit score from among the alternative models that are defined by the model object associated with the current node.

If instead the current node is not a leaf node, then is has one or more alternative decompositions and the process proceeds to block 182. At block 182, the alternative decompositions are recursively traversed to determine the best subset of tree nodes for each decomposition and the corresponding scores for those subsets. A process for recursively traversing a decomposition is disclosed in detail below.

Once all alternative decompositions of the current node have been recursively traversed and the best subset of nodes for each decomposition has been determined, the subsets are then examined at block 183 and the one with the smallest score is selected.

At block 184, the score of the best subset of nodes determined at block 183 is compared to the smallest ValFit score from among the alternative models that are defined by the model object associated with the current node.

If the best subset of nodes has a smaller score, the process proceeds to block 186. At block 186, the best subset of nodes for the subtree rooted at the current node is set equal to the best subset of nodes determined at block 183.

If, on the other hand, the best subset of nodes determined at block 183 has a score that is greater than or equal to the smallest ValFit score, then the process instead proceeds to block 185. At block 185, the best subset of nodes for the subtree rooted at the current node is set equal to the current node and the score of this subset is set equal to the smallest ValFit score.

Figure 19:
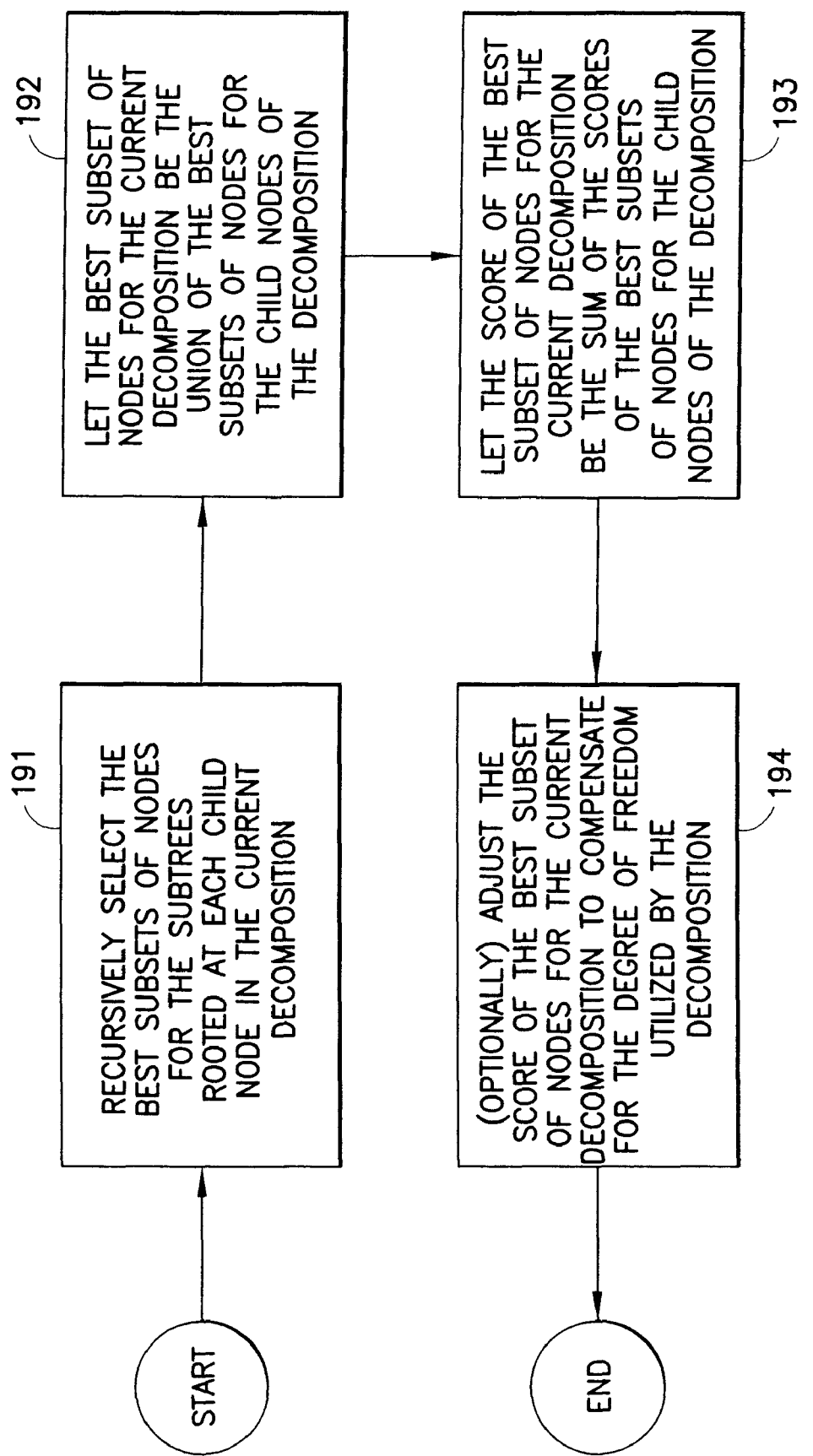
FIG. 19 illustrates an embodiment of block 182 of FIG. 18.

FIG. 19 shows an embodiment of block 182 of FIG. 18 for recursively traversing a decomposition to determine the best subset of tree nodes and the corresponding score for that decomposition. The process begins at block 191 with the step of recursively selecting the best subsets of nodes and corresponding scores for the subtrees rooted at each of the child nodes of the current decomposition. An embodiment for the process of performing this recursive calculation at a child node is precisely the process shown in FIG. 18 as disclosed above. Specifically, the process shown in FIG. 18 is invoked for each child node of the current decomposition. For each such invocation, the corresponding child node becomes the "current node" recited in FIG. 18. Thus, the processes shown in FIGS. 18 and 19 are mutually recursive in that each process invokes the other.

Once the best subsets of nodes and corresponding scores for the subtrees rooted at each of the child nodes of the current decomposition are determined block 191, the process shown in FIG. 19 continues to block 192, at which point the best subset of nodes for the current decomposition is set equal to the union of the best subsets of nodes of the child nodes of the current decomposition. Continuing to block 193, the score of the best subset of nodes for the current decomposition is set equal to the sum of the scores corresponding to the best subsets of nodes of the child nodes of the decomposition.

The final step at block 194 of the process is optional. This step adjusts the score of the best subset of nodes for the current decomposition so as to compensate for the degrees of freedom utilized by the decomposition. For example, if Bayesian modeling methods are being employed, one possible adjustment would be to add the negative logarithm of the prior probability of the decomposition to the score of the decomposition. Such adjustments would be required if all available data were used for training without holding any data aside for validation purposes. On the other hand, if holdout validation data is employed to calculate the ValFit scores utilized at block 185 of FIG. 18, then the process step at block 194 is not required.

The above embodiment of block 151 of FIG. 15, as illustrated in FIGS. 17-19, selects the subtree of a generalized tree that yields the smallest possible value for the sum of the resulting ValFit scores from among all possible subtrees of the generalized tree. The process is highly efficient in that it visits each alternative decomposition in a generalized tree exactly once and only a minimal amount of processing is required for each alternative decomposition.

However, the number of possible subtrees can be exponential in the number of decompositions in a tree. Because the above embodiment of block 151 of FIG. 15 minimizes the sum of the ValFit scores over all possible subtrees, and because there can be exponentially many such subtrees, there is a tendency for the above embodiment to overfit the validation data if the volume of validation data is small relative to the number of possible subtrees.

An alternative to minimizing over all possible subtrees is to employ Vapnik's idea of structural risk minimization (for an extensive explanation of structural risk minimization see, for example, V. N. Vapnik, 1998, cited above; for a short introduction see, for example, E. P. D. Pednault, "Statistical learning theory," *The MIT Encyclopedia of the Cognitive Sciences*, pp. 798-801, MIT Press, 1999). For the purpose of the present invention, the idea of structural risk minimization can be applied by first dividing all subtrees and choices of alternative models for the leaves of those subtrees into groups according to the effective degrees of freedom utilized by the subtrees and alternative leaf models. Once the subtrees and alternative leaf models have been grouped, one subtree and one set of leaf models would then be selected from each group by making the selection so as to minimize the resulting TrainFit score. The ValFit scores of the selected subtrees and alternative leaf models would then be compared to make a final selection. The selection would be made either by directly minimizing the resulting ValFit score, or by minimizing the ValFit score after certain adjustments are made to the ValFit scores to take into account the estimation errors of the ValFit scores and the fact that multiple models are being compared. Estimation errors can be taken into account using statistical confidence intervals. The adjustments that are made to the confidence intervals then amount to Bonferroni corrections (see R. G. Miller, *Simultaneous Statistical Inference*, Second Edition, Springer-Verlag, 1981).

When the volume of holdout validation data is small relative to the number of subtrees, the above approach for pruning generalized trees can produce significantly better results than the process illustrated in FIGS. 17-19. The number of subtrees and alternative leaf models that are compared based on their ValFit scores is linear in the size of the tree being pruned instead of exponential in the size of the tree. Because fewer comparisons are made, the chance of overfitting the validation data is greatly reduced. Incorporating Bonferroni corrections further reduces the possibility of overfitting.

Figure 20:
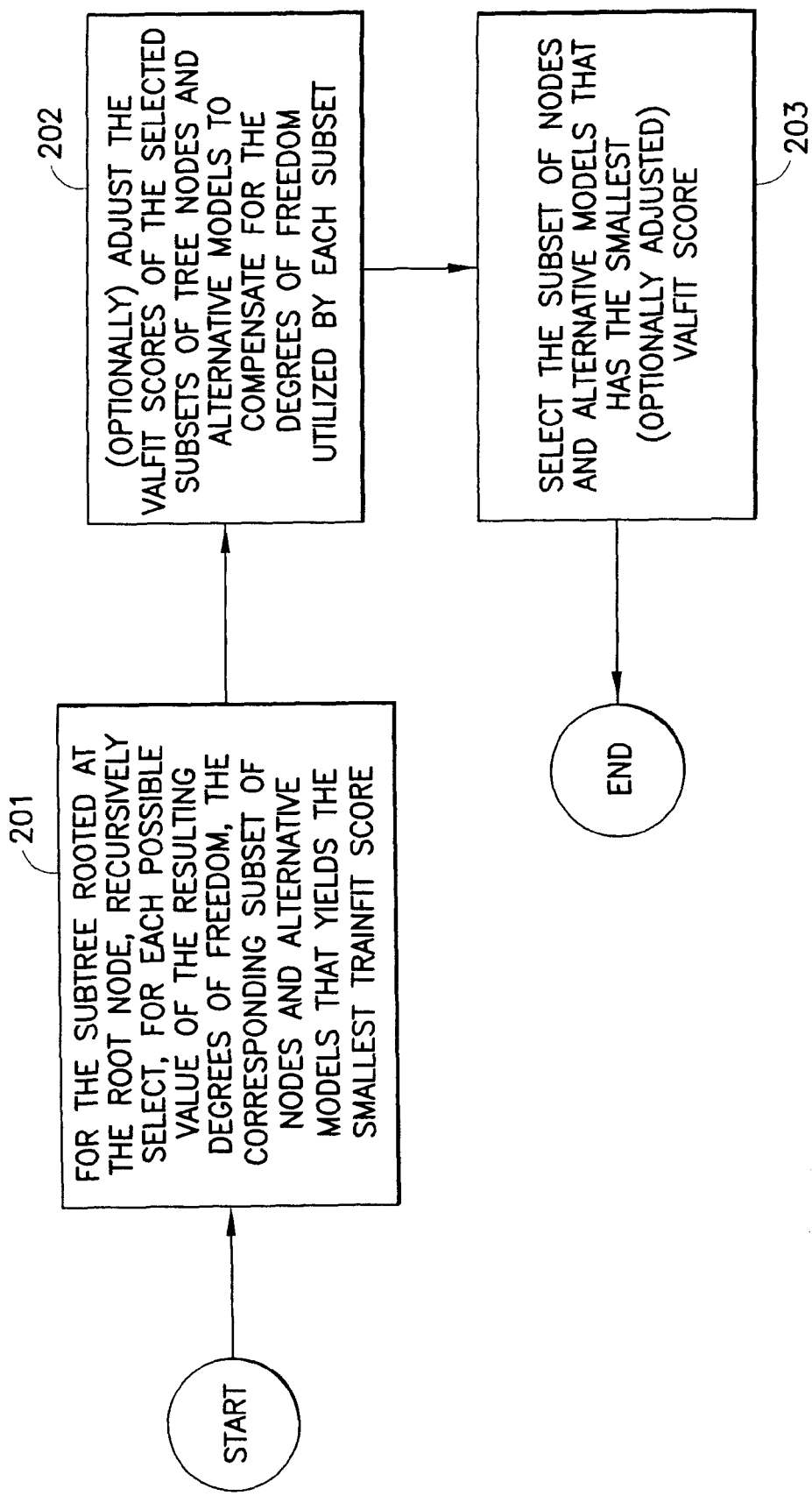
FIG. 20 illustrates a second embodiment of block 151 of FIG. 15.

FIG. 20 illustrates a second embodiment of block 151 of FIG. 15 that employs the above approach for pruning generalized trees. A distinguishing aspect of this second embodiment of block 151 is that it is the first process to apply the theoretical principle of structural risk minimization to tree-based models with multivariate models in the leaves of the trees, wherein the leaf models can vary with respect to their effective degrees of freedom. Moreover, the process is applicable to generalized trees, not just decision trees. Some known pruning methods also use structural risk minimization to prune conventional decision trees (see, for example, M. Kearns and Y. Mansor, "A fast, bottom-up decision tree pruning algorithm with near-optimal generalization," *Proceedings of the 15th International Conference on Machine Learning*, pp 269-277, Morgan Kauffmann Publishers, San Francisco, 1998; M. Bohanec and I. Bratko, "Trading accuracy for simplicity in decision trees," *Machine Learning*, Vol. 15, pp 223-250, 1994). However, all such known methods consider only leaf models with fixed degrees of freedom, whereas the present invention considers alternative leaf models that vary with respect to their effective degrees of freedom.

Moreover, none of the known methods for pruning decision trees consider leaf models with varying degrees of freedom. Nor do these known methods consider balancing both effective degrees of freedom of tree splits together with the effective degrees of freedom of the leaf models. The processes illustrated in FIGS. 17-19 and in FIG. 20 are unique in both respects.

The second embodiment of block 151 of FIG. 15 begins at block 201 of FIG. 20. At block 201, a generalized tree is recursively traversed in order to group subtrees (i.e., subsets of nodes) and alternative models according to the degrees of freedom utilized, and to simultaneously select one subset of nodes and alternative models from each group so as to minimize the resulting TrainFit score for each selection. The degrees of freedom of each subset of nodes and alternative models are calculated based on the DegFree values of the alternative models as illustrated in Table 3, and on optional adjustments that reflect the degrees of freedom of the resulting segmentation.

The results of block 151 can be represented in tabular form as illustrated in Table 4 below. In this example, selected subsets of nodes and associated alternative models are represented as sets of ordered pairs. Each order pair comprises a reference (i.e., a pointer, index number, etc.) to a node in the tree being pruned together with a corresponding model number that identifies one of the alternative models for that node. Node references are illustrated in Table 4 as letters. Model numbers identify alternative models that are contained within the model objects associated with the nodes, as previously discussed in the context of Table 3 above.

TABLE 4

An example of grouping subsets of nodes and alternative models according to the degrees of freedom utilized and then selecting one subset of nodes and alternative models from each group so as to minimize the resulting TrainFit score for each selection.

| DegFree | TrainFit | ValFit | ValPts | ValVar | Nodes & ModNums |
|---------|----------|--------|--------|--------|-----------------|
| 1 | 120.4 | 110.1 | 100 | 50.3 | <a, 1> |
| 2 | 94.7 | 80.2 | 100 | 55.6 | <a, 2> |
| 3 | 88.2 | 71.3 | 100 | 53.1 | <b, 1>; <c, 2> |
| 4 | 67.1 | 70.5 | 100 | 52.5 | <b, 1>; <d, 2>; <e, 1> |
| 5 | 55.9 | 77.9 | 100 | 58.9 | <b, 2>; <d, 2>; <e, 1> |
| 6 | 42.6 | 83.4 | 100 | 61.4 | <b, 2>; <d, 2>; <e, 2> |

Figure 21:
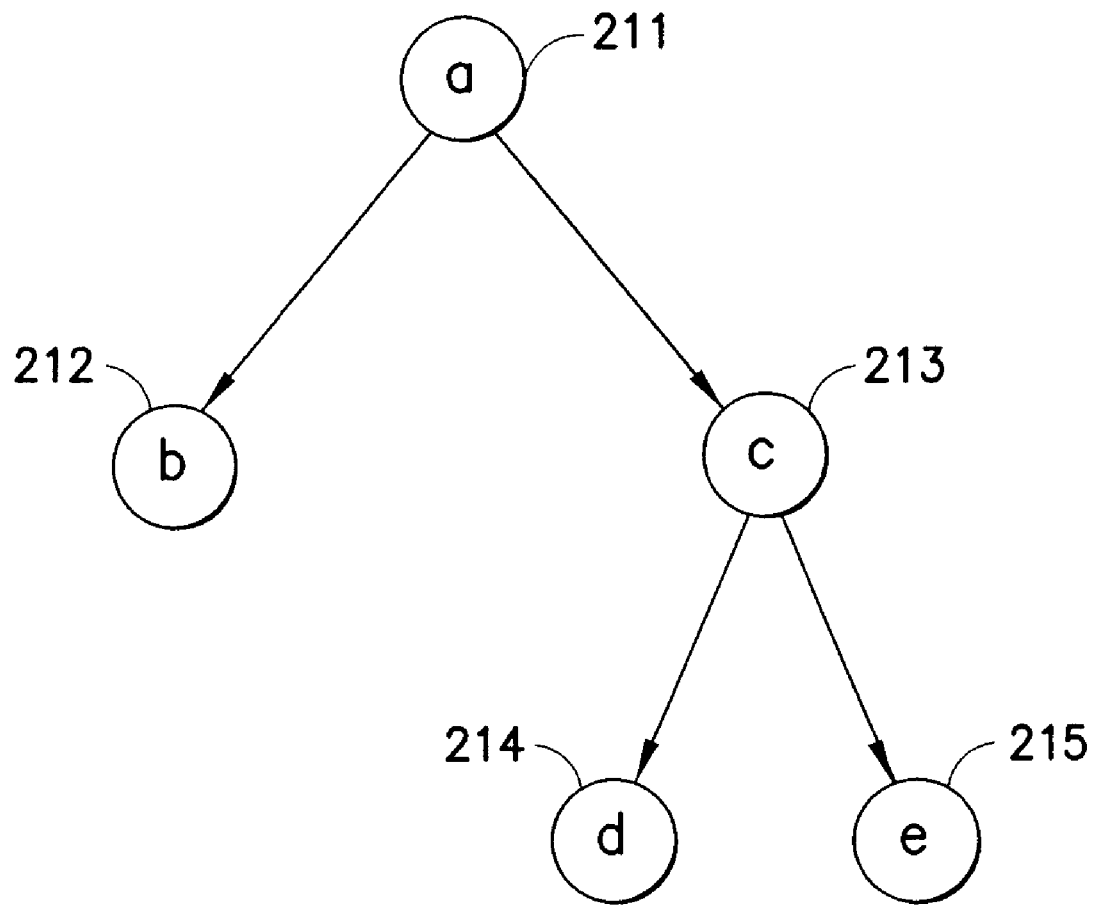
FIG. 21 illustrates a tree structure that corresponds to the subsets of nodes listed in Table 4.

FIG. 21 illustrates a tree structure that corresponds to the subsets of nodes listed in Table 4. Nodes 211, 212, 213, 214, and 215 in FIG. 21 correspond, respectively, to nodes a, b, c, d, and e in Table 4. As per the example in Table 4, all nodes in FIG. 21 have associated model objects that contain two alternative models each.

In addition to representing subsets of nodes and alternative models, Table 4 also illustrates that each subset of nodes and alternative models has associated values for:

1) the degrees of freedom utilized by the subset (as illustrated by the DegFree column),
2) the degree of fit score of the subset on the training data (as illustrated by the TrainFit column),
3) the degree of fit score of the subset on the validation data (as illustrated by the ValFit column),
4) the number of validation data records (as illustrated by the ValPts column), and
5) the sum of squared differences between the validation scores of each individual validation data record and the mean validation score obtained by dividing ValFit by ValPts (as illustrated by the ValVar column).

Once the method step at block 201 has been performed, the process illustrated in FIG. 20 continues on to block 202 and then to block 203. At block 202, the ValFit scores obtained at block 201 (as illustrated above in Table 4) are optionally adjusted to compensate for the degrees of freedom utilized in selecting a final subset of nodes and alternative models at block 203. If this optional adjustment is not performed, then the final selection of a subset of nodes and alternative models is made at block 203 by selecting the subset with the smallest ValFit score from the output of block 201. For example, if the output of block 201 is given by Table 4, then the subset $\langle b,1 \rangle; \langle d,2 \rangle; \langle e,1 \rangle$ that has a ValFit score of 70.5 would be selected. If, on the other hand, optional adjustments are made to the ValFit scores at block 202, then the final selection of a subset at block 203 is based on the adjusted ValFit scores.

A beneficial method for adjusting the ValFit scores is based on Vapnik's principle of structural risk minimization (see, for example, V. N. Vapnik, 1998 cited above). The adjustments are appropriate only when the ValFit scores are calculated using hold out data. Because the ValFit scores are statistical estimates of model quality, statistical confidence intervals for the true expected values of the ValFit scores can be calculated and the final selection of a subset of nodes and alternative models at block 203 can be made based on the upper bounds of these confidence intervals. In accordance with Vapnik's principle of structural risk minimization, the bounds of the confidence intervals are adjusted to compensate for the number of models being compared when the number of such models is finite, which is the case for the process shown in FIG. 20. Thus, one possible method of adjusting the ValFit scores at block 202 is to replace the ValFit scores with adjusted upper confidence bounds for the true expected value of the ValFit scores.

It should be noted that Vapnik also considers analogous adjustments when selecting a single model from an infinite family of models; however, such a selection is not being performed by the process of FIG. 20. At block 201, subsets of nodes and alternative models are selected by minimizing the corresponding TrainFit scores for different degrees of freedom. The output is a finite table of subsets and their corresponding degrees of freedom and scores. A final selection made from among these subsets at blocks 202 and 203 based on ValFit scores that are calculated using separate hold out data. A statistical adjustment of the confidence bounds based on a finite number of comparisons is therefore appropriate.

Confidence bounds are calculated with respect to a given confidence level defined as the probability p that the actual expected value exceeds the upper bound u(p). Thus, a p-value of 0.1 means that there is a 10% chance that the actual expected value of the ValFit score exceeds the upper bound u(p). Stated another way, a p-value of 0.1 likewise means that there is a 90% chance that the actual expected value is less than or equal to the upper bound.

When selecting from among a finite collection of subsets of nodes and alternative models, upper bounds on the ValFit scores need to be calculated such that the probability of exceeding one or more of the upper bounds is no more than the desired p-value. The adjusted upper bounds are calculated using what is known as the union bound, or Bonferroni bound, which may be expressed as $$Pr\{E[ValFit_1] > u_1(p) \text{ or } \cdots \text{ or } E[ValFit_k] > u_k(p)\} \leq$$

$$\sum_{i=1}^{k} Pr\{E[ValFit_i] > u_i(p)\} = kp,$$

where $ValFit_i$ is the ValFit score of the i'th row of the output table of block 201 when the table is sorted in order of increasing degrees of freedom, where $E[ValFit_i]$ is the expected value of $ValFit_i$, and where $u_i(p)$ is the upper-bound on the expected value of $ValFit_i$ given a confidence p-value of p. Note that the above equation can be rewritten as $$Pr\left\{E[ValFit_1] > u_1\left(\frac{p}{k}\right) \text{ or } \cdots \text{ or } E[ValFit_k] > u_k\left(\frac{p}{k}\right)\right\} \leq p.$$

This second equation implies that, when selecting from among a collection of k subsets of nodes and alternative models, the upper bounds of the confidence intervals of the ValFit scores should be calculated assuming an adjusted p-value of p/k.

According to Vapnik's method of structural risk minimization, the subsets of nodes and alternative models selected at block 201 of FIG. 20 should be examined in order of increasing degrees of freedom, with adjustments made to the upper bounds of the confidence intervals of the ValFit scores as each successive subset of nodes and alternative models is examined. The best subset of nodes and alternative models is the k*th model in the resulting sequence, where k* is given by $$k^* = \underset{k}{\operatorname{argmin}}\left(\underset{1 \leq i \leq k}{\operatorname{argmin}}\left[u_i\left(\frac{p}{k}\right)\right]\right) = \underset{k}{\operatorname{argmin}}\left[u_k\left(\frac{p}{k}\right)\right].$$

The selection of a best subset of nodes and alternative models according to the above equation can be accomplished by the process illustrated in FIG. 20 by first adjusting the ValFit scores at block 202 by replacing each ValFit score with the upper confidence bound u(p/k) calculated assuming a p-value of p/k, where k is the row number in the table produced by block 201 when the table is sorted in order of increasing values of DegFree, the first such row being row number one. A suitable value for p is 0.10. The best subset of nodes and alternative models according to the above equation will then be selected at block 203 by choosing the subset that has the smallest adjusted ValFit score.

One method for calculating upper bounds for confidence intervals of the ValFit scores is to assume that ValFit scores are sufficiently well-behaved from a statistical standpoint so that the central limit theorem can be applied to these scores. Under these conditions, the ratios of the differences between the ValFit scores and their expected values divided by the standard deviations of the ValFit scores will asymptotically converge to Student's t-distributions. The asymptotic value of u(p/k) under these conditions is therefore given by $$u\left(\frac{p}{k}\right) = ValFit + T\left(\frac{p}{k} \mid ValPts - 1\right) \cdot \sqrt{\left(\frac{ValPts}{ValPts - 1}\right) \cdot ValVar},$$

where T(p/k|ValPts−1) is the Student t-quantile corresponding to an upper-tail probability of p/k for ValPts−1 degrees of freedom. Specifically, T(p/k|ValPts−1) is the value of T such that $$\frac{p}{k} = \frac{\Gamma\left(\frac{ValPts}{2}\right)}{\sqrt{\pi(ValPts-1)} \cdot \Gamma\left(\frac{ValPts-1}{2}\right)} \cdot \int_T^\infty \left(1 + \frac{x^2}{ValPts - 1}\right)^{-\frac{ValPts}{2}} dx.$$

Efficient algorithms are known for performing the above calculation (see, for example, G. W. Hill, "ACM Algorithm 395: Student's t-distribution," Communications of the ACM, Vol. 13, No. 10, pp 617-619, 1970; and G. W. Hill, "ACM Algorithm 396: Student's t-quantiles," Communications of the ACM, Vol. 13, No. 10, pp 619-620, 1970).

It should be noted that the asymptotic upper bound u(p/k) defined above differs from the small sample bounds considered by Vapnik. Although small sample bounds can be used, the asymptotic bound presented above can be adequate when large amounts of data are available, which is often the case in many real-world data mining problems.

Note also that if a default value of zero is used for ValVar when ValVar is not calculated by a model object, then the value for u(p/k) given by the above equation is equal to ValFit. Thus, supplying a default value of zero for ValVar is equivalent to not performing the optional adjustment of ValFit at block 202. This default value is therefore recommended when model objects do not calculate ValVar.

Figure 22:
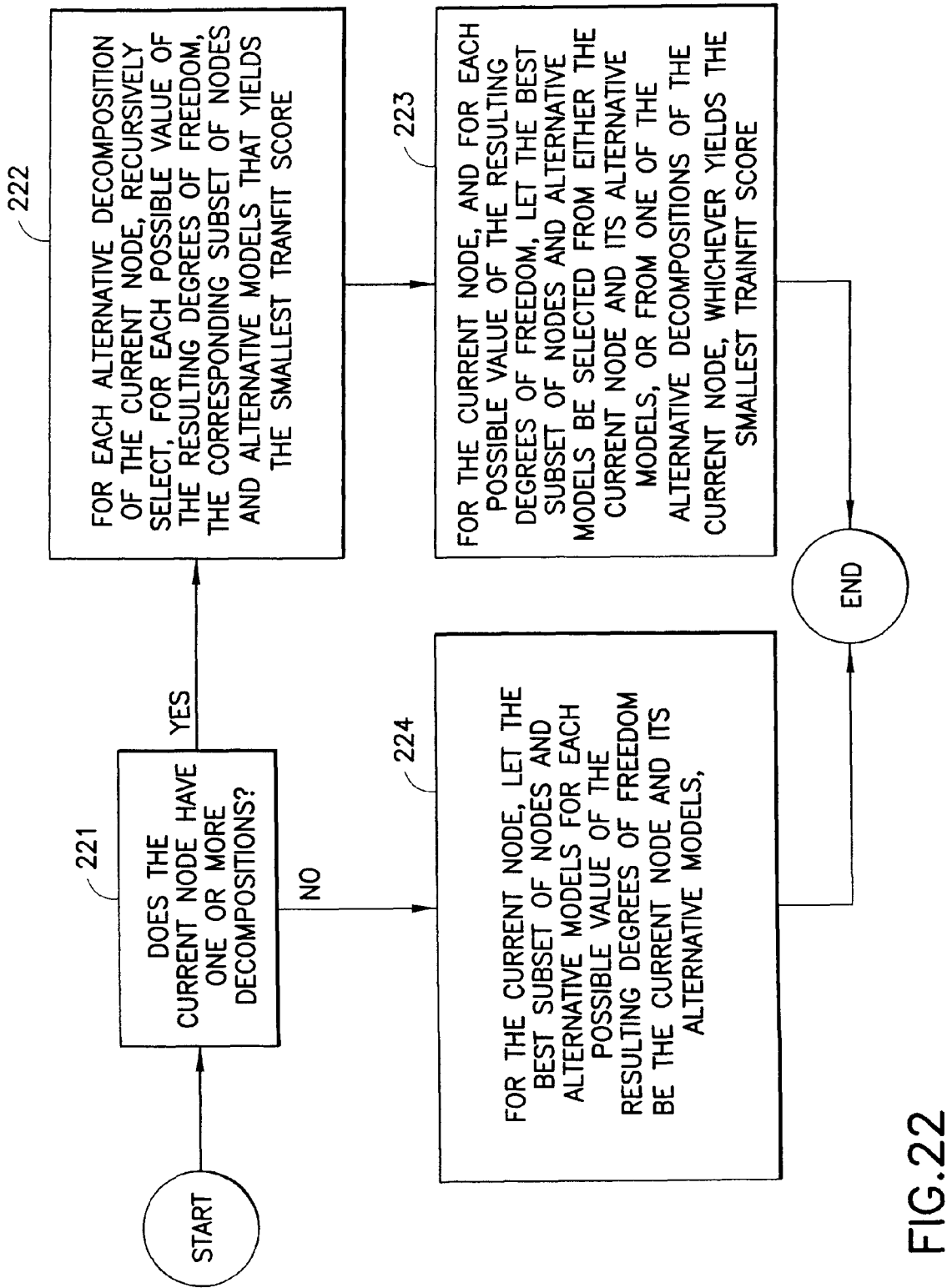
FIG. 22 illustrates an embodiment of block 201 of FIG. 20.

FIG. 22 shows an embodiment of block 201 of FIG. 20. The "current node" referred to in FIG. 22 is the tree node to which the process in FIG. 22 is currently being applied. Thus, when this process is first invoked at block 201 of FIG. 20, the "current node" refers to the root node of a generalized tree.

The first step of the process shown in FIG. 22 is to determine whether the current node has one or more decompositions. If it does not, then the current node is a leaf node and the process continues to block 224 of FIG. 22. At block 224, a table describing subsets of nodes and alternative models (such as that illustrated by Table 4) is constructed using information about the current node and its alternative models (such as that illustrated in Table 3). Thus, as an illustrative example, the information in Table 3 would be transformed into the format of Table 4 as illustrated below in Table 5. The table produced at block 224 thus specifies the subsets of nodes and alternative models for each possible value of the resulting degrees of freedom for the current node.

TABLE 5

An example showing how the information illustrated in Table 3 would be transformed into the format illustrated in Table 4. In this example, the current node is assumed to be node n.

| DegFree | TrainFit | ValFit | ValPts | ValVar | Nodes & ModNums |
|---------|----------|--------|--------|--------|-----------------|
| 1       | 100.0    | 110.0  | 20     | 121.0  | <n, 1>          |
| 2       | 50.0     | 60.0   | 20     | 36.0   | <n, 2>          |
| 3       | 10.0     | 80.0   | 20     | 64.0   | <n, 3>          |

If, at block 221, the current node does have one or more decompositions, then from block 221 the process continues to block 222. At block 222, tables describing subsets of nodes and alternative models (such as that illustrated by Table 4) are recursively constructed for each of the alternative decompositions of the current node.

At block 223, a similar table is constructed for the current node and its alternative models using the process described above for block 224. Next, the table thus constructed is combined with the tables constructed previously at block 222 to form a single table. These tables are combined by selecting, for each distinct value of DegFree that appears in one of the tables, the subset of nodes and alternative models from among all the tables that has the smallest TrainFit score for that value of DegFree. Thus, the rows of the resulting table will comprise a selection of rows from among the tables constructed from the current node and from its alternative decompositions. The rows specify the best subsets of nodes and alternative models for each possible value of the resulting degrees of freedom for the current node.

Figure 23:
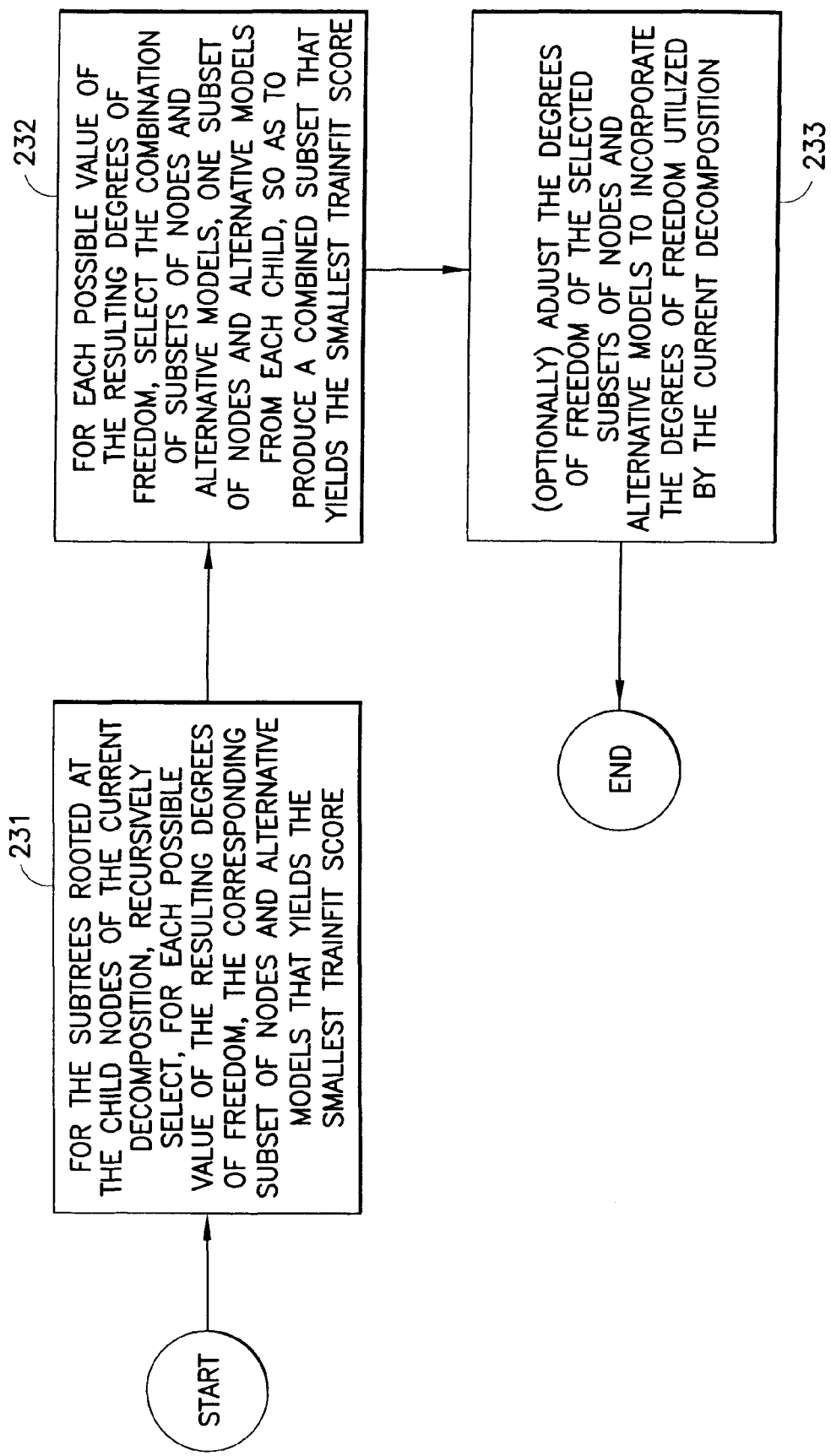
FIG. 23 illustrates an embodiment of block 222 of FIG. 22.

FIG. 23 shows an embodiment of block 222 of FIG. 22 for recursively selecting subsets of nodes and alternative models for a decomposition of a node. The process begins at block 231 by recursively selecting subsets of nodes and alternative models for each of the child nodes of the current decomposition. An embodiment of block 231 is illustrated in FIG. 22 described above. The processes shown in FIGS. 22 and 23 are therefore mutually recursive. The output of block 231 is a collection of tables such as that illustrated by Table 4, one such table for each child node of the current decomposition.

At block 232, these tables are combined into a single table by selecting combinations of subsets of nodes and alternative models, wherein each combination incorporates one subset of nodes and alternative models taken from each of the tables constructed at block 231. The degrees of freedom of each such combination is given by the sum of the degrees of freedom of the subsets of nodes and alternative models that make up the combination. Combinations are selected by choosing the subsets of nodes and alternative models taken from each of the tables constructed at block 231 so as to minimize the sum of their TrainFit scores over all possible combinations with the same resulting degrees of freedom. In addition, one combination is selected for each possible value of the resulting degrees of freedom. A process for performing these operations is disclosed below.

After the tables for the child nodes have been combined into a single table at block 232, the process continues at block 233 where the resulting degrees of freedom for the table entries are optionally adjusted to reflect the degrees of freedom utilized by the current decomposition. A suitable adjustment would be to add the logarithm, rounded to the nearest integer, of the Bonferroni correction factor for the decomposition. The calculation of such correction factors for decision trees is discussed by Biggs, de Ville, and Suen (see D. Biggs, B. de Ville, and E. Suen, "A method of choosing multiway partitions for classification and decision trees," *Journal of Applied Statistics*, Vol. 18, pp 49-62, 1991).

Figure 24:
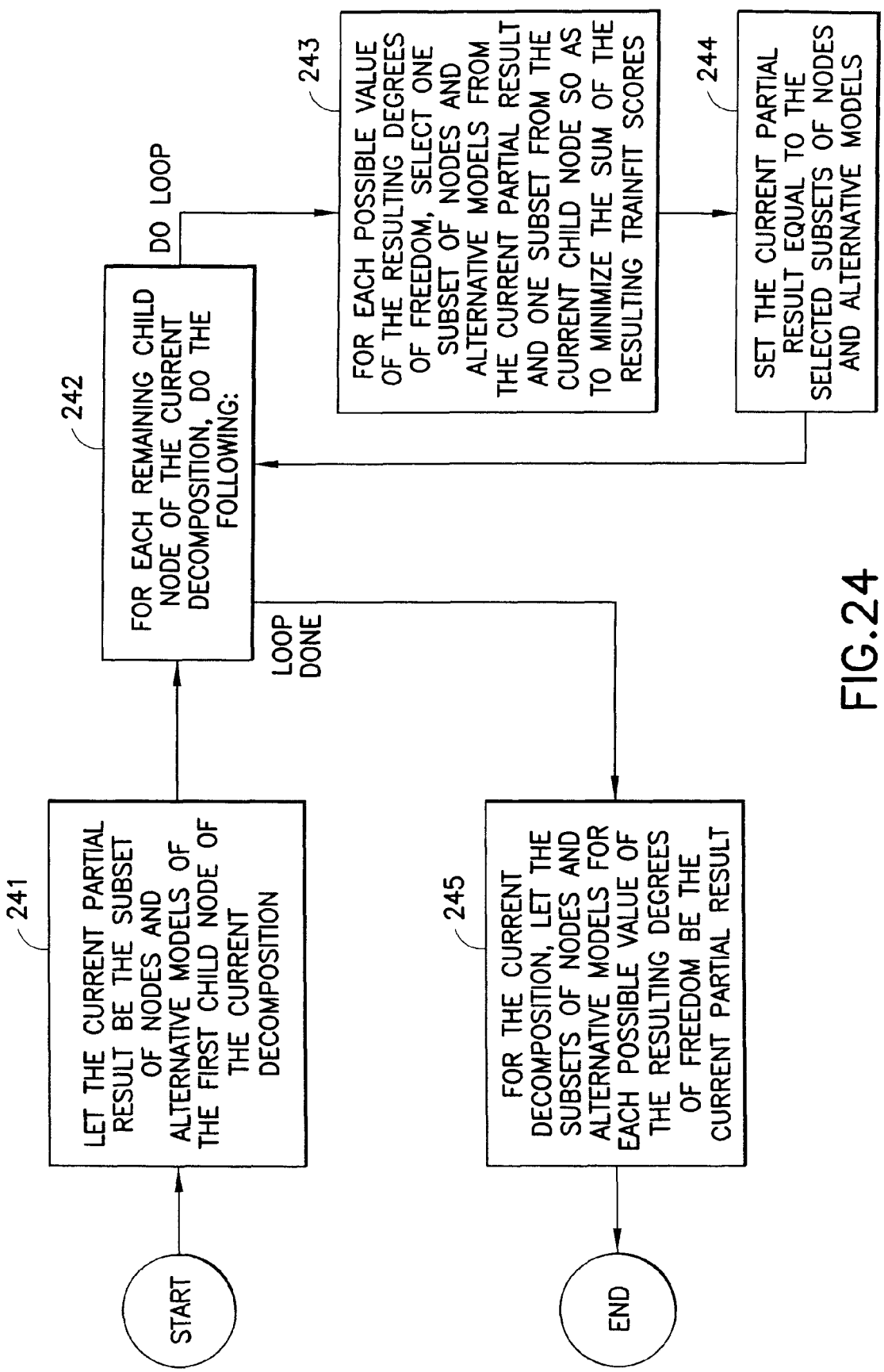
FIG. 24 illustrates an embodiment of block 232 of FIG. 23.

FIG. 24 shows an embodiment of block 232 of FIG. 23. This process employs dynamic programming techniques to efficiently select the best combination of subsets of nodes and alternative models from each of the child nodes of a decomposition for each possible value of the resulting degrees of freedom. As discussed above, the output of block 231 of FIG. 23 is a collection of tables as illustrated by Table 4, one such table for each child node of the current decomposition. The process of combining these tables begins at block 241 of FIG. 24 by using the table that corresponds to the first child node of the decomposition as the current partial result. The process continues at block 242 by repeatedly applying the process steps at blocks 243 and 244 to the table associated with each successive child node of the decomposition until all such tables have been processed. At each iteration of this loop, the child node being processed becomes the "current child node."

At block 243 within the iterative loop, one subset of nodes and alternative models is selected from the table associated with the current child node of the decomposition and another subset is selected from the current partial results for each possible values of the resulting degrees of freedom. The pairs of subsets are selected so as to minimize the sum of their TrainFit scores over all possible pairs that have the same resulting degrees of freedom. At block 244, the selected pairs of subsets become the new current partial result.

After the subset of nodes and alternative models from all child nodes in the decomposition have been incorporated into the current partial result, the process continues to block 245 where the current partial result is used as the collection of best subsets of nodes and alternative models for the current decomposition.

Figure 25:
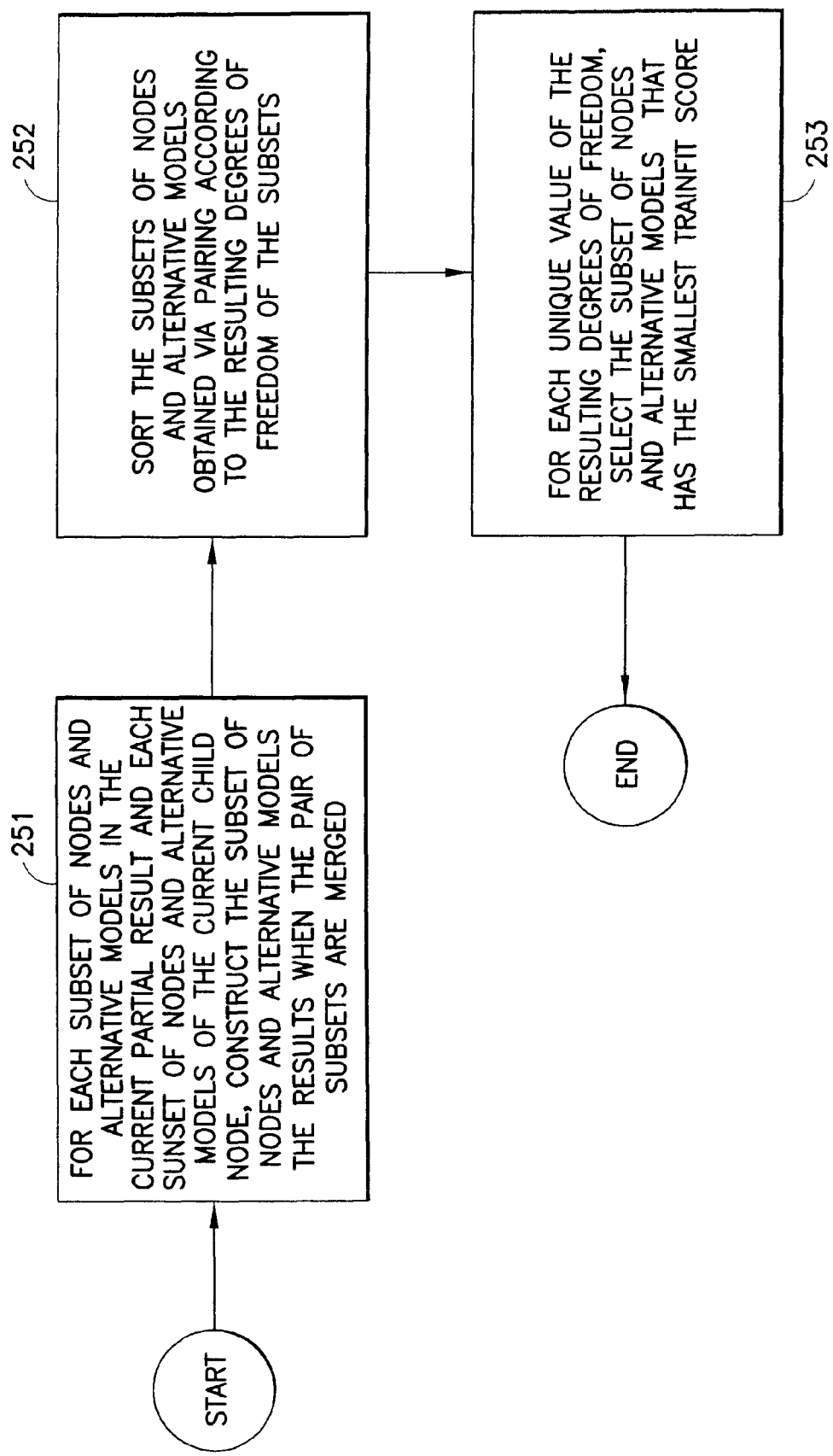
FIG. 25 illustrates an embodiment of block 243 of FIG. 24.

FIG. 25 shows an embodiment of block 243 of FIG. 24. The process begins at block 251 by merging all possible pairs of rows into single rows, wherein each pair comprises one row from the table associated with the current child node of the decomposition and one row from the current partial result. The DegFree entry of each merged row is obtained by summing the DegFree entries of the corresponding pair of rows being merged. Likewise, the TrainFit, ValFit, and ValPts entries of each merged row are the sums of the corresponding entries of the rows being merged. Also, the subset of nodes and alternative models of each merged row is the union of the subsets of nodes and alternative models of the pair of rows being merged. The calculation of the ValVar entry for each merged row is more complicated and is given by the following equation:

$$ValVar_{merged} = \begin{array}{l} ValVar_1 + ValPts_1 \cdot \left(\dfrac{ValFit_{merged}}{ValPts_{merged}} - \dfrac{ValFit_1}{ValPts_1}\right)^2 + \\ ValVar_2 + ValPts_2 \cdot \left(\dfrac{ValFit_{merged}}{ValPts_{merged}} - \dfrac{ValFit_2}{ValPts_2}\right)^2 \end{array}$$

where the subscripts "1" and "2" identify the ValFit, ValPts, and ValVar entries of a pair of rows being merged, and the subscript "merged" identifies the corresponding entries of the resulting merged row.

At block 252, the merged rows are sorted according to their DegFree values, and at block 253 the rows with the smallest TrainFit score among all rows that have the same DegFree values are then selected. A method for performing these operations is to use a bin sorting approach wherein the DegFree values of each merged row are used to index into an array in which the selected merged rows are temporarily stored. For each merged row, the DegFree value is used as the array index. If the corresponding array cell is empty, the merged row is simply stored. If the array cell currently contains another merged row, the TrainFit scores of the two are compared. If the merged row currently occupying the cell has a larger TrainFit score, it is removed and discarded, and is replaced with the new merged row. After processing all merged rows, the array is scanned and the selected merged rows are collected into a table sorted by the DegFree values of the merged rows.

It should be noted that, if separate hold-out validation data is used to calculate ValFits scores, and if separate calibration data is not available for re-estimating segment model parameters at block 43 of FIG. 4 after pruning has been performed, then it can still be beneficial to perform the optional calibration step at block 43 using the union of the training and validation data as the calibration data. The reason is that combining training and validation data can produce more accurate model parameter estimates for the segment models. However, segment model parameters should be re-estimates at block 43 without changing the selections that were made during pruning of either the input explanatory variables or the effective degrees of freedom utilized by the segment models.

Having disclosed two embodiments of block 42 of FIG. 4 for pruning pluralities of alternative data segments and segments models, embodiments of block 41 for generating such pluralities are now disclosed. As previously discussed, generalized trees permit any plurality of alternative data segments and segments models to be represented. As with the input to block 42, the output of block 41 is also presumed to be a generalized tree.

A first embodiments of block 41 of FIG. 4 disclosed below is an improvement to one of the earliest automated methods of data segmentation; namely, the hierarchical agglomerative clustering technique originally developed by Ward (see J. H. Ward, 1963, previously cited). This method constructs segmentations via bottom-up merging. Although Ward's method has become popular for unsupervised clustering, the method has also been used by Bottenberg and Christal to construct segmentation-based models for predictive modeling wherein data segments and multivariate segment models are constructed simultaneously (see R. A. Bottenberg and R. E. Christal, 1961, and 1968, previously cited). However, the latter work did not consider varying the effective degrees of freedom among segment models, such as might be done using variable selection or ridge regression.

The embodiment disclosed below improves upon these earlier methods by explicitly considering alternative segment models that vary with respect to their degrees of freedom.

Ward's method is also used for split construction in the CHAID decision tree algorithm developed by Kass (see G. V. Kass, "An exploratory technique for investigating large quantities of categorical data," *Applied Statistics*, Vol. 29, No. 2, pp. 119-127, 1980; and D. Biggs, B. de Ville, and E. Suen, 1991, previously cited). In developing CHAID, Kass introduced the notion of constrained bottom-up merging when splitting on numerical explanatory variables or ordinal (i.e., ordered categorical) variables so as to produce data segments that represent contiguous ranges of values of such variables. However, Kass did not consider multivariate segment models.

A second embodiments of block 41 of FIG. 4 that is disclosed below improves upon the CHAID method for split construction in decision trees by employing the first embodiment of block 41 disclosed below for bottom-up merging.

Ward's method has also been used by Beaulieu and Goldberg, and later by Healey, for use in image segmentation (see J-M. Beaulieu and M. Goldberg, 1989, cited above; and G. Healey, 1993, cited above). Unlike CHAID, these applications employ multivariate segment models, but each segment model employs the same input variables, as was done by Bottenberg and Christal. However, Beaulieu and Goldberg further generalized constrained bottom-up merging so that the resulting data segments represent contiguous regions in two-dimensional images. Constrained bottom-up merging is further generalized in the first embodiment of block 41 of FIG. 4 disclosed below.

Figure 26:
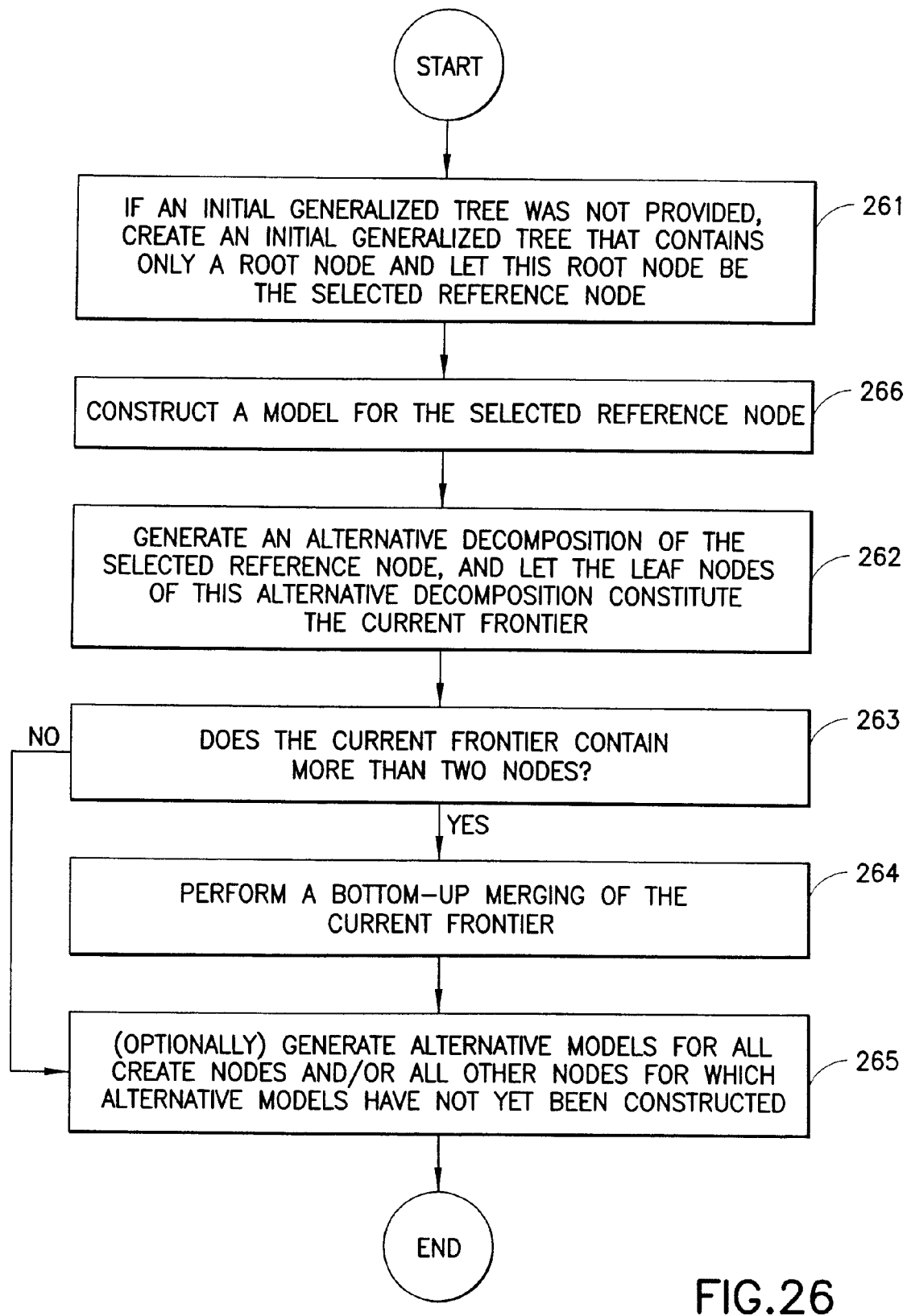
FIG. 26 illustrates a first embodiment of block 41 of FIG. 4.

FIG. 26 illustrates this first embodiment of block 41 of FIG. 4. The process operates on a "reference node" of an initial generalized tree. Thus, the first step of the process is to create an initial generalized tree at block 261 if one has not been provided. The created initial generalized tree consists only of a root node, and this root node then becomes the reference node. After bottom-up merging is performed, the tree that results from the merging process becomes an alternative decomposition of the reference node. In a second embodiment of block 41 of FIG. 4 disclosed below, the same bottom-up merging process is used to construct generalized trees is a top-down fashion. In this later use of the bottom-up merging process, the process will be applied to a partially constructed tree and the "reference node" will correspond to a leaf node of this tree.

After performing the process step at block 261, the next step is to construct a model for the reference node at block 266. When constructing this model, it is beneficial to optimize both the choice of input explanatory data fields that are utilized by the model and the effective degrees of freedom that are utilized, and to base this optimization on training data alone. Techniques for performing such optimizations are discussed below in the context of block 271 of FIG. 27.

As with Wards original method, the bottom-up merging process requires an initial fine-grained segmentation as a starting point. The fine-grained segments are then merged in a bottom-up fashion. Thus, the next step at block 262 of the process is to generate an alternative decomposition of the reference node that represents such a fine-grained segmentation. Note that the leaf nodes of the alternative decomposition must be mutually exclusive in order for the leaf nodes to define a single segmentation. Consequently, the non-leaf nodes (if any) of the alternative decomposition must each have exactly one decomposition (i.e., only one set of mutually exclusive child nodes).

It should be noted that many embodiments of block 262 are possible. For example, in the job-performance and course-performance modeling problems considered by Bottenberg and Christal (see R. A. Bottenberg and R. E. Christal, 1961, and 1968, previously cited), the fine-grained segmentations are defined by either job descriptions or course descriptions. In the image segmentation problems considered by Beaulieu and Goldberg (see J-M. Beaulieu and M. Goldberg, 1989, cited above) and by Healey (see G. Healey, 1993, cited above), the fine-grained segmentations are local n by n neighborhoods of pixels. In both of these applications, the alternative decomposition of the reference node would contain a single multiway split, such as that illustrated in FIG. 12, and the leaves of the decomposition would correspond to the initial data segments that are to be merged.

An initial generalized tree could also be generated by randomly sampling a set of seed records from the training data. Each seed record would then define a data segment. The data records that belong to a given segment would be those records that are closer to the seed record for that data segment than to any of the other seed records according to a given distance measure. The resulting alternative decomposition of the reference node would then comprise a single multiway split, such as that illustrated in FIG. 12, in which each leaf node represents the data segment associated with corresponding the seed record.

Another embodiment of block 262 is to generate a multiway split on a single data field. This embodiment in discussed in detail below in connection with a second embodiment of block 41 of FIG. 4 that produces generalized trees is a top-down fashion. In this second embodiment of block 41, the bottom-up process shown in FIG. 26 is adapted for use as a component process to generate binary splits.

Yet another embodiment of block 262 is to use the second embodiment of block 41 of FIG. 4 disclosed below to construct a top-down tree rooted at the reference node. This top-down tree is then an alternative decomposition of the reference node and bottom-up merging is performed on the leaf nodes of this top-down tree. The resulting process is the third embodiment of block 41 of FIG. 4 discussed in detail below that produces generalized trees of the kind illustrated in FIG. 14.

From the above discussion it should be clear that one of the advantages of the bottom-up merging process shown in FIG. 26 is that the process can be tailored to specific applications by tailoring the generation of alternative decompositions that is performed at block 262. To fully exploit this advantage of the bottom-up merging process shown in FIG. 26, it is beneficial to use object-oriented programming techniques to implement a general base class for generate-alternative-decomposition objects, together with two or more derived classes that implement different embodiments of the generation process. Such an object-oriented approach would enable one to readily switch from using one method of generation to another method simply by switching from using one generate-alternative-decomposition object to another such object of a different derived class. Such an object-oriented approach would also permit other unforseen embodiments of block 262 to be readily incorporated into the bottom-up merging process.

The use of generate-alternative-decomposition objects for the purpose of creating an initial segmentation as a prelude to bottom-up merging is a novel and distinguishing feature of the present invention.

Once an alternative decomposition of the reference node has been constructed at block 262, the leaf nodes of this decomposition become the starting point for the bottom-up merging process. These leaf nodes are referred to as the "current frontier" of the bottom-up merging process. Subsequent steps of the process incrementally modify the current frontier by removing pairs of nodes and inserting new nodes until no further modifications are possible.

The first of these subsequent steps is performed at block 263, which is to determine whether the current frontier comprises more than two nodes. If the current frontier consists of only one node, that node must be the reference by the definition; hence, further bottom-up merging is not possible. If the current frontier consists of exactly two nodes, then those nodes form the only pair of nodes that can be merged and merging them reproduces the reference node; hence, bottom-up merging produces no new nodes. In either of these cases, no further steps can be performed and the process continues to block 265.

On the other hand, if the current frontier consists of more than two nodes, the process continues at block 264, at which point bottom-up merging is performed. During the merging process, models are constructed for the nodes in the current frontier specifically to obtain degree of fit scores to guide the merging process. However, these models need not be the final alternative models that are to be used for the nodes involved in bottom-up merging. Therefore, after bottom-up merging is performed, new alternative models are optionally generated at block 265 for the nodes involved in bottom-up merging. These alternative model are subsequently pruned at block 42 of FIG. 4.

Figure 27:
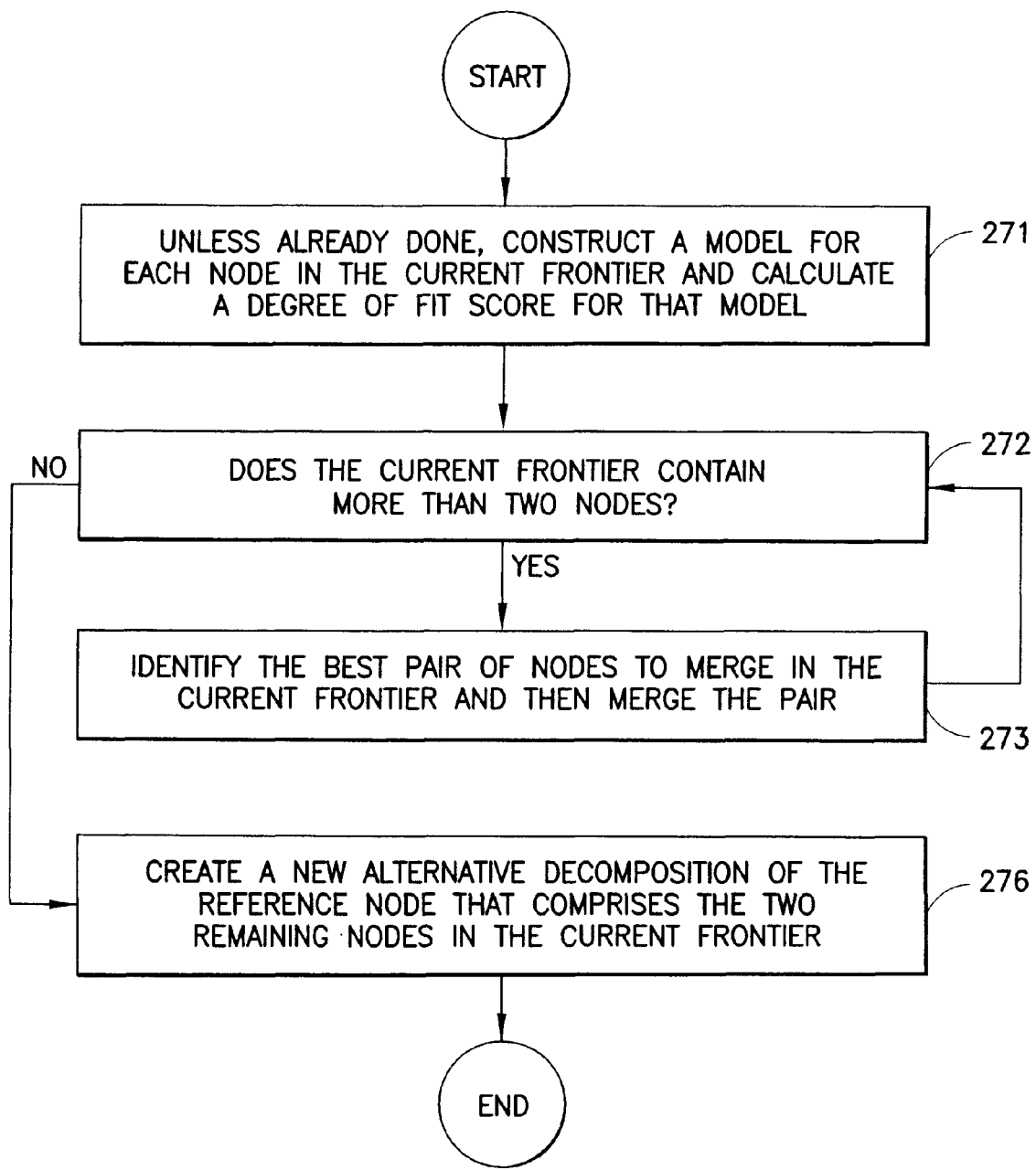
FIG. 27 illustrates an embodiment of block 264 of FIG. 26.

An embodiment of the bottom-up merging process of block 264 is shown in FIG. 27. The first step at block 271 is to construct models for the nodes in the current frontier and calculate degree of fit scores for those models, unless suitable models and degree of fit scores have already been constructed in the process of generating the current frontier (e.g., by a generate-alternative-decomposition object invoked at block 262 to generate an alternative decomposition of the selected reference node). These models are constructed for the sole purpose of deciding which pair of nodes should be merged in the current frontier at each iteration of the merging process. The construction of these models addresses the following technical issues.

In the original version of bottom-up merging for predictive modeling considered by Bottenberg and Christal (see R. A. Bottenberg and R. E. Christal, 1961, and 1968, previously cited), multivariate segment models were employed and the input data fields utilized by these segment models were held fixed both during bottom-up merging and thereafter in the final result; that is, all segment models utilized the same inputs. However, it should be discerned that, once bottom-up merging is complete, it is highly beneficial to generate a set of alternative segment models for each node in the resulting tree, where the alternative segment models for a node vary in terms of the effective degrees of freedom that each alternative model utilizes. For example, the alternative segment models might vary in terms of the input data fields that are utilized and/or in terms of the manner in which the model parameters are estimated so as to limit the effective degrees of freedom. Examples of the latter include ridge regression (see, for example, N. R. Draper and H. Smith, 1998, previously cited) and support vector machines (see, for example, V. N. Vapnik, 1998, previously cited), both of which utilize all available input data fields but employ methods other than feature selection for restricting the effective degrees of freedom of the resulting models. As previously discussed, the generation of alternative segment models takes place at block 265 of FIG. 26. A final selection of tree nodes and alternative segment models is then made via tree pruning at block 41 of FIG. 4.

During bottom-up merging, on the other hand, it is beneficial to base merging decisions on single models constructed for each node in the current frontier. For the purpose of deciding which nodes to merge, either each model for each node should utilize the same input data fields and the same effective degrees of freedom, as was done by Bottenberg and Christal, or each model for each node should be selected from a set of alternative models constructed for the node so as to optimize the effective degrees of freedom of the selected model for that node alone, ignoring the models for all other nodes.

The first approach described above of utilizing the same inputs and degrees of freedom during merging is useful when bottom-up merging is used as a component process for constructing tree splits in a top-down tree building process. The benefit of this first approach in this context is that it is simpler to implement and it generally requires less execution time than the second approach of optimizing the effective degrees of freedom as models are constructed. Although the first approach has the potential to overfit the training data, the degree of overfitting is generally not excessive given that often only small numbers of nodes need to be merged in order to construct two-way splits at each phase of the top-down tree building process.

When the first approach is used, the constructed models utilize the same the input fields and the same degrees of freedom; consequently, the degree of fit scores can simply be the TrainFit scores of the constructed models. Alternatively, cross validated TrainFit scores or Bayesian scores could be employed as discussed below. The use of cross-validated TrainFit scores can be beneficial; however, it should be noted that cross validation generally requires more computation. The additional computation can be beneficial when dealing with small amounts of training data; however, for large volumes of training data, the benefit of the additional computation might not be worth the computational cost.

The second approach described above of optimizing the choice of inputs and/or degrees of freedom of each node model, considering each node in isolation, is beneficial when bottom-up merging is used as an embodiment of block 41 of FIG. 4 to generate an alternative segmentation of the root node. However, this approach is more complicated in that the effective degrees of freedom of each model is optimized for each potential pair of nodes that could be merged. Generally speaking, the optimum degrees of freedom that can be utilized by a model varies directly with the number of training data records that are available: the more data records that are available, the more degrees of freedom one can utilize. Thus, when merging fine-grained segmentations, the effective degrees of freedom that can be utilized at each node is initially small because each node corresponds to a small subset of the available data. As nodes are merged, the resulting nodes then correspond to larger subsets of data. Consequently, the models associated with the resulting parent nodes can often utilize more degrees of freedom than for the child nodes that were merged.

When optimizing the effective degrees of freedom, choices among alternative segment models should be based on training data alone. Holdout validation data cannot be used because such data is reserved for making a globally optimal choice among alternative segmentations and segment models.

Cross validation based on training data alone is one method for selecting among alternative segment models. In this approach, the effective degrees of freedom of the selected model is optimized by selecting the alternative segment model that produces the smallest TrainFit score calculated using cross validation. The same cross validated TrainFit scores can then be used as the degree of fit scores to guide the bottom-up merging process. Alternatively, Bayesian methods could be employed for model selection, in which case suitable degree of fit scores would be the Bayesian scores used for model selection, such as the negative log probabilities of the segment data plus the negative log priors of the selected models.

It should be noted that the above methods for selecting among alternative models based on training data alone can also be employed at block 266 of FIG. 26 to construct a model for the reference node that optimizes the choice of input explanatory data fields and effective degrees of freedom.

Once segment models and corresponding degree of fit scores have been constructed for each node in the current frontier at block 271, the bottom-up merging process continues to block 272. Block 272 is the start of a looping process that incrementally merges pairs of nodes in the current frontier until the current frontier contains exactly two nodes.

If the current frontier contains more than two nodes, the looping process continues to block 273. At block 273, the best pair of nodes to merge in the current frontier is identified. This pair of nodes is then merged and the current frontier is modified by first removing the nodes in the current frontier that make up the pair and then inserting the newly created merged node together with a model and corresponding degree of fit score for the merged node.

Note that the total number of nodes in the current frontier decreases by one each time the process step at block 273 is performed. Thus, the process steps comprising blocks 272 and 273 are repeated until the current frontier contains only two nodes.

Once only two nodes remain, the process continues to block 276 where a new alternative decomposition is created for the root node. This new alternative decomposition comprises the two remaining nodes in the current frontier.

Figure 28:
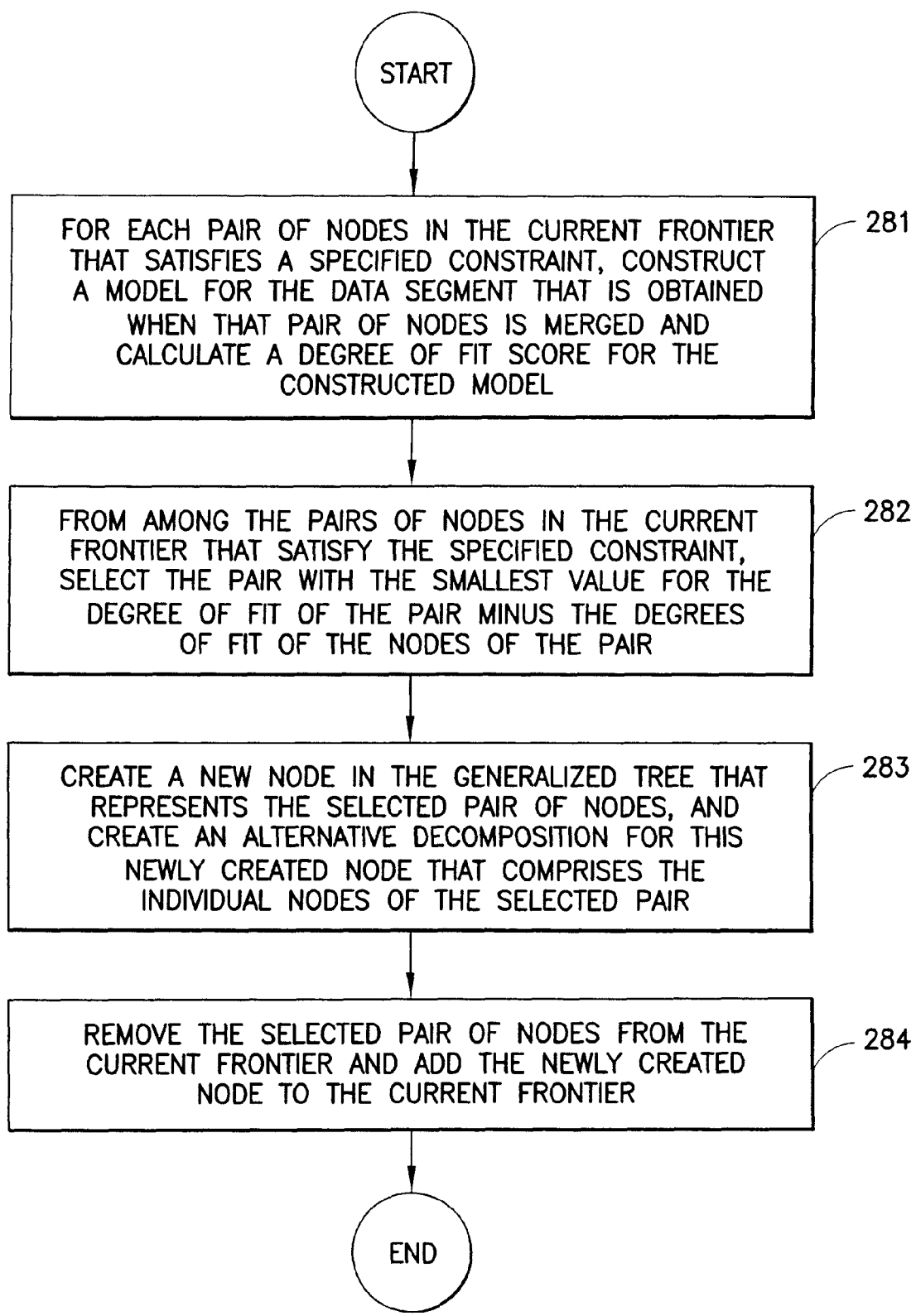
FIG. 28 illustrates an embodiment of block 273 of FIG. 27.

An embodiment of block 273 is shown in FIG. 28. The first step at block 281 of this embodiment is to construct a model and a corresponding degree of fit score for each pair of nodes in the current frontier that could potentially be merged. Which pairs of nodes can be merged is governed by a constraint that is provided as an input to the process. Models and degree of fit scores are constructed only for those pairs of nodes in the current frontier that satisfy the specified constraint. Note that imposing no restrictions corresponds to a constraint that is trivially satisfied for all pairs of nodes.

Because different constraints might be employed in different applications, it is beneficial to use object-oriented programming techniques to implement a general base class for merging constraint objects together with several derived classes that implement different types of constraints that can be imposed on pairs of nodes in the current frontier. The constraint base class would include interface functions to initialize a constraint object based on the initial contents of the current frontier, to test whether two nodes in the current frontier are allowed to be merged, and to update a constraint object based on the pair of nodes selected for merging and on the newly constructed node that will replace the pair in the current frontier. The initialization interface function of a specified constraint object would be invoked after initializing the current frontier at block 262 of FIG. 26. The testing interface function would be invoked at block 281 of FIG. 28 to restrict the pairs of nodes that are considered. The update interface function would be invoked at block 284 just prior to removing the selected pair of nodes from the current frontier and inserting the newly created merged node.

Using an object-oriented approach, a desired constraint can be specified at run time by supplying an embodiment of block 281 with a suitable constraint object from a derived class that embodies the desired constraint. An example of such a constraint, that is useful when the current frontier comprises nodes that correspond to contiguous intervals of a numerical data field, is to allow pairs of nodes to be merged only if they correspond to adjacent numerical intervals. Such a restriction on which nodes can be merged corresponds to an analogous constraint that is hard-coded into the bottom-up merging procedure used in the CHAID decision tree algorithm (see G. V. Kass, 1980, previously cited; and D. Biggs, B. de Ville, and E. Suen, 1991, previously cited).

Another example of a useful constraints is offered by are the bottom-up merging procedures for image segmentation developed by Beaulieu and Goldberg (see J-M. Beaulieu and M. Goldberg, 1989, cited above) and by Healey (see G. Healey, 1993, cited above). For the purpose of image segmentation, the nodes in the current frontier would correspond to regions in an image. The adjacency constraint that is hard-coded into the procedures developed by Beaulieu and Goldbers, and by Healey, would, in the case of the present invention, be embodied as a constraint object that would allow nodes in the current frontier to be merged only if those nodes correspond to adjacent regions in the image that is being segmented.

The above region adjacency constraint for image segmentation is also applicable to geographical regions. Moreover, when modeling data that includes geographical codes (e.g., ZIP codes) among the explanatory input variables, imposing adjacency constraints is highly beneficial when merging nodes that correspond to fine-grained segmentations based on those geographical codes. Adjacency constraints substantially reduce the potential of overfitting during the merging process, and they result in merged regions that are more intuitively satisfying. As with image segmentation, a suitable constraint derived class can be developed for geographic segmentation purposes.

If generate-alternative-decomposition objects are used at block 262 to generate alternative decompositions, then it is beneficial for these same generate-alternative-decomposition objects to also supply appropriate constraint objects for the alternative decompositions that are generated. The reason is that the type of constraint that should be employed at block 281 can depend on the nature of the alternative decomposition of the reference node generated at block 262 of FIG. 26. Having generate-alternative-decomposition objects supply appropriate constraint objects ensures that the constraint objects used at block 281 are compatible with the alternative decompositions generated at block 262. Thus, constraint objects suitable for merging contiguous numerical intervals should be supplied by generate-alternative-decomposition objects that generates decompositions by splitting on numerical input data fields. Similarly, constraint objects suitable for merging geographical regions or regions of an image should be supplied by generate-alternative-decomposition objects that generates decompositions by splitting on input data fields that represent geographical codes or image coordinates.

In addition to supplying suitable constraint objects, it is also beneficial for generate-alternative-decomposition objects to initialize the constraint objects that they supply. This approach would avoid the need for the initialization interface functions of constraint objects to be explicitly invoked by the bottom-up merging process at block 262 as previously discussed. Moreover, it would then be possible for constraint objects from different derived classes to employ different types of initialization functions based on the nature of the alternative decompositions generated by the corresponding generate-alternative-decomposition objects. The initialization processes for constraint objects could thus be tailored to the needs of the generate-alternative-decomposition objects that supply constraint objects as output.

It should be noted that the use of constraint objects to restrict which nodes can be merged in a bottom-up merging process is a novel feature of the present invention that distinguishes it from known methods, such as those employed in the CHAID decision tree algorithm (see G. V. Kass, 1980, previously cited; and D. Biggs, B. de Ville, and E. Suen, 1991, previously cited) and in the image segmentation methods developed by Beaulieu and Goldberg (see J-M. Beaulieu and M. Goldberg, 1989, cited above) and by Healey (see G. Healey, 1993, cited above).

Once models and degree of fit scores have been constructed at block 281 for all pairs of nodes in the current frontier that satisfy the specified constraint, the process continues to block 282 of FIG. 28. At block 282, the pair of nodes to be merged is identified from among those that satisfy the desired constraint considered at block 281. The pair that is selected is the one that minimizes the degree of fit score of the model constructed for the merged pair of nodes minus the degree of fit scores of the models constructed for each node of the pair. This selection minimizes the sum of the degree of fit scores of the nodes in the current frontier that will result once the selected pair of nodes is replaced with a single node representing the merged pair of nodes.

The process then continues to block 283, at which point a new node is created and inserted into the generalized tree that is being constructed via bottom-up merging. The insertion is accomplished in such a way that the pair of nodes selected for merging comprises an alternative decomposition of the new node, and in such a way that the selected pair of nodes comprises the list of nodes from which the new node was generated. The new node thus represents the union of the data segments that correspond to the nodes in the selected pair of nodes selected, the union being generated via bottom-up merging.

The next and final step of the process shown in FIG. 28 is to modify the current frontier at block 284. The modifications comprise removing the selected pair of nodes from the current frontier and adding the newly created node to the current frontier. As previously discussed, when constraint objects are used to supply specified constraints at block 281, an update interface function to the constraint object being used should be called at block 284 before performing these removals and additions to inform the constraint object of the identities of the nodes being merged and of the newly created node that represents their union.

Referring back to FIG. 27, once a pair of nodes has been selected and merged at block 273, and both the generalized tree and the current frontier have been appropriately updated, the process loops back to block 272 to again check whether the current frontier comprises more than two nodes. If so, the process step at block 273, an embodiment of which is shown in FIG. 28, is repeated until only two nodes remain in the current frontier.

To provide an example of how the bottom-up merging process operates, consider again the generalized tree illustrated in FIG. 14. Suppose, for the purpose of this example, that a root node is constructed at block 261 of FIG. 26 and the subtree of FIG. 14 comprising nodes 141 through 147 is generated as an alternative decomposition of the root node via top-down node splitting at block 262 of FIG. 26. The current frontier will then consist of nodes 144 through 147. Because the current frontier contains more than two nodes, the process continues to block 263 and then to block 264.

Continuing to the embodiment of block 264 shown in FIG. 27, models and corresponding degree of fit scores need not be constructed for nodes 144 through 147 at block 271 because such models and scores are constructed as a by-product of the top-down node splitting used to generate the current frontier. Reconstructing models and scores at block 27 would therefore result in unnecessary computation.

Because the current frontier currently contains more than two nodes, the process continues to block 272 and then to block 273. Continuing to the embodiment of block 273 shown in FIG. 28, models and degree of fit scores are constructed at block 281 for every pair of nodes in the current frontier that satisfy a given constraint. Because the initial tree was generated via top-down node splitting at block 262, a suitable constraint might be to allow pairs of nodes to be merged except when both nodes already share a common parent node in the generalized being constructed. Such a constraint would prevent the bottom-up merging process from duplicating a tree that was constructed via top-down splitting. Thus, according to this constraint, node 144 cannot be paired with node 145 because node 142 is a parent of nodes 144 and 145. Likewise, node 146 cannot be paired with node 147 because node 143 is a parent of nodes 146 and 147. The allowed pairs thus comprise nodes 144 and 146, nodes 144 and 147, nodes 145 and 146, and nodes 145 and 147.

Next, the best of these pairs is selected at block 282. Suppose that nodes 144 and 147 form the best pair; that is, suppose that the degree of fit of the model constructed when nodes 144 and 147 are merged, minus the degree of fit of the model constructed for node 144, minus the degree of fit of the model constructed for node 147, yields the smallest numerical value among the pairs of nodes than can be merged.

Having selected nodes 144 and 147, node 148 would then be created at block 283. In addition, nodes 144 and 147 would form an alternative decomposition of node 148, as illustrated in FIG. 14.

At block 284, nodes 144 and 147 would be removed from the current frontier and node 148 would be added. The current frontier would then consist of nodes 145, 146, and 148.

Because the current frontier still contains more than two nodes, the process would continue back to block 272 of FIG. 27 and then to block 273. Continuing again to the embodiment of block 273 shown in FIG. 28, models and degree of fit scores would now be constructed at block 281 for all pair of nodes in the current frontier according to the above constraint because none of the nodes in the current frontier share a common parent node. The possible pairs are thus nodes 145 and 146, nodes 145 and 148, and nodes 146 and 148.

The best pair is then selected at block 282. Suppose that the model constructed for nodes 145 and 146 results in the smallest difference of degrees of fit. Then, at block 283, node 149 would be created and nodes 145 and 146 would form an alternative decomposition of node 149, as illustrated in FIG. 14. After removing nodes 145 and 146 and inserting node 149, the current frontier would then consist of nodes 148 and 149.

Because the current frontier no longer contains more than two nodes, the process would then continue to block 272 and on to block 276, at which point nodes 148 and 149 would be added as another alternative decomposition of root node 141, as illustrated in FIG. 14.

Several issues arise when implementing the above bottom-up merging process. The first is that training data must be accessed in order to construct models for the nodes in the current frontier, either at block 271 of FIG. 27 or earlier in the process at block 262 of FIG. 26 when the current frontier is initially generated. However, if the models that are being constructed have certain special properties, then training data need not be accessed in order to construct models for pairs of nodes at block 281 of FIG. 28. For example, when least-squares linear regression models are constructed using mean and covariance matrices, the mean and covariance matrices that result when two nodes (i.e., two data segments) are merged at block 281 can be calculated directly from the mean and covariance matrices of the individual nodes being merged without having to access training data. Consequently, training data need only be accessed to construct mean and covariance matrices for the initial set of nodes in the current frontier at either block 262 or 271, but not for merged nodes at block 281.

Thus, in the special case of least-squares linear regression models, only one pass over the training data is needed at either block 262 or 271 in order to construct models and degree of fit scores. All subsequent processing can be performed without further accessing the training data. The benefit is a substantial savings in execution time. This approach of using the mean and covariance matrices of two non-overlapping data segments to construct the mean and covariance matrices of their union was used, for example, in the original bottom-up merging process considered by Bottenberg and Christal (see R. A. Bottenberg and R. E. Christal, 1961, and 1968, previously cited).

More generally, training data need not be accessed at block 281 whenever the model parameters and degree of fit scores for the constructed models can be calculated from sufficient statistics that are themselves calculated from training data, and the sufficient statistics for merged nodes can be calculated from the sufficient statistics of individual nodes being merged without further accessing training data. Mean and covariance matrices are examples of sufficient statistics that can be used in the case of linear regression. However, it should be noted that such suitable sufficient statistics cannot be constructed for all types of models.

In cases where sufficient statistics with the above properties cannot be constructed, one of two approach would have to be employed. Either (1) training data would have to be accessed each time the process step at block 281 of FIG. 28 is performed, or (2) approximation techniques would have to be devised that permit approximate model parameters and degree of fit scores to be calculated on the basis of sufficient statistics that do have the property that they can be merged when nodes are merged.

The first approach of accessing training data each time the process step at block 281 is performed is beneficial when bottom-up merging is used in and of itself to generate a set of alternative segmentations, such as when merging a fine-grained segmentation produced via nearest-neighbor techniques using a set of seed data records to define an initial segmentation.

On the other hand, the second approach of using approximation techniques is often necessary from a practical standpoint when bottom-up merging is used as a component process for constructing tree splits in a top-down tree building process. Because bottom-up merging would be employed an enormous number of times during top-down tree building, the savings in execution time that approximation techniques would afford can far outweigh the potential decrease in predictive accuracy that might result because approximations are employed. The savings in execution time could mean the difference between obtaining some sort of model in a reasonable amount of time versus not obtaining a model at all because the execution time is prohibitive. An example of such an approximation techniques is presented below for the case in which naive Bayes models are used as segment models.

Another issue that arises when implementing the bottom-up merging process shown in FIGS. 26, 27, and 28 is that many of the pairs of nodes that need to be considered at block 281 of FIG. 28 are the same from one iteration to the next of the loop comprising blocks 272 and 273 of FIG. 27. For instance, in the illustrative example presented above involving the generalized tree shown in FIG. 14, the merging of nodes 145 and 146 was considered in both the first and second passes through the loop.

When the current frontier comprises a large number of nodes, the number of pairs of nodes that are in common from one iteration to the next can approach half the square of the number of nodes in the current frontier. Therefore, when implementing the process shown in FIG. 28, it is highly beneficial to cache some or all of the models and/or degree of fit scores constructed at block 281 at each iteration so that they can be reused at the next iteration without having recompute the models and/or degree of fit scores for pairs of nodes that are in common each time block 281 is performed from one iteration to the next of the loop comprising blocks 272 and 273 of FIG. 27. Caching is particularly beneficial if training data must be accessed in order to construct models and degree of fit scores at block 281.

In addition, because a single best pair of nodes to merge is selected at each iteration at block 282 of FIG. 28, it is beneficial to cache models and/or degree of fit scores in the form of a priority queue that would allow not only results to be cached, but also allow the best pair of nodes to be rapidly identified. Heaps, splay trees, B-trees, 2-3 trees, etc., are all possible candidate data structures that are well-known to those skilled in the art of computer programming that could be used to implement suitable priority queues. Heaps are particularly attractive for this purpose because of their simplicity.

No matter what form of priority queue is employed, the differences in degrees of fit calculated at block 282 would be used as the priority values of the corresponding pairs of nodes, with the smallest value representing the highest priority (i.e., the best pair of nodes to merge).

When caching results, the first time the process step at block 281 is performed for a given initial current frontier, a priority queue would have to be created and populated with initial results obtained by constructing models and degree of fit scores for all pairs of nodes in the current frontier that can be merged according to the specified constraint. In the case of the illustrative example presented above involving FIG. 14, an initial priority queue would be constructed comprising the models and/or degree of fit scores constructed for the pairs comprising nodes 144 and 146, nodes 144 and 147, nodes 145 and 146, and nodes 145 and 147 in the initial current frontier.

At block 282, the best pair of nodes would be selected by removing the highest priority pair from the priority queue. In addition, all other pairs comprising either of the two individual nodes in the best pair would also have to be removed and discarded because information about the latter pairs cannot be reused at the next iteration of the loop comprising blocks 272 and 273 of FIG. 27. Thus, in the case of the illustrative example presented above involving FIG. 14, the pair comprising nodes 144 and 147 would be removed from the queue as the best pair of nodes to be merged the first time through the loop. In addition, the pairs comprising nodes 144 and 146, and nodes 145 and 147 would be removed from the queue and discarded.

After performing the process step at block 282, the priority queue would contain only those results that can be reused from one iteration of the loop to the next; that is, the results of merging all pairs of nodes in the current frontier other than those pairs that involve the nodes selected at block 282. No other changes would be made to the priority queue at blocks 283 and 284.

At the next iteration of the loop comprising blocks 272 and 273 of FIG. 27, and at each subsequent iteration of this loop, models and degree of fit scores would need to be constructed at block 281 of FIG. 28 only for those pairs of nodes that involve the newly created node from the previous iteration (i.e., the node that was created at block 283 during the previous iteration and then inserted into the current frontier at block 284). For example, in the case of the illustrative example presented above involving FIG. 14, the second time that the process step at block 281 is performed, models and degree of fit scores would be constructed for the pairs comprising nodes 145 and 148, and nodes 146 and 148. However, models and degree of fit scores would not be constructed for the pair comprising nodes 145 and 146 because these results would already appear in the priority queue.

A loop variable can be used to keep track of which node was last inserted into the current frontier at each iteration of the loop comprising blocks 272 and 273 of FIG. 27. This loop variable would be initialized at block 271 to a value that indicates that no new nodes have yet been constructed at block 283 of FIG. 28. The value of the loop variable would then be tested at block 281. If its value is equal to the initial value set at block 271, an initial priority queue would be constructed comprising the models and/or degree of fit scores constructed for all pairs of nodes that can be merged according to the specified constraint. If, on the other hand, the value of the loop variable identifies one of the nodes in the current frontier, then the priority queue would be updated by adding models and/or degree of fit scores constructed for all pairs of nodes that include the identified node and that can be merged according to the specified constraint. At block 284, the value of the loop variable would be updated to identify the newly created node being added to the current frontier.

Note again that the benefit of caching results in a priority queue is that models and degree of fit scores are constructed for each allowable pair of nodes only once during the bottom-up merging process. Without caching, on the other hand, models and degree of fit scores could need to be constructed over again multiple times for each allowable pair of nodes in the current frontier. Caching can therefore produce a substantial savings in execution time.

Because pairs of nodes are selected at block 282 of FIG. 28 on the basis of their degree of fit scores, these degree of fit scores must be stored in the cache. Caching the corresponding constructed models is optional. The disadvantage of caching constructed models is that number of results that appear in the cache at any given point in the process can approach half the square of the number of nodes in the current frontier. If constructed models are cached in addition to their degree of fit scores, and if each constructed model occupies a significant amount of computer memory, the memory requirements for caching these models can be quite large if the number of nodes in the initial current frontier is large.

To reduce memory usage, a good compromise is to cache only degree of fit scores for pairs of nodes and to discard the corresponding constructed models. This approach of caching only some of the results of block 281 can significantly reduce the memory requirements imposed by caching at the cost of having to reconstruct the models for the pairs of nodes that are selected at block 282, or at least reconstruct the sufficient statistics of the models in the case in which models and degree of fit scores are constructed on the basis of sufficient statistics without accessing training data.

It should be noted that reconstruction would be necessary only in the case in which models and degree of fit scores are constructed on the basis of sufficient statistics without accessing training data. The reason is that sufficient statistics must be available for all nodes in the current frontier in order to construct models and degree of fit scores for all pairs of nodes in the current frontier whose degree of fit scores are not yet cached. Consequently, models and, hence, sufficient statistics must be stored in the current frontier in association with their corresponding nodes. The model for the pair of nodes selected at block 282 and its sufficient statistics can then be reconstructed from the sufficient statistics of the models for the two individual nodes that make up the pair that are stored in the current frontier.

In the case in which training data must be accessed to construct models and degree of fit scores at block 281, there is no need for full reconstruction because the constructed models themselves serve no further useful purpose in the bottom-up merging process once their degree of fit scores are calculated. However, there can be a need for partial reconstruction to the extent that the selection of explanatory input data fields and effective degrees of freedom for a constructed model of a pair of nodes might be based on the input data fields and effective degrees of freedom of the constructed models associated with each node in the pair.

For example, if the second embodiment of block 41 of FIG. 4 disclosed below is used to generate an alternative decomposition of the selected reference node at block 262 of FIG. 26, then the constructed models associated with the nodes in the initial current frontier could potentially utilize different explanatory input data fields and effective degrees of freedom. When constructing a model for a pair of such nodes, it can be beneficial to limit the explanatory input data fields that are considered for inclusion in the model to the union of those considered when constructing the models for the individual nodes in the pair. Similarly, it can be beneficial to limit the effective degrees of freedom that are considered to the sum of the effective degrees of freedom that were considered when constructing the models for the individual nodes in the pair. Even if the constructed model itself is discarded, the above constraints on constructed models must still be preserved in order to (re)generate alternative models for merged nodes that obey these constraints at block 265 of FIG. 26.

To keep track of such constraints, it is therefore necessary to store this information in the current frontier in association with the corresponding nodes, and to reconstruct these constraints for pairs of nodes selected at block 282 of FIG. 28. Even in cases where constructed models cannot themselves be reconstructed from mergeable sufficient statistics, it is still possible to reconstruct the constraints under which models are constructed for selected pairs of nodes based on the constraints for each node in the pair that are stored in the current frontier.

As previously discussed, it is highly beneficial to employ object-oriented programming techniques to encapsulate constructed models in the form of model objects. Using this approach, constraints on the explanatory input data fields and effective degrees of freedom that can be utilized by a model can be stored within the corresponding model object, as can sufficient statistics and other information that are needed to construct models. All of the foregoing information would then be stored in the current frontier by virtue of the fact that the model objects that are associated with nodes would be stored in the current frontier.

Figure 29:
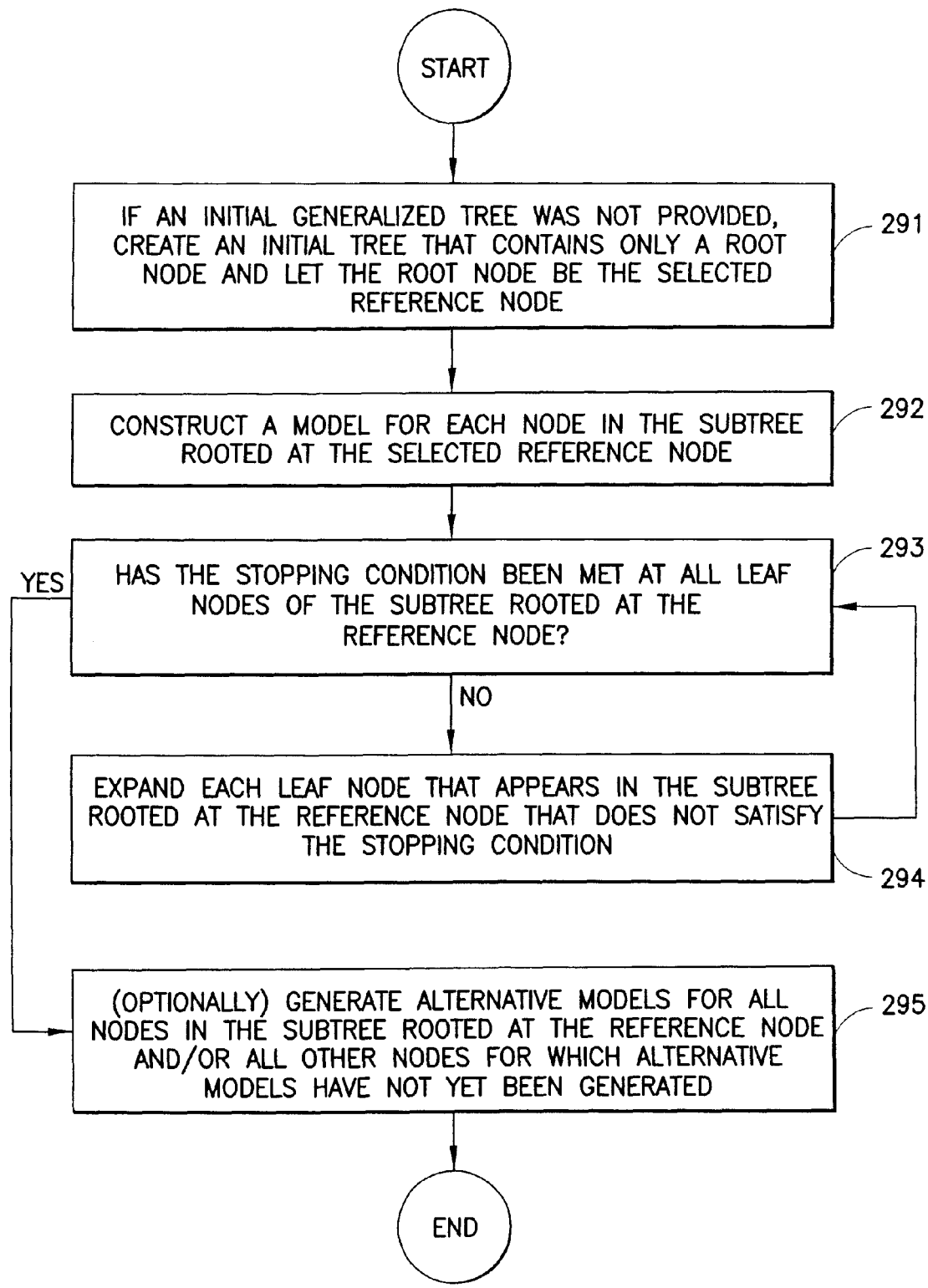
FIG. 29 illustrates a second embodiment of block 41 of FIG. 4.

FIG. 29 illustrates a second embodiment of block 41 of FIG. 4. This process constructs generalized trees in a top-down fashion via node splitting. The process operates on a "reference node" of an initial generalized tree. The first step at block 291 of the process is to create an initial generalized tree if one has not been provided. The created initial generalized tree consists only of a root node, and this root node then becomes the reference node. The process subsequently expands the leaf nodes of the subtree of the initial generalized tree that is rooted at the reference node.

The next step at block 292 of the process is to construct models for the nodes in the subtree rooted at the reference node. The degrees of freedom of the constructed models should be optimized so as to maximize the predictive accuracies of the models considering each node in isolation. The degrees of freedom can be optimized using cross-validation techniques or Bayesian methods, as previously discussed in the case of optimizing the degrees of freedom of constructed models during bottom-up merging.

If an initial generalized tree consisting of a single root node had to be constructed at block 291 because an existing generalized tree was not supplied at input to the node splitting process, then the model for the root node constructed at block 292 should utilize as few input data fields and as few effective degrees of freedom as possible. As disclosed below, subsequent steps in the node-splitting process will then explore the effect of increasing the number of input data fields and the degrees of freedom utilized by segment models.

If, on the other hand, an existing initial generalized tree was supplied as input to the node splitting process, then models should be constructed at block 292 using pre-existing settings with respect to the input data fields that can enter into the models and the effective degrees of freedom that can be utilized.

Given the above requirements, the model objects that are used to construct segment models should incorporate interface functions for setting limits on which input data fields can be utilized by a model object, as well as limits on the effective degrees of freedom that can be utilized.

After constructing models at block 292, the process shown in FIG. 29 next enters a loop comprising blocks 293 and 294. The first step of the loop at block 293 is to test whether a specified stopping condition has been met at all leaf nodes of the subtree rooted at the reference node. If the stopping condition is not met at all such leaf nodes, then the process continues to block 294, at which point the leaf nodes of the subtree rooted at the reference node that do not satisfy the stopping condition are expanded. After performing the leaf expansion step at block 294, the process returns to block 293 to again test whether the stopping condition has been met at all leaf nodes of the subtree rooted at the reference node. Thus, the leaf expansion step at block 294 is repeated until the stopping condition at block 293 has been fully met.

It should be discerned that all tree-based methods employ stopping conditions of one sort or another. For example, in Quinlan's description of the 'standard' technique for constructing decision tree classifiers (see J. R. Quinlan, 1989 previously cited), the process continues so long as there exists a leaf node whose corresponding data segment contains at least two training cases with different class labels; otherwise, the tree building process stops. Additional examples of stopping conditions are described in the on-line statistics textbook provided over the Internet as a public service by StatSoft, Inc.

A beneficial stopping condition is to perform a trial pruning of the subtree rooted at the reference node and to then compare the distance (i.e., the number of links) of each leaf node to its corresponding ancestor node in the best subset of nodes identified via trial pruning. For example, if a leaf node in the subtree rooted at the reference node appears in the best subset of nodes identified via trail pruning, then the distance for that leaf node would be zero. If the parent of a leaf node appears in the best subset of nodes, the distance would be one. If the parent of a parent of a leaf node appears in the best subset, the distance would be two, and so on. The stopping condition for each leaf node is that the distance of a leaf node to its corresponding ancestor node identified via trail pruning must be greater than or equal to a specified lookahead threshold.

The rationale for this stopping condition is that it would be a waste of computation to expand the subtree rooted at the reference node beyond the subset of nodes that would be selected during pruning. However, some amount of lookahead is necessary to avoid local optima. The greater the lookahead threshold, the greater are the chances of finding a global optimum. However, the amount of computation is likewise greater. One must therefore balance the benefit of lookahead in terms of increased chances of finding a global optimum, versus the cost of lookahead in terms of additional computation. A lookahead threshold of two or three is often adequate. For very large data sets, though, a lookahead threshold of one can suffice.

Figure 30:
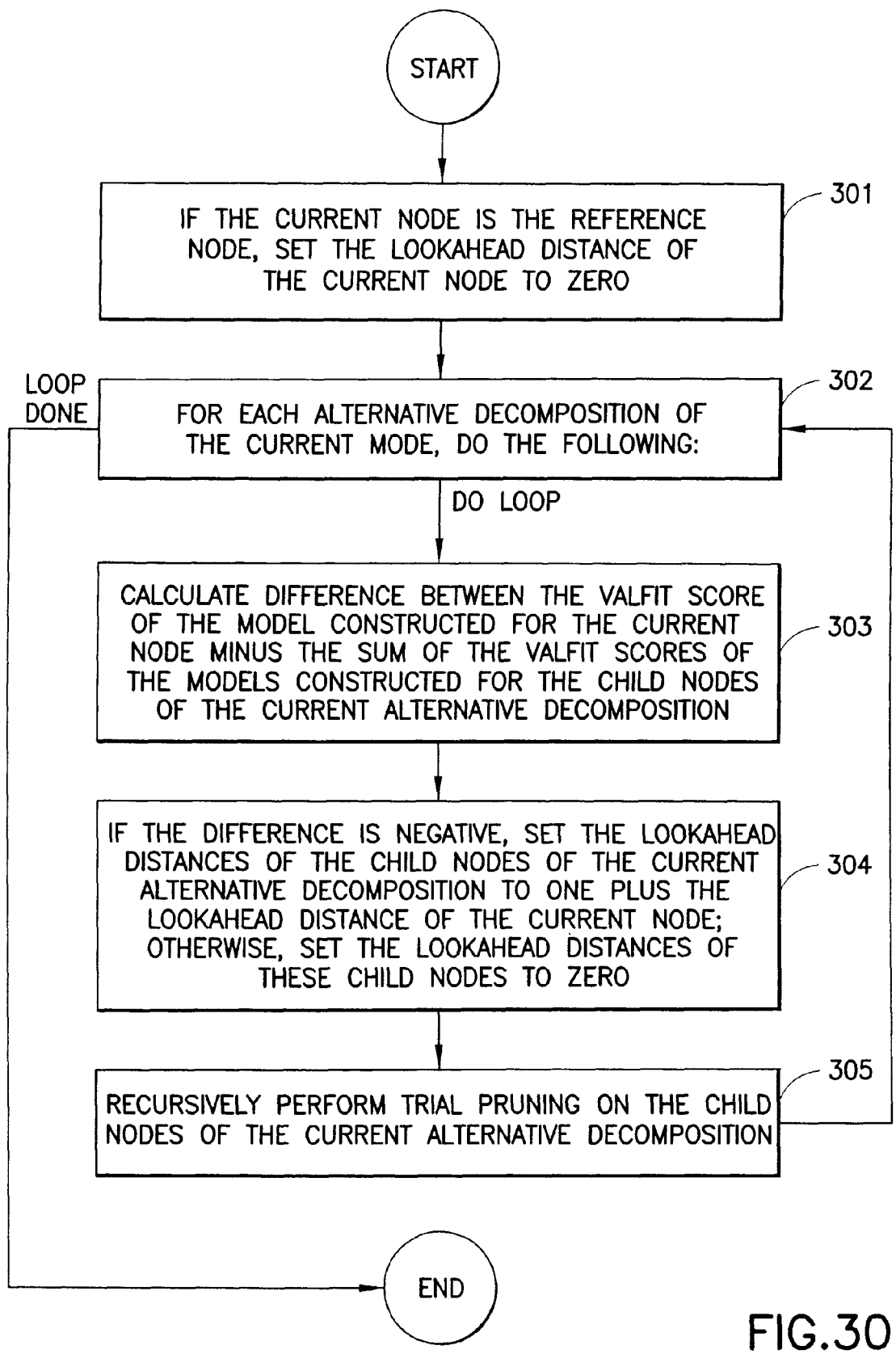
FIG. 30 shows a flowchart of a process for performing a trial pruning of a generalized tree for the purpose of deciding when to terminate the top-down tree building process illustrated in FIG. 29.

Trial pruning can be accomplished using the process illustrated in FIG. 30. This process can be applied at block 293 to the reference node to calculate lookahead distances for all leaf nodes, and all other nodes, in the subtree rooted at the reference node. The lookahead distances of the leaf nodes can then be compared to a lookahead threshold to determine which leaf nodes satisfy the stopping condition at blocks 293 and 294. The trial pruning process shown in FIG. 30 is based on the pruning process illustrated in FIG. 18, except that the trial pruning process calculates lookahead distances instead of selecting a best subset of nodes, and the trial pruning process does not make selections among alternative decompositions as is done by the process shown in FIG. 18. Such selections are unnecessary for the purpose of deciding when to stop top-down tree building. In addition, the trial pruning process makes use of the fact that only a single model is constructed for nodes at block 292 of FIG. 29 and within the loop comprising blocks 293 and 294 of FIG. 29.

When the trail pruning process shown in FIG. 30 is applied to a node in a generalized tree, the "current node" mentioned in FIG. 30 will then refer to that node. Block 301 shows the first step of the process, which is to set the lookahead distance of the current node to zero if the current node is the reference node mentioned in FIG. 29.

The process then enters a loop at block 302. This loop applies the process steps at blocks 303, 304, and 305 to each alternative decomposition of the current node. If the current node is a leaf node (i.e., it has no alternative decompositions), then the process steps at blocks 303, 304, and 305 are not performed for that node and process terminates.

At block 303, a difference is calculated that is equal to the ValFit score of the model constructed for the current node minus the sum of the ValFit scores of the models constructed for the child nodes of the alternative decomposition that is currently being processed within the loop.

At block 304, the lookahead distance of each child node of the current alternative decomposition is set to a value that depends on the value of the difference calculated at block 303. If the difference is negative (i.e., less than zero), the lookahead distances of the child nodes are set to one plus the lookahead distance of the current node. If the difference is greater than or equal to zero, the lookahead distances of the child nodes are set to zero.

At block 305, the trial pruning process shown in FIG. 30 is recursively applied to each child node of the current alternative decomposition. Note that in each recursive application, the child node being processed then becomes the new "current node" referred to in FIG. 30. The recursive applications terminate at the leaf nodes because, by definition, leaf nodes have no alternative decompositions. Hence, the process steps at blocks 303, 304, and 305 are not performed on leaf nodes.

The use of trial pruning as a stopping condition is not present in known tree-based predictive modeling algorithms. Hence, it is a distinguishing feature of the present invention.

Once the stopping condition has been met at block 293 of FIG. 29 for all leaf nodes of the subtree rooted at the reference node, the process continues to block 295. At block 295, alternative models are optionally generated for all nodes in the subtree rooted at the reference node, and/or for all other nodes for which alternative models have not yet been generated. The generation of alternative models is recommended as a prelude to applying the pruning step at block 42 of FIG. 4 because the degrees of freedom of the models constructed at blocks 292 and 294 are optimized based solely on the training data considering each node in isolation. The pruning step at block 42 of FIG. 4, on the other hand, performs a global optimization that takes advantage of multiple alternative models at each node.

Figure 31:
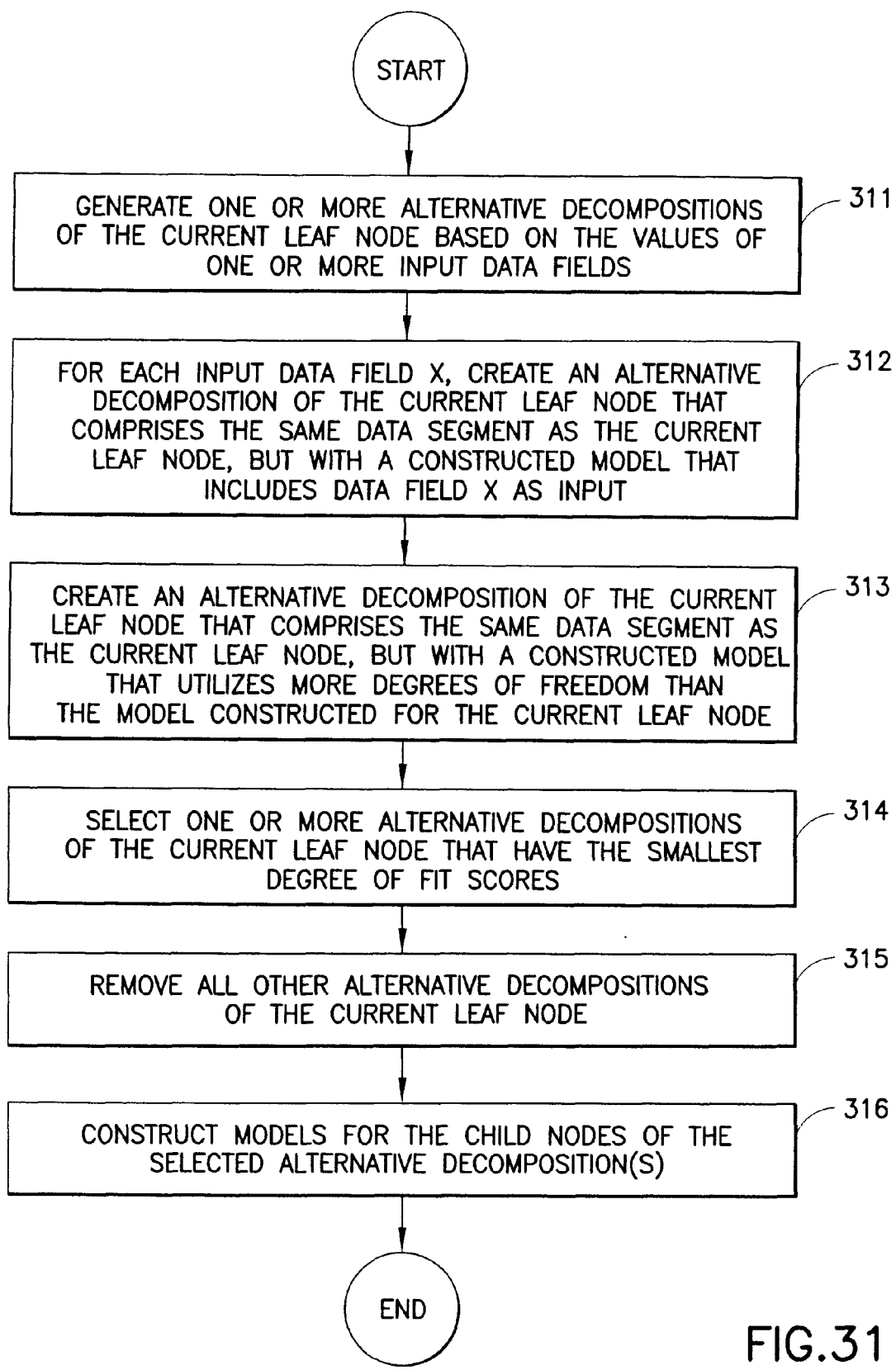
FIG. 31 illustrates an embodiment of block 294 of FIG. 29.

An embodiment of the leaf expansion step at block 294 of FIG. 29 is shown in FIG. 31. The process shown in FIG. 31 is applied to each leaf node identified at block 294, and each such leaf becomes the "current leaf node" referred to in FIG. 31 when that leaf is processed.

The first step of the leaf expansion process, illustrated as block 311 in FIG. 31, is to create one or more alternative decompositions of the current leaf node. This step corresponds to the node splitting steps in known top-down tree building algorithms, except that multivariate models can be constructed along each branch of a split when using the present invention. A detailed embodiment of block 311 is disclosed below.

The next step at block 312 is to create, for each input data field X, an alternative decomposition of the current leaf node that comprises the same data segment as the current leaf node but with a constructed model that includes data field X as an input. This step has no counterpart in known top-down tree building algorithms. The step explicitly recognizes that there are two ways of increasing the degrees of freedom of segmentation-based models: increase the number of segments, or increase the degrees of freedom of the segment models. Block 311 considers the first approach of increasing the number of segments via node splitting. Block 312 considers the second approach of increasing the degrees of freedom of a segment model. At block 312, the degrees of freedom of the segment model constructed for the current node are increased by introducing an additional input explanatory data field to the segment model.

Another way of increasing the degrees of freedom of a segment model is to introduce nonlinear terms or interaction terms into the model without introducing additional input data fields. An example is the introduction of knot points and cross products in Friedman's MARS program (J. H. Friedman, "Multivariate Adaptive Regression Splines (with discussion)," *Annals of Statistics*, Vol. 19, pp. 1-141, 1991). This approach to increasing the degrees of freedom is considered by the third step at block 313 of the process, wherein an alternative decomposition of the current leaf node is created that comprises the same data segment as the current leaf node, but with a constructed model that utilizes more degrees of freedom than the model constructed for the current leaf node. This step likewise has no counterpart in known top-down tree building algorithms.

Note that neither the process step shown in block 312 nor the one shown in block 313 is present in known top-down tree building algorithms. Hence, these steps are distinguishing features of the present invention, both individually and jointly.

The benefit of these process steps is that they overcome the "overwhelming" computation burden discussed by Alexander and Grimshaw (see W. P. Alexander and S. D. Grimshaw, 1996 cited above) of incorporating multivariate statistical models in top-down tree-based modeling methods. The process steps at blocks 312 and 313 overcome this computational burden by searching over possible input data fields, and searching over the effective degrees of freedom that are utilized, in a comparable manner and at the same point in the top-down tree-building process as searching over possible node splits at block 311. Specifically, block 312 serves to incrementally increase the number of input data fields that can be employed by segment models in a stepwise fashion one field at a time. Likewise, block 313 serves to incrementally increase the effective degrees of freedom utilized by segment models in a stepwise fashion one increment at a time. In both cases, these stepwise increments are comparable to known methods of increasing the number of node splits in a tree in a stepwise fashion one split at a time. The effect of performing a stepwise search over potential multivariate statistical models in this fashion is that it makes the search computationally feasible.

As previously mentioned, in an object-oriented embodiment of the process, model objects that are used to construct segment models should incorporate interface functions for setting limits on which input data fields can be utilized by a model object, as well as limits on the effective degrees of freedom that can be utilized. These interface functions would be invoked at blocks 312 and 313, respectively, in order to modify these limits. For the purposes of the process shown in FIG. 31, the limits that can be placed on the effective degrees of freedom of a model should be implemented as a counter whose value conceptually corresponds to the number of times the effective degrees of freedom have been incremented at block 313. Specifically, setting the counter to a certain number should ideally have the same effect on the model object as performing the process step at block 313 that number of times. The smallest value of this counter would be zero. The counter would then be incremented at block 313 using suitable model-object interface functions. To minimize the potential of overfitting, each increment in the allowed degrees of freedom at block 313 should roughly correspond to the increase in the allowed degrees of freedom that would be obtained via node splitting at block 311.

Once alternative decompositions have been constructed for the current leaf node at blocks 311, 312, and 313, the process continues by selecting one or more of these alternative decompositions at block 314 based on which of the alternative decompositions have the smallest degree of fit scores.

The alternative decompositions that are not selected are then discarded at block 315. Finally, at block 316, models are constructed for each of the child nodes of the selected alternative decomposition(s). As is the case at block 292 of FIG. 29, the degrees of freedom of the models constructed at block 316 should be optimized so as to maximize the predictive accuracies of the models considering each node in isolation.

Known top-down tree building algorithms select exactly one alternative decomposition per leaf node when expanding leaf nodes. However, this approach is a greedy optimization heuristic that does not guarantee that globally optimum trees will be constructed (see, for example, L. Breiman, J. H. Friedman, R. A. Olshen, and C. J. Stone, 1984 previously cited; and J. R. Quinlan, 1993 previously cited). To find globally optimum trees, one would have to explore all possible alternative decompositions and then make final selections among these alternative decompositions during pruning.

The process step at block 314 takes advantage of the fact that the generalized trees disclosed in the present invention permit several alternative decompositions to be represented and explored. To increase the chances of finding a globally optimum tree, one can, for example, select the best k alternative decompositions at block 314. All k alternative decompositions will then be explored each time block 294 is performed for the corresponding reference node. The best of these alternative decompositions will then be selected by the pruning process at block 42 of FIG. 4.

It should be noted, however, that increasing k dramatically increases the amount of computation that is performed. For example, selecting the best two alternative decompositions each time block 314 is performed would approximately square the number of nodes created via top-down tree building compared to selecting the single best alternative decomposition at block 314. Selecting the best four alternative decompositions each time block 314 is performed would approximately cube the number of nodes that are generated.

To keep the increase in computation within reasonable limits, the number of alternative decompositions selected at block 314 can be varied depending on the depth of the current leaf node in the subtree rooted at the reference node. For example, if a maximum of $k_0$ alternative decompositions were allowed to be selected at the reference node, and if the maximum number of allowed alternative decompositions were decreased by one for each level of the tree below the reference node until the maximum number of allowed alternative decompositions reached one, then the number of nodes created via top-down tree building would increase by a factor of at most $k_0$ factorial (i.e., $k_0!$) compared to selecting the single best alternative decomposition at block 314. Alternatively, if a maximum of $k_0$ alternative decompositions were allowed to be selected at the reference node, and if the maximum number of allowed alternative decompositions were decreased by a factor of $\alpha$ for each level of the tree below the reference node until the maximum number of allowed alternative decompositions reached one, then the number of nodes created via top-down tree building would increase by a factor of at most $$\frac{(k_0)^n}{\alpha^{\frac{1}{2}n(n-1)}},$$

where $n = \log_\alpha(k_0)$.

The ability to explore more than one alternative decomposition of a node is not present in known top-down tree building algorithms. Hence, this ability is a distinguishing feature of the present invention.

It should be noted that the computations performed by the trail pruning process shown in FIG. 30 can be performed incrementally at the end of the node expansion process shown in FIG. 31 without having to apply the trial pruning process each time the process step at block 293 of FIG. 29 is performed. When applied incrementally, the trail pruning process shown in FIG. 30 would first be applied at block 292 of FIG. 29 and again at block 316 of FIG. 31. This incremental application of trial pruning avoids recalculating the lookahead distances of the non-leaf nodes in the evolving subtree rooted at the reference node each time block 293 of FIG. 29 is performed. Instead, the trial pruning process would be applied once to the initial subtree rooted at the reference node, and then once for each leaf node expanded by the process shown in FIG. 31. For large trees, incremental trial pruning can significantly reduce the amount of computation required for trial pruning.

Figure 32:
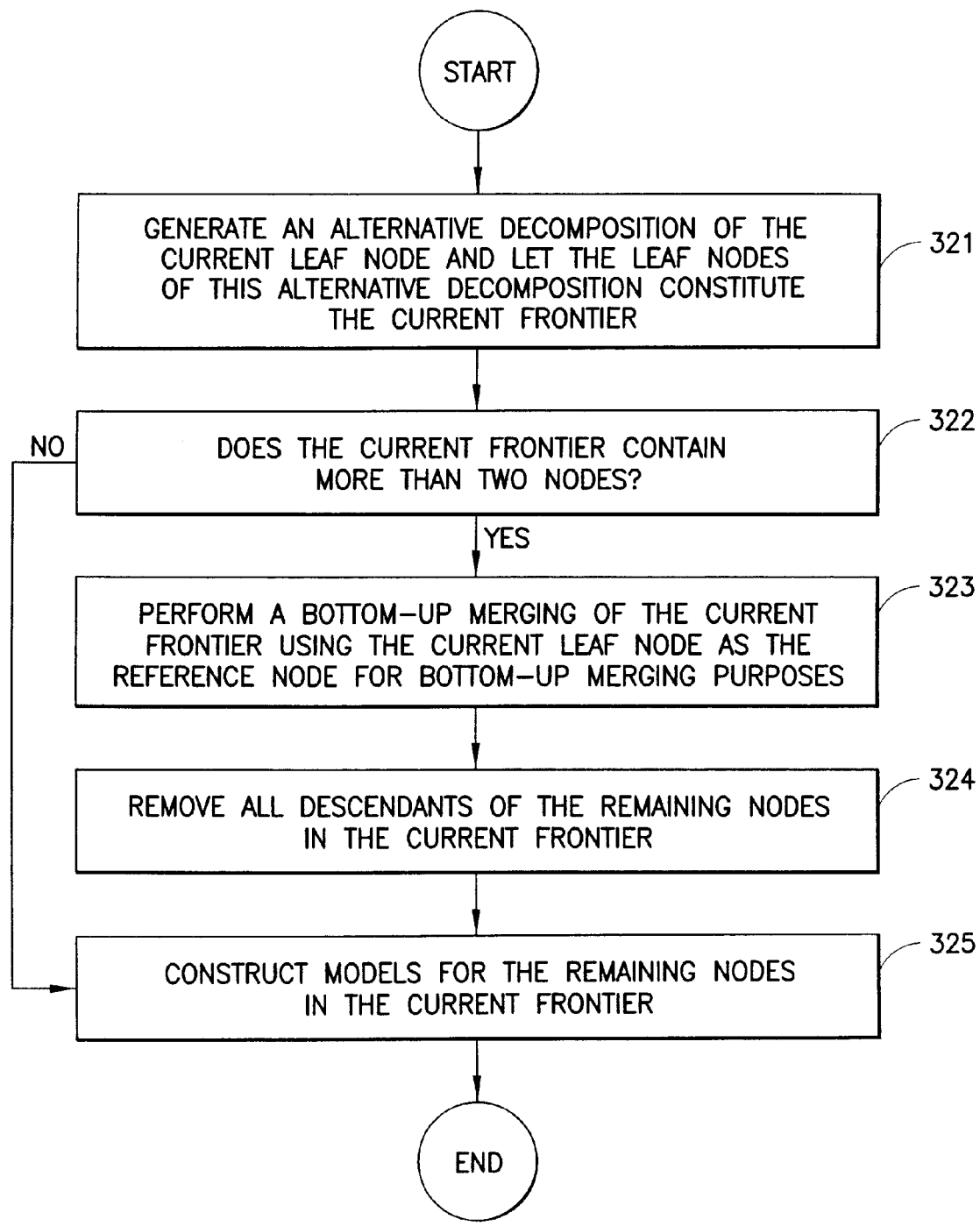
FIG. 32 illustrates an embodiment of block 311 of FIG. 31.

FIG. 32 illustrates an embodiment of the node splitting step at block 311 of FIG. 31. The process shown in FIG. 32 generates a single alternative decomposition of a current leaf node. This process would be applied multiple times to generate two or more alternative decompositions.

The first step of the process shown in FIG. 32 is to construct, at block 321, an initial alternative decomposition of the current leaf node and to then use the leaf nodes of this alternative decomposition as the current frontier. It is beneficial to implement this process step using generate-alternative-decomposition objects as discussed above in the context of block 262 of FIG. 26. A generate-alternative-decomposition object would then be supplied as input to the process shown in FIG. 32, and block 311 of FIG. 31 would be implemented by applying the process shown in FIG. 32 multiple times, each time using a different generate-alternative-decomposition object as input.

The use of generate-alternative-decomposition objects for the purpose of creating initial alternative segmentations as part of the node-splitting process is a novel and distinguishing feature of the present invention.

The advantage of employing generate-alternative-decomposition objects at block 321 and looping over these objects at block 311 is that the node-splitting process illustrated in FIG. 32 then benefits from the same level of generality and flexibility as does the bottom-up merging process illustrated in FIG. 26. In particular, sophisticated node-splitting techniques can readily be incorporated into the process illustrated in FIG. 32 simply by providing appropriate generate-alternative-decomposition objects to the looping process at block 311. For example, any of the methods previously discussed for generating alternative decompositions at block 262 of FIG. 26 can be embodied in the form of generate-alternative-decomposition objects and used at block 321 of FIG. 32. Other sophisticated node-splitting techniques can likewise be incorporated, such as Hinton and Revow's method of using pairs of data records to define splits for decision trees (see G. E. Hinton and M. Revow, "Using pairs of data-points to define splits for decision trees," in D. S. Touretzky, M. C. Mozer, and M. E. Hasselmo, editors, *Advances in Neural Information Processing Systems, Volume* 8, pp.—507-513, MIT Press, 1996).

The known approach of splitting on a single input data field X can likewise be implemented by constructing a suitable generate-alternative-decomposition object for each input data field X. Each such generate-alternative-decomposition object would then be responsible for generating a multiway split, such as that illustrated in FIG. 12, based on the possible values of the corresponding data field for that generate-alternative-decomposition object.

For a categorical data field X, a suitable multiway split would comprise a set of child nodes, where each child node represents one of the possible values of X.

For a numerical data field X, the range of X would first be discretized into a set of intervals and a multiway split would be constructed in which each child node corresponds to one of these intervals. It is beneficial for the number of intervals to be no more than the square root of the number of training data records in the data segment that corresponds to the current leaf node. It is also beneficial for the number of intervals to be further limited to a predetermined maximum number of intervals. A maximum of twenty intervals offers a reasonable balance between the precision needed to identify good binary splits and the computational overhead that accompanies the use of large numbers of intervals. A reasonable discretization strategy is to select interval boundaries so that each interval contains approximately the same number of training data records in the data segment that corresponds to the current leaf node.

Once an initial alternative decomposition of the current leaf node has been constructed at block 321, the leaf nodes of this initial alternative decomposition then become the current frontier for the purpose of bottom-up merging, and the current leaf node becomes the corresponding reference node in the bottom-up merging process.

The node-splitting process then continues at block 322 where the current frontier is examined to determine whether it contains more than two nodes. If it does, then bottom-up merging is performed at block 323 to merge the current frontier into a binary split.

FIG. 27 shows an embodiment of block 323 to perform the bottom-up merging. As previously discussed, when the bottom-up merging process shown in FIG. 27 is used as a component process of top-down node splitting, as is the case here, it is beneficial to construct models during bottom-up merging that utilize the same inputs and effective degrees of freedom as the model constructed for the current leaf node. In addition, as previously discussed, it is beneficial to employ approximation techniques when necessary in order to construct models based on sufficient statistics that can be merged when nodes are merged, and that allow models and degree of fit scores to be constructed for merged nodes based on merged sufficient statistics. Such models are initially constructed either at block 321 when the current frontier is generated, or later at block 271 of FIG. 27. Such models are subsequently constructed as part of the merging process at block 281 of FIG. 28.

Note that different merging constraints would be employed at block 281 during bottom-up merging depending on the nature of the initial alternative decomposition generated at block 321. For example, as previously discussed, a constraint that is always satisfied for any pair of nodes would be used in the case of nominal data fields so that any subset of categories could be merged with any other subset of categories. For ordinal and numeric data fields, on the other hand, a suitable constraint would be to allow nodes to be merged only if they represent adjacent intervals for those data fields. For data fields that represent geographical codes, such as Zip codes, a suitable constraint would be to allow nodes to be merged only if they represent adjacent geographical regions.

As previously discussed, these constraints can be specified using constraint objects. Moreover, suitable constraint objects can be supplied by the generate-alternative-decomposition objects used at block 321 to generate initial alternative decompositions.

Because the current leaf node is used as the reference node for the purpose of bottom-up merging, the bottom-up merging process shown in FIG. 27 will construct another alternative decomposition of the current leaf node that comprises the subtree produced via bottom-up merging. At the end of the bottom-merging process, the current frontier will consist of the two nodes that comprise the immediate child nodes of this new alternative decomposition produced via bottom-up merging. These child nodes constitute the desired binary split of the current leaf node based on the initial alternative decomposition generated at block 321.

After bottom-up merging is performed at block 323, all descendants of the remaining nodes in the current frontier are removed from the generalized tree at block 324. The effect of this operation is to remove the initial alternative decomposition constructed at block 321 and to remove all record of the node merges were performed at block 323 to construct the resulting binary split. In addition to removing nodes from the generalized tree, the node generation information for the remaining nodes in the current frontier must be updated at block 324 to indicate that these nodes were generated by splitting the current leaf node. Splitting tests must likewise be added to the current leaf node in order to define the data segments that are represented by the remaining nodes in the current frontier. As will be discussed below, the latter is accomplished using splitting-test objects.

Thus, although the process shown in FIG. 32 produces top-down splits using bottom-up merging as a component process, the only information retained in the generalized tree is the information that defines the top-down splits. The information that is temporarily introduced for bottom-up merging purposes is ultimately removed.

Once the generalized tree is updated at block 324 to reflect the binary split defined by the remaining nodes in the current frontier, the process continues to block 325 where models are constructed once again for these nodes. As in the case of the models constructed during bottom-up merging at block 323, it is beneficial to construct models at block 325 that utilize the same inputs and effective degrees of freedom as the model constructed for the current leaf node. However, unlike the models constructed at block 323, approximation techniques should not be employed at block 325 when estimating model parameters and degree of fit scores. The purpose of the process step at block 325 is to thus remove any biases in the estimated degree of fit scores that might be introduced through the use of approximation techniques at block 323.

Note again that bottom-up merging is performed at block 323 only in the case in which the current frontier at block 322 contains more than two nodes. If the current frontier contains two or fewer nodes when the process step at block 322 is performed, then bottom-up merging is unnecessary. In this case, the process continues directly at block 325, where models are constructed for the remaining nodes in the current frontier as described above.

The bottom-up merging process illustrated in FIGS. 26 through 28 and the top-down splitting process illustrated in FIGS. 29 through 32 are both highly advantageous in that virtually any predictive modeling technique can be used to construct segment models. In order to fully exploit this advantage, it is highly beneficial to use object-oriented programming techniques to implement segment modeling techniques in such a way that any desired segment modeling techniques can be "plugged in" to these segmentation processes in much the same way that new capabilities can be "plugged in" to Internet Web browsers.

A method for providing such a plug-in capability is disclosed below. By providing this capability, the present invention achieves an unprecedented level of generality by enabling the segmentation-based modeling processes disclosed above to be tailored to specific applications simply by adding suitable segment model objects as plug-ins. By contrast, known top-down tree building techniques do not provide comparable plug-in capabilities (see, for example, W. P. Alexander and S. D. Grimshaw, 1996 previously cited; P. Chaudhuri, M.-C. Huang, W.-Y. Loh, and R. Yao, 1994 previously cited; A. Karalic, I. Bratko, 1997 previously cited; R. Kohavi, 1996 previously cited; and J. R. Quinlan, 1992 previously cited). For these known methods, the processes for constructing segment models for tree nodes are intimately intertwined with the processes for splitting tree nodes, so much so that changing the segment modeling techniques that are employed by these methods requires changing the segmentation processes themselves. The ability to provide a plug-in capability for segment modeling techniques for top-down tree-building methods is a distinguishing feature of the present invention.

It should be noted that the bottom-up agglomerative clustering software developed by Ward (see J. H. Ward, 1963, previously cited) does provide a form of plug-in capability in that one of the inputs to Ward's clustering subroutine is a programmer-supplied subroutine for computing an objective function $$Z[i,j,k-1].$$

In the terminology of the present invention, $Z[i, j, k-1]$ corresponds to the degree of fit score calculated at block 281 of FIG. 28 obtained from merging nodes i and j in the current frontier at the point in the process in which the current frontier contains k nodes. The segmentation-based regression modeling technique developed by Bottenberg and Christal (see R. A. Bottenberg and R. E. Christal, 1961 and 1968 previously cited) was in fact implemented using Ward's clustering subroutine by supplying a particular subroutine for computing degree of fit scores $Z[i, j, k-1]$ (i.e., the objective function). That subroutine just happened to construct regression models as a side effect of calculating an objective function (see J. H. Ward, 1963, previously cited).

Although Ward's clustering subroutine does provides a plug-in capability, the plug-in capability offered by the present invention differs from Ward's method in terms of the process by which segment models are constructed.

Using Ward's method, the bottom-up merging process calls an interface function of the plug-in (i.e., the user-supplied subroutine) to calculate degree of fit scores that result when data segments are merged. In order to construct segment models and calculate degree of fit scores, the plug-in must then access segment training data and/or segment statistics that are stored externally to the plug-in.

By contrast, using the approach disclosed below, external data access does not occur from within plug-ins. Instead, data is supplied to plug-ins one data record at a time, or in groups of records, by calling one or more interface functions of those plug-ins. Data access processes are therefore completely external to and independent from the processes performed by plug-in segment modeling methods.

This difference in the process by which data is accessed is a distinguishing feature of the present invention. The benefit of performing data access steps outside the processes performed by plug-in segment modeling methods is that the data access processes can then be changed without modifying the plug-ins. Using Ward's approach, by contrast, every plug-in could potentially require modification whenever data access processes are changed.

An additional benefit of the present invention is that it achieves a complete decoupling between segmentation processes and segment modeling processes. Using Ward's approach, distinct data segments must be identified explicitly through the use of segment identifiers (e.g., node numbers) that are passed as input to plug-in interface functions. Plug-ins are then required to interpret these identifiers and associate them with corresponding segment data and/or segment statistics in order to perform their computations. Consequently, plug-in segment models must incorporate explicit representations of data segments that are shared between the plug-ins and the segmentation processes.

Using the present invention, on the other hand, plug-ins need not embody any shared representation of data segments. From the point of view of plug-in segment modeling methods, data segments are only implicitly defined in terms of the data that is supplied to plug-ins via interface functions. Explicit identification of these data segments is left completely to the segmentation processes that employ the plug-ins.

A plug-in capability with the above properties can be achieved by constructing a single object-oriented interface for implementing all desired segment modeling techniques. Software embodiments of the segmentation processes disclosed above would then use this interface to construct segment models and obtain degree of fit scores. For example, the interface could be implemented in C++ as an abstract base class with suitable virtual functions employed to implement the interface functions. Derived classes would then provide concrete implementations of the virtual functions in order to implement specific segment modeling techniques.

C++ implementations of the segmentation processes disclosed above would interact with segment model objects solely through the interface defined by the abstract base class without directly accessing the functionality implemented by the derived classes. In so doing, a complete decoupling between segmentation processes and segment modeling processes is achieved.

Figure 33:
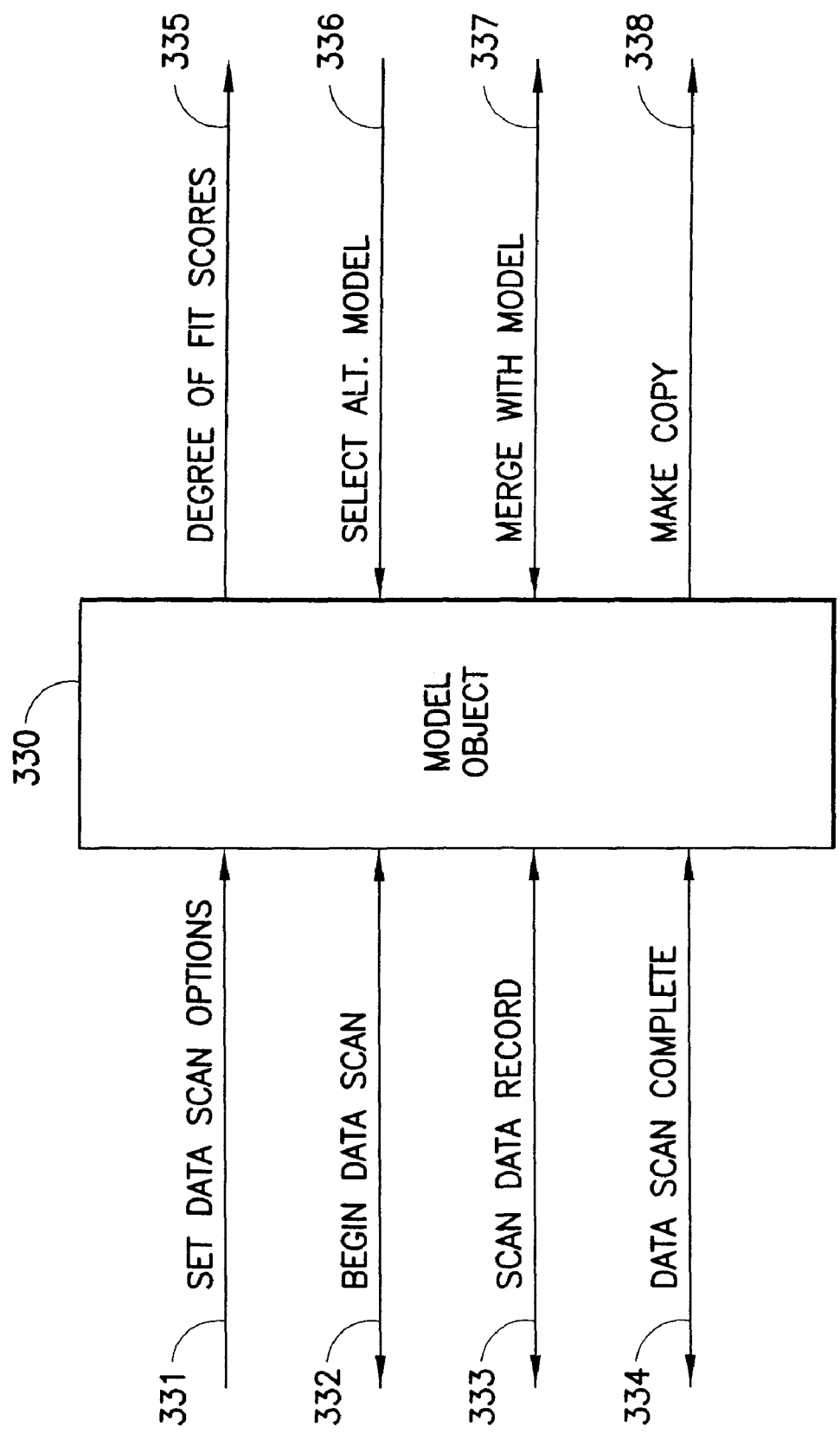
FIG. 33 illustrates an object-oriented interface for segment model objects.

FIG. 33 provides a schematic illustration of an interface for model objects 330 that is well-suited for implementing the plug-in capabilities described above. Although this interface was developed for the purpose of implementing segment models, it is very general. As will be disclosed below, the segmentation-based modeling process illustrated in FIG. 4 can themselves be implemented in the form of model objects 330.

Using the interface illustrated in FIG. 33, model objects are trained and evaluated using four types of interface functions:
1) one or more interface functions 331 for setting data scan options that determine how a model object is to be trained;
2) an interface function 332 for informing a model object that a data scan is about to begin, and for obtaining from the model object an indication of whether a data scan is needed by the object;
3) one or more interface functions 333 for presenting data records to a model object; and
4) an interface function 334 for informing a model object that a data scan is complete, and for obtaining from the model object an indication of whether another data scan is needed by the object.

Figure 34:
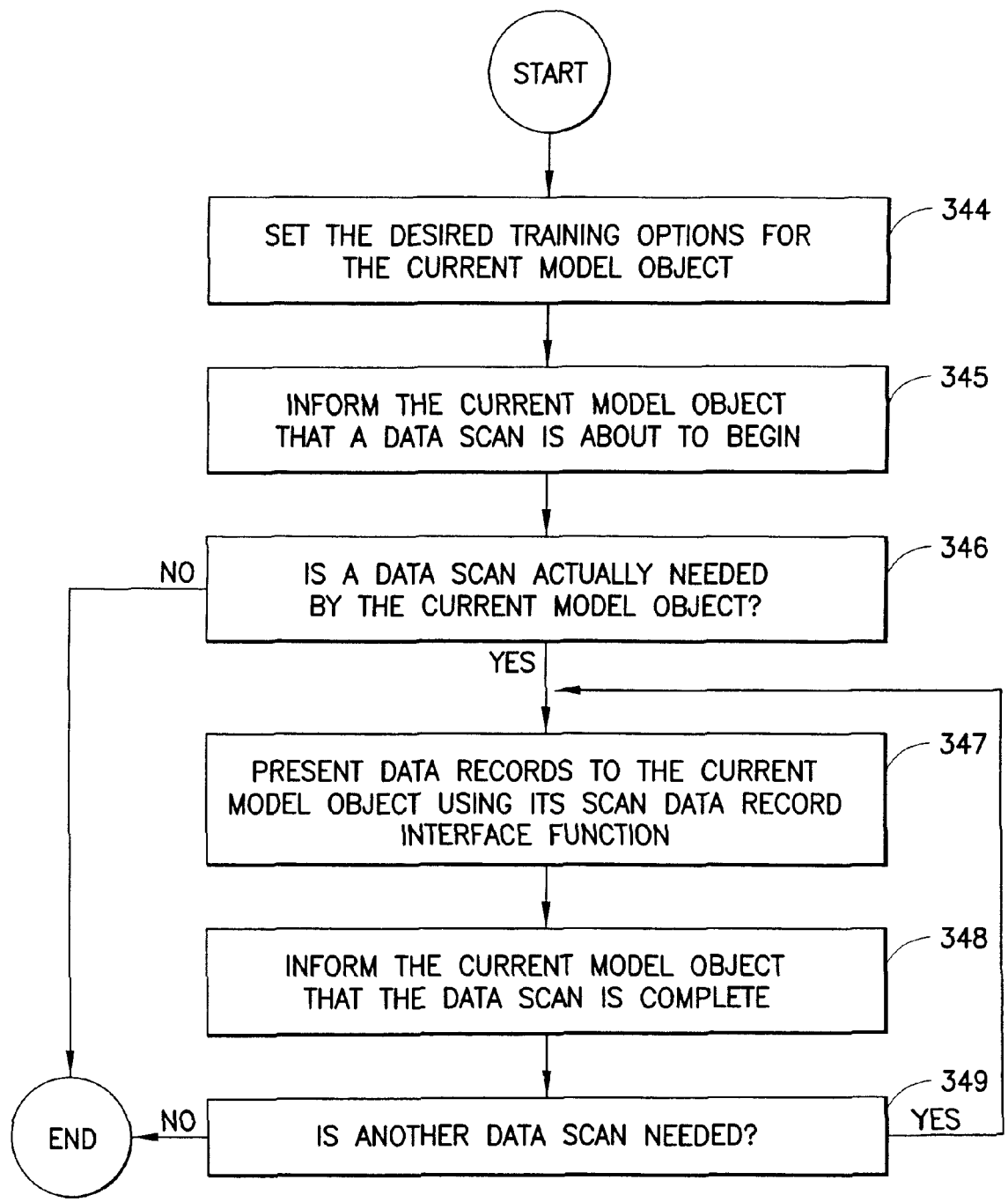
FIG. 34 illustrates a process for training segment model objects using the interface illustrated in FIG. 33.

These interface functions can best be explained in the context of the process illustrated in FIG. 34 that utilizes the interface functions to train a model object. The model object that is being trained is referred to in FIG. 34 as the "current" model object. The process illustrated in FIG. 34 can be used to construct segment model objects at the various points that segment models are constructed in the segmentation processes illustrated in FIGS. 26 through 32.

As will be discussed later below, processes similar to the training process shown in FIG. 34 can be used for evaluating the predictive accuracy of a model object on test data, and for applying a model object to generate predictions.

The first step at block 344 of the training process is to specify to a model object which training options are to be employed by calling one or more interface functions 331 for setting data scan options. As previously discussed, interface functions are needed to set limits on which input data fields can be utilized by a model object, as well as limits on the effective degrees of freedom that can be utilized. Such interface functions logically fall into the category of set-data-scan-options interface functions 331 because such limits need to be set prior to training model objects.

In addition, because different types of training are performed at different points in the segmentation-based modeling processes disclosed above, set-data-scan-options interface functions 331 are also needed to select among the following modes of training:
1) Have a model object construct a single model whose effective degrees of freedom are optimized based only on training data that is to be presented to the model object. Any validation data that is presented to the model object must be ignored for the purpose of optimizing the effective degrees of freedom of the resulting model; however, ValFit scores based on validation data would still be calculated as described below in such cases. This training mode would need to be invoked at block 266 of FIG. 26 and block 292 of FIG. 29. It would likewise need to be invoked at either block 262 of FIG. 26 or block 271 of FIG. 27, and then again at block 281 of FIG. 28, when the bottom-up merging process illustrated in these figures is used as an embodiment of block 41 of FIG. 4.
2) Have a model object construct a single model whose inputs and effective degrees of freedom are the same as another reference model object from the same derived class, where the method of construction employs approximation techniques when necessary in order to construct models based on sufficient statistics that can be merged when nodes are merged, and that allows models and degree of fit scores to be constructed for merged nodes based on merged sufficient statistics. This training mode would need to be invoked at either block 321 of FIG. 32 or block 271 of FIG. 27, and then again block 281 of FIG. 28, when the bottom-up merging process illustrated in these figures is used as a component process for top-down node splitting at block 323 of FIG. 32. If the use of sufficient statistics and/or approximation techniques is simply not feasible for a given class of model objects, then such model objects should employ whatever training algorithms are appropriate when trained in Mode 2. In addition, such model objects should indicate that merging based on sufficient statistics is not feasible by returning an appropriate indicator flag when its merge-with-model interface function 337 is invoked, as will be discussed in detail below.
3) Have a model object reconstruct a single model that was previously created using Training Mode 2 above, except this time without using approximation techniques. The training data to be presented to the model object will be the same as was previously presented when the object was trained in Mode 2. Training Mode 3 would need to be invoked at block 325 of FIG. 32.

4) Have a model object construct a single model whose inputs comprise a specified data field X as well as the inputs of another reference model object from the same derived class. This training mode would need to be invoked at block 312 of FIG. 31.

5) Have a model object construct a single model that utilizes the same inputs as another reference model object from the same derived class, but that utilizes more degrees of freedom than this other model object. This training mode would need to be invoked at block 313 of FIG. 31.

6) Have a model object reconstruct a single model that was previously created using Training Mode 2, 3, 4, or 5 above, except this time optimizing the effective degrees of freedom of the model based on only the training data that is to be presented to the model object. The training data to be presented to the model object will be the same as was previously presented when the object was trained in Mode 2, 3, 4, or 5. Any validation data that is presented to the model object must be ignored for the purpose of optimizing the effective degrees of freedom of the resulting model; however, ValFit scores based on such validation data would still be calculated in this case, as will be described below. This training mode would need to be invoked at block 316 of FIG. 31.

7) Have a model object, that was previously trained using one of the above training modes, (re)generate a set of alternative models of which one will be selected during pruning. The training data to be presented to the model object will be the same as was previously presented when the object was trained in one of the above modes. Training Mode 7 would need to be invoked at block 265 of FIG. 26 and at block 295 of FIG. 29.

8) Have a model object construct a single model based on training data to be presented to the model object whose effective degrees of freedom are optimized based on validation data to be presented to the model object. If no validation data is presented to the model object, then the resulting model should be the same as for Training Mode 1. Training Mode 8 would need to be invoked when the segmentation-based modeling process illustrated in FIG. 4 is itself implemented in the form of a model object. In this case, the training process shown in FIG. 34 would be used as the outer-most loop in such an embodiment of FIG. 4. The process steps performed at blocks 41 and 42 of FIG. 4 would then be performed by such segmentation-based modeling objects at blocks 345, 347, and 348 of FIG. 34. The optional process step at block 43 of FIG. 4 would be performed by again applying the training process shown in FIG. 34, but this time using Training Mode 9 below.

9) Have a model object re-estimate its internal model parameters based on calibration data that is to be presented to the model object, where the re-estimation process alters neither the choice of explanatory input data fields nor the effective degrees of freedom that have been already been selected by the model object. This training mode would need to be invoked at block 43 of FIG. 4.

For all of the above training modes, model objects should internally calculate ValFit scores both on the basis of validation data presented to the objects, and on the basis of training data presented to the objects. As previously discussed, the latter can be accomplished, for example, by adding Bayesian adjustments to the TrainFit scores. As will discussed below, the segmentation-based modeling processes can then select and retrieve the desired ValFit scores using degree-of-fit-scores interface functions 335 illustrated in FIG. 33. Which of these ValFit scores are utilized depends on which embodiment of block 151 of FIG. 15 is used for pruning and which (if any) of the optional steps of these embodiments are performed.

Note that Training Modes 1 and 8 require models to be constructed de novo based on (presumably new) training data to be presented to models objects.

Training Modes 2 and 9, on the other hand, presume that a model has already been constructed and that the model parameters must be re-estimated based on (presumably new) training/calibration data without changing the basic structure of the model. In the case of Mode 9, the previously constructed model is presumed to have been constructed by the current model object during a previous training data scan. In the case of Mode 2, the previously constructed model is provided by a reference model object of the same derived class.

Training Modes 4 and 5 are analogous to Mode 2, except that the model structures must be modified either to incorporate an additional explanatory data field (Mode 4) or to increase the effective degrees of freedom that are being utilized (Mode 5).

Training Modes 3, 6, and 7 differ from the other training modes in that they presume that the current model object has already been trained in another mode and that the same training data will be presented over again in order to construct improved models. In the case of these training modes, any statistics gathered during a previous training scan can be reused for the purpose of model reconstruction and improvement. For some modeling techniques, such as with linear regression methods, models can be reconstructed under such circumstances without performing additional data scans. Training Modes 3, 6, and 7 enable such situations to be exploited to avoid data scans and thereby improve run-time performance of the overall process. However, if previous training scans were not performed for a given model object, then data scans would clearly be required by such objects when trained in Modes 3, 6, or 7.

Note again that different stages of model construction require different modes of training to be employed, as well as different limits to be imposed on the input data fields and the effective degrees of freedom that can be utilized by model objects. As previously discussed, the limit on the effective degrees of freedom that can be utilized by a model object can be implemented as a counter whose smallest value is zero. This counter would be incremented when an object is trained in Mode 5. The counter value for the object being trained would thus be one plus the counter value of the reference model object that is supplied as input to the set-data-scan-options interface function 331 that is invoked to initiate Training Mode 5.

The selection of the above training options can properly be implemented as set-data-scan-options interface functions 331. However, other training options are held constant throughout the segmentation-based modeling processes disclosed above. Set-data-scan-options interface functions 331 are therefore not appropriate for selecting among these other options.

A case in point is the method by which training (i.e., TrainFit) scores and validation (i.e., ValFit) scores are calculated. As previously discussed, TrainFit scores can be calculated simply by measuring model performance on training data. Alternatively, cross-validated TrainFit scores can be calculated. Cross-validated TrainFit scores are known to provide better estimates of true model performance and their use can lead to better models (see, for example, R. Kohavi and G. H. John, "Wrappers for feature subset selection," *Artificial Intelligence*, Vol. 97, No. 1-2, pp. 273-323, 1997). A third alternative is to employ Bayesian methods in order to obtain TrainFit scores that incorporate prior probabilities of alternative models.

Similarly, in the case of ValFit scores that are calculated on the basis of training data, several choices might exist among methods for calculating ValFit scores from TrainFit scores by making suitable adjustments for the degrees of freedom that are utilized. One method is to employ Bayesian adjustments in which negative logarithms of prior probabilities are added to the TrainFit scores. However, other methods are also possible (see, for example, P. Domingos, "Process-oriented estimation of generalization error," *Proc.* $16^{th}$ *International Joint Conference on Artificial Intelligence*, pp. 714-721, Morgan Kaufmann, San Francisco, 1999; T. Scheffer and T. Joachims, "Expected error analysis for model selection," *Proc.* $16^{th}$ *International Conference on Machine Learning*, pp. 361-370, Morgan Kaufmann, San Francisco, 1999).

In the case of ValFit scores that are calculated on the basis of hold-out validation data, it should be noted that ValVar values (i.e., the variances of ValFit values) need only be calculated if the process shown in FIG. 20 is used as the embodiment of block 151 of FIG. 15 and if the optional process step at block 202 of FIG. 20 is performed. If these optional embodiments are not employed, then ValVar values need not be calculated.

Other options include the ability to specify the segmentation method to be employed as an embodiment of block 41 of FIG. 4, the pruning method to be employed as an embodiment of block 42 of FIG. 4, and whether to apply optional process steps, such as block 194 of FIG. 19.

Unlike selecting training modes and imposing limits on the input data fields and the effective degrees of freedom that can be utilized by model objects, these other training options cannot readily be implemented as set-data-scan-options interface functions 331. Instead, it is more appropriate to select among these options using model settings objects, as will be disclosed later below.

Returning to the training process shown in FIG. 34, once the desired training options have been set at block 344 of FIG. 34, the process continues to block 345. At block 345, the begin-data-scan interface function 332 of the current model object is used to inform the object that a data scan is about to begin. After applying the begin-data-scan interface function 332, its return value is then checked at block 346 to determine whether the current model object actually needs a data scan in order to accomplish the training objectives specified by the training mode.

For all training modes except Modes 3, 6, and 7, the value that is returned by the begin-data-scan interface function 332 should indicate that a data scan is needed because new training data is to be presented to model objects in these mode.

In the case of Modes 3, 6 and 7, however, the exact value returned by the begin-data-scan interface function 332 should depend on whether the current model object has in fact been previously trained, and whether the object is capable of performing the desired type of model reconstruction using sufficient statistics that were previously gathered while being trained on the same data but using a different training mode. For example, such reconstruction can be performed for linear regression models based on previously calculated mean and covariance matrices, but reconstruction without re-scanning training data might not be possible for other modeling techniques. In addition, in the case of Mode 7, consideration must also be given to whether a data scan is needed to calculate ValVar values from validation data for the case in which the process illustrated in FIG. 20 is to be used as the embodiment of block 151 of FIG. 15 and the optional process step at block 202 of FIG. 20 is to be performed. Even if a set of alternative models can be reconstructed using sufficient statistics, it might not be feasible to calculate ValVar values without a data scan.

If, at block 346, the value returned by the begin-data-scan interface function 332 of the current model object indicates that a data scan is not needed, then the training process terminates. If, on the other hand, the return value indicates that a data scan is needed, the training process enters a loop comprising blocks 347, 348, and 349.

At block 347, data records are presented to the current model object using its scan-data-record interface function(s) 333. At least one such function should be implemented for presenting records one at a time to a model object. Such an interface function would be called once for each data record to be presented. However, an additional interface function could optionally be implemented for presenting a group of data records per function call.

In either case, associated with each data record should be a flag indicating whether or not that data record is part of a hold-out validation set to be used for estimating ValFit scores. This flag could be calculated on the fly or it could be included as part of the data record. If calculated on the fly, the calculation must be consistent in that each data record should receive the same flag value each time the calculation is made for that data record. The flag should be ignored in calibration mode (i.e., Training Mode 9).

Also associated with each data record should be a numerical value to be used for cross-validation purposes that indicates the cross-validation subset to which the data record belongs. This numerical cross-validation value could likewise be calculated on the fly or it could be included as part of the data record. If calculated on the fly, the calculation must be consistent in that each data record should always receive the same numerical value each time the calculation is made for that data record. It is beneficial to assign numerical values that are uniformly distributed over a given interval and to then divide that interval into subintervals, where each subinterval corresponds to a cross-validation subset. This approach allows the number of cross-validation subsets to be changed simply by changing the number of subintervals and their mappings to cross-validation subsets. Note that no changes would have to be made to the specific numerical cross-validation values that are associated with the data records. The numerical cross-validation value of a data record should be ignored if cross-validation is not being used to calculate TrainFit scores, or if that data record belongs to a hold-out validation set.

Once all relevant data records have been presented to the current model object at block 347 of FIG. 34, the process continues to block 348. At block 348, the data-scan-complete interface function 334 of the current model object is called in order to inform the object that all relevant data records have been presented.

The value returned by the data-scan-complete interface function 334 is a flag indicating whether the current model object needs another data scan. This return value is tested at block 349. If another data scan is needed, the process returns to block 347, at which point the looping process is repeated until the current model object indicates that no further data scans are required. Once this latter condition is detected at block 349, the training process terminates.

When the process shown in FIG. 34 is used to construct segment models within the segmentation processes illustrated in FIGS. 26 through 32, the data records that would be presented to a given segment model object at block 347 would be those data records that belong to the data segment associated with the corresponding node or pair of nodes in the generalized tree. It is therefore the responsibility of the segmentation processes to determine which data records should be presented to which segment model objects. The segment model objects do not make this determination.

It should be emphasized again that this method of decoupling segmentation processes from segment modeling processes is not present in known segmentation-based modeling software. The decoupling is achieved through the use of a scan-data-record interface function 333 to present data records to model objects at block 347 of FIG. 34. This process step is thus a distinguishing feature of the present invention.

Another aspect of using the process shown in FIG. 34 to construct segment models within the segmentation processes illustrated in FIGS. 26 through 32 is that the appropriate training modes must be selected at the various points in these segmentation processes. As previously discussed, Mode 1 should be selected at block 266 of FIG. 26 and block 292 of FIG. 29. Mode 3 should be used at block 325 of FIG. 32. Mode 4 should be used at block 312 of FIG. 31. Mode 5 should be used at block 313 of FIG. 31. Mode 6 should be used at block 316 of FIG. 31. Mode 7 should be selected at block 265 of FIG. 26 and at block 295 of FIG. 29. Mode 9 should be selected at block 43 of FIG. 4.

In the case of blocks 271 of FIG. 27 and block 281 of FIG. 28, either Mode 1 or Mode 2 should be used as the training mode, depending on whether the bottom-up merging process is being used as an embodiment of block 41 of FIG. 4 (use Mode 1) or as a component process for top-down node splitting at block 323 of FIG. 32 (use Mode 2). Likewise, Mode 1 should be used at block 262 of FIG. 26 and Mode 2 should be used at block 321 if models are constructed in the process of generating alternative decompositions at these process steps.

Moreover, at block 281 of FIG. 28, before constructing new models de novo using the training process shown in FIG. 34, an attempt should first be made to construct models based on merging sufficient statistics of models associated with pairs of nodes being merged. This latter capability is provided by the merge-with-model 337 and make-copy 338 interface functions for model objects as illustrated in FIG. 33. The use of these interface functions to construct models at block 281 of FIG. 28 can substantially reduce execution time by avoiding unnecessary data scans.

In addition to constructing models whenever possible based on merged sufficient statistics, the merge-with-model interface function 337 also serves the purpose of merging the constraints (if any) on the explanatory input data fields and effective degrees of freedom of the two model objects that are being merged. As was previously discussed in the context of using a priority queue to cache the results of block 281 of FIG. 28, it is beneficial to merge such constraints when constructing models for pairs of nodes at block 281 even if the models themselves cannot be construct based on merged sufficient statistics. In addition, because it is also beneficial to discard constructed models for pairs of nodes at block 281 after updating the priority queue, it then becomes necessary to reconstruct merged constraints at block 282 for the pair of nodes that is selected and removed from the priority queue, even in cases where the constructed model itself cannot be reconstructed at this point.

The merge-with-model interface function 337 of a model object should therefore perform two tasks. First, it should update the constraints on the explanatory input data fields and effective degrees of freedom that are stored within the model object by combining the existing constraints with those of an input model object of the same derived class that is passed as an argument to the merge-with-model interface function 337. For example, as previously discussed, it can be beneficial to update the allowed explanatory input data fields that can be considered by the model object to be the union of the existing allowed fields and those allowed by the input model object. Similarly, it can be beneficial to update limits on the allowed effective degrees of freedom to be the maximum of the existing allowed effective degrees of freedom of the model object being updated and those of the input model object passed as an argument to the merge-with-model interface function 337.

The second task that the merge-with-model interface function 337 of a model object should perform, whenever it is possible to do so, is to update the sufficient statistics stored in the model object by combining the existing sufficient statistics with those of the input model object, and to then construct a new model based on the updated sufficient statistics. The model that is constructed should be the same, to within round-off error, as the model that would be constructed if the model object were trained on the combined data used to train the two model objects prior to merging, using the same training mode.

The merging of training constraints should always be performed by the merge-with-model interface function 337 of a model object. The merging of sufficient statistics and the construction of an updated model should be performed only when it is feasible to do so. The return value of the merge-with-model interface function 337 is a flag indicating whether this second task was performed. When it is not feasible to construct an updated model on the basis of merged sufficient statistics, the merge-with-model interface function 337 of a model object should therefore reset the constructed-model portion of the internal state of the model object to an initial untrained state, and set the return flag to indicate that an updated model was not constructed.

Figure 35:
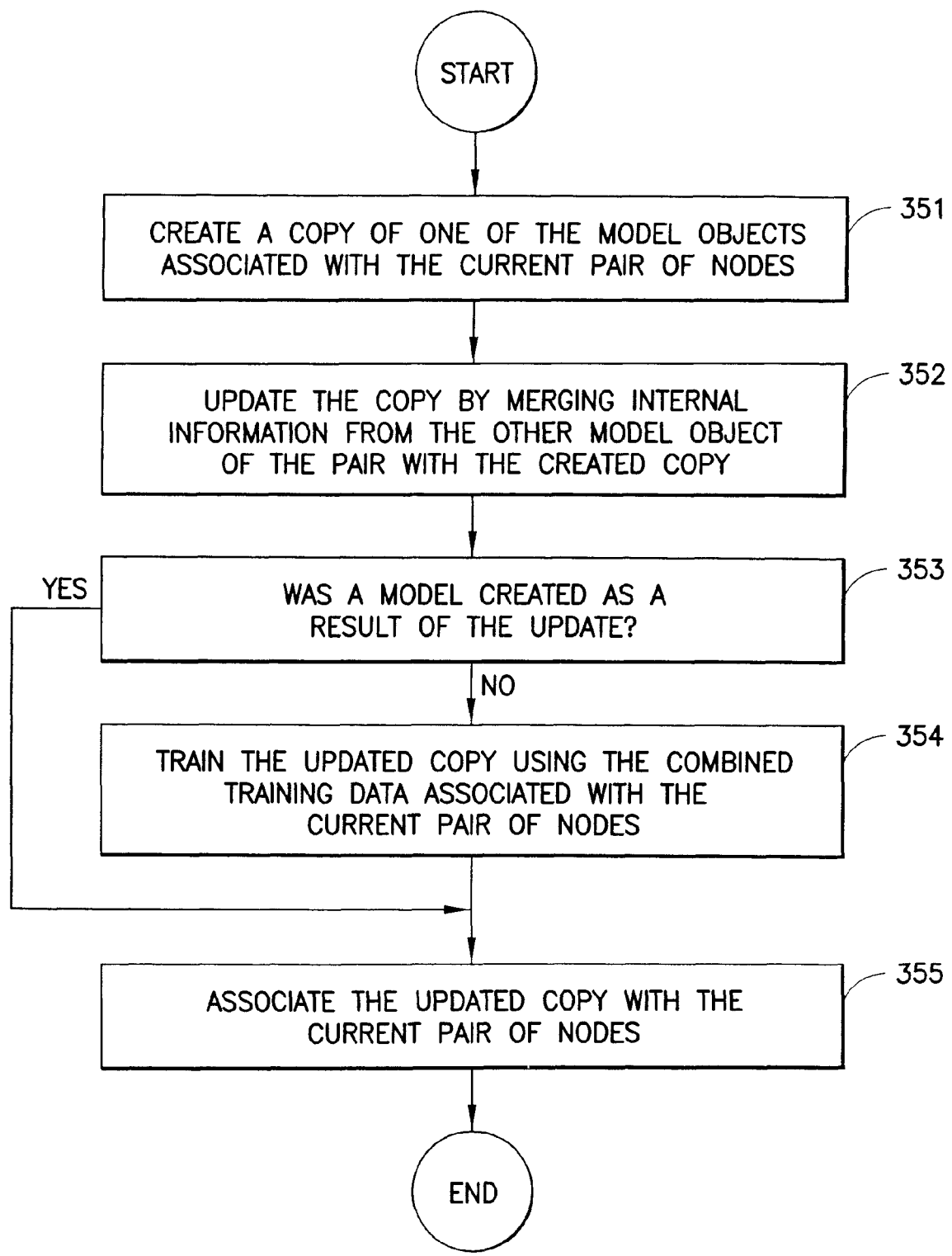
FIG. 35 illustrates a process for constructing model object for pairs of merged nodes using the interface illustrated in FIG. 33.

FIG. 35 illustrates a process that can be used to construct models at block 281 of FIG. 28 using the above merge-with-model interface functions 337. The process in FIG. 35 is applied to each pair of nodes that satisfies the specified constraint at block 281.

The first step of the process shown in FIG. 35 is performed at block 351. At block 351, the make-copy interface function 338 is used to create a copy of one of the model objects of the pair. The make-copy interface function 338 should include as an input argument a flag that indicates whether an equivalent copy should be made that duplicates the current state of training of a model object, including any statistics or parameter estimates that may have been calculated, or whether the copy should be reset to a pre-training state while duplicating all other relevant information, such as constraints on the explanatory input data fields and the effective degrees of freedom that can be utilized. At block 351, the input flag to the make-copy interface function 338 should indicate that an equivalent copy is to be made.

After creating at block 351 a copy of one of the model objects associated with the current pair of nodes, the process continues to block 352. At block 352, the merge-with-model interface function 337 described above is used to update the copy based on the other model object associated with the current pair of nodes.

The flag returned by the merge-with-model interface function 337 is then checked at block 353 to determine whether an updated model was successfully constructed as a result of the merging operation. If so, the process continues to block 355, where the updated copy then becomes the model object associated with the current pair of nodes.

If, on the other hand, an updated model was not constructed, the process continues to block 354 where the updated copy is trained on the combined data associated with the two nodes of the current pair of nodes. Training is accomplished using the process shown in FIG. 34. After training is complete, the updated copy then becomes the model object associated with the current pair of nodes at block 355.

To reconstruct merged training constraints for pairs of nodes that are selected and removed from the priority queue at block 282 of FIG. 28, the process shown in FIG. 35 is again applied, but this time omitting the process steps at blocks 353 and 354. Thus, the make-copy interface function 338 is used to create an equivalent copy of one of the model objects associated with the pair of nodes selected at block 282. The merge-with-model interface function 337 is then used at block 352 to update this copy based on the other model object associated with the selected pair of nodes, and the updated copy then becomes the model object associated with the selected pair of nodes at block 355.

As previously mentioned, a process similar to the one shown in FIG. 34 can be used for evaluating the predictive accuracy of model objects on test data. In this case, instead of setting a training mode at block 344 of FIG. 34, one would use a set-data-scan-options interface function 331 to inform the current model object that an evaluation data scan will be performed. The rest of the process is then performed as described above, except that test data is presented to the current model object at block 347 instead of training data. In particular, the same begin-data-scan 332, scan-data-record 333, and data-scan-complete 334 interface functions could used for evaluation as were used for training. The effect of the evaluation process would be to recalculate the validation-data ValFit scores of the current model object by treating the test data in the same manner as validation data.

To apply a model to generate predictions, it is beneficial to implement an additional scan-data-record interface function 333 that applies a trained model object to an input data record and then returns an application result object that contains the desired prediction. The returned application result object is then queried using appropriate interface functions for application-result objects to obtain the prediction.

This approach complies with the proposed ISO/IEC SQL standard for data mining (see ISO/IEC FCD 13249-6:200x (E), Document Reference Number ISO/IEC JTC 1/SC 32N0647, previously cited). According to this standard, a trained model object is applied to an input data record using a User Defined Function (UDF) installed in the database. The apply-model UDF then returns a Data Mining Application Result object that can be queried using additional get-prediction UDF's to obtain predicted values from result objects.

In order to handle model objects that are trained in Mode 7, it is useful for the apply-model scan-data-record interface function 333 to take as an additional argument the ModNum of the desired alternative model generated by the model object that is to be used to generate the prediction. This additional input argument can be ignored by model objects that have constructed only a single model, such as when model objects are trained in modes other than Mode 7. If ModNum is not specified, then the best alternative model as determined from the training data should be applied.

Interface functions 335 also need to be implemented to access degree of fit scores that are calculated by model objects when they are trained or evaluated. It is beneficial to implement three types of degree-of-fit-score interface functions 335 based on the three types of scoring information utilized by the various embodiments of the process shown in FIG. 4.

A first degree-of-fit-score interface function 335 is needed to obtain tables of scores for alternative models that are constructed by model objects when trained in Mode 7. An illustrative example of such a table is shown in Table 3; however, the table as illustrated should be expanded to included two sets of ValFit, ValPts, and ValVar values: one calculated on the basis of training data, the other on the basis of separate hold-out validation data. This first degree-of-fit-score interface function 335 would be used for pruning purposes at block 172 of FIG. 17, blocks 184 and 185 of FIG. 18, and blocks 223 and 224 of FIG. 22. As will be discussed in detail below, the determination of which of the two sets of ValFit, ValPts, and ValVar values would be utilized at these process blocks would be based on the process options that have been selected, as well as on whether separate validation data was presented to the corresponding model object. When this first degree-of-fit-score interface function 335 is invoked on a model object that was trained in a mode other than Mode 7, the table that is returned should comprise a single row corresponding to the single model constructed in that training mode.

A second degree-of-fit-score interface function 335 is needed to obtain TrainFit scores of the single models that are constructed when model objects are trained in all modes except Mode 7. For model objects trained in Mode 7, the return value should be the same as for Mode 1. This second degree-of-fit-score interface function 335 would be used to guide the bottom-up and top-down segmentation processes at blocks 281 and 282 of FIG. 28 and at block 314 of FIG. 31.

A third degree-of-fit-score interface function 335 is needed to obtain ValFit scores of the single models that are constructed when model objects are trained in all training modes except Mode 7. For model objects trained in Mode 7, the return value should be the same as for Mode 1. This third degree-of-fit-score interface function 335 would be used for trial pruning purposes at block 303 of FIG. 30. The ValFit score that is returned by a model object should therefore be calculated on the basis of validation data, provided validation data has been presented to the model object. If only training data has been presented, then the ValFit score that is returned should be calculated on the basis of this training data. If ValFit scores for a set of alternative models is always maintained by a model object independent of the training mode, then the smallest ValFit score should be returned; otherwise, the ValFit score of the single model constructed on the basis of training data alone should be returned.

For pruning purposes, an interface function 336 is also needed for selecting among alternative models for model objects that have been trained in Mode 7. As previously discussed in the context of Table 3, the input to this select-alternative-model interface function would be the model number of the desired alternative model. The effect of the interface function would be to change the internal state of a model object so as to eliminate all other alternative models from further consideration. This interface function would be invoked at block 154 of FIG. 15, as previously discussed.

As previously mentioned, the model object interface shown in FIG. 33 is very general in that it permits an extremely wide variety of predictive modeling techniques to be implemented according to the interface and to thereby be utilized for constructing segment models. Two illustrative examples are now disclosed that demonstrate how to implement modeling techniques according to this interface.

A first illustrative embodiment of a modeling technique that employs the object interface shown in FIG. 33 is disclosed below for linear regression modeling. Linear regression is the workhorse of predictive modeling. Quite likely it is used by applied statistician and data analysts more often than any other modeling technique.

In order to satisfy the requirements imposed by the model object interface shown in FIG. 33, the embodiment of a linear regression model object class disclosed below utilizes the Normal Equations method for estimating regression coefficients (see, for example, G. Golub and C. Van Loan, *Matrix Computations*, Second Edition, John Hopkins University Press, 1989). The Normal Equations method is very advantageous in the present context because the calculations explicitly utilize mean and covariance matrices, and these matrices can be efficiently calculated in a single sequential scan of the training data by performing incremental updates as each data record is scanned. This latter property enables the necessary scan-data-record interface functions 333 to be readily implemented. Moreover, the mean and covariance matrices calculated from disjoint data sets can be combined to obtain the mean and covariance matrices for the union of the data sets without having to refer back to the original training data. This latter property enables merge-with-model interface functions 337 to be readily implemented.

The Normal Equations method is known to have a number of computational disadvantages (see, for example, A. Bjorck, *Numerical Methods for Least Squares Problems*, SIAM, Philadelphia, 1996). First, there is a potential loss of accuracy in the explicit computation of the covariance matrix when the input training data is poorly scaled. Second, the results are very sensitive to any potential numerical ill-conditioning in the covariance matrix. However, in the present context, the advantages of the Normal Equations described earlier above far outweigh these disadvantages. Furthermore, the numerical ill-conditioning problem is circumvented by employing variable selection, which regularizes the computations and leads to more stable estimates of the linear regression coefficients.

A forward step-wise variable selection method is employed in which regression variables are introduced one at a time so as to maximally improve (i.e., reduce) the degree-of-fit score (i.e., TrainFit score) of the regression equation. Each introduction of a variable increases the effective degrees of freedom utilized by the resulting regression equation. In addition, each new regression equation obtained when a variable is introduced corresponds to a distinct predictive model. The variable selection method therefore produces a set of alternative predictive models with varying degrees of freedom and with associated degree-of-fit scores. The variable selection method therefore meets the minimum information requirements of the embodiments of block 42 of FIG. 4 that select among alternative models so as to optimize predictive accuracy. The information requirements are illustrated by the example in Table 3.

Linear-regression model objects should implement the interface functions that are shown in FIG. 33 and that are discussed above. Methods for implementing these functions are now disclosed.

Recall that the set-data-scan-options interface functions 331 for model objects set limits on the explanatory input data fields that can be used by model objects for potential inclusion in any models constructed, as well as limits on the effective degrees of freedom that can be employed by those models. Limits on the effective degrees of freedom are expressed in terms equivalent to the number of times the model object was told to increase its internal degrees of freedom by invoking Training Mode 5.

Typical implementations of linear regression construct regression equations that attempt to predict a specified numerical output data field y as a linear function of specified numerical input data fields $f_1, \ldots, f_n$. However, the above limits on explanatory input fields and effective degrees freedom can be utilized to improve upon such typical implementations. In particular, the above limits can be used to efficiently implement some of the capabilities found in the MARS program (see J. H. Friedman, 1991, previously cited).

The MARS program can automatically introduce nonlinear transformations of explanatory input fields as well interaction terms (i.e., cross-products of transformed input fields). To obtain a comparable capability with respect to the present invention, linear regression equations would be constructed from derived input variables $x_1, \ldots, X_L$ that are obtained by transforming the values of the input features $f_1, \ldots, f_n$. Some of the derived variables would be equal to some of the (non-transformed) input features. Other derived variables could be nonlinear transformations of some of the input features. For example, one could employ polynomial transformations, such as $x_i = (f_j)^k$ where $k$ is an integer, or the so-called "hockey stick" transformations used by MARS, such as $x_i = \max(0, f_j - a)$ where $a$ is a numeric value.

Still other derived variables could be cross-product terms between input features, such as $x_i = (f_j)(f_k)$.

Similarly, transformations of derived variables are also possible, such as $x_i = (x_j)^k$ and $x_i = \max(0, x_j - a)$, as are cross-product terms between derived variables, such as $x_i = (x_j)(x_k)$.

Note that repeated application of the above equations to create new derived variables from input features and existing derived variables would result in a combinatorial explosion of derived variables. However, this combinatorial explosion can be controlled via the limit imposed on the effective degrees of freedom of a model.

For example, when the degrees-of-freedom limit is set to zero, the derived variables can simply be the input data fields. When the limit is set to one, nonlinear transformations of the input fields can be included. When the limit is set to two, cross products of the input fields can be included. When the limit is set to three, nonlinear transformations of the cross products of the input fields can be included. As the limit is further increased, one can alternative between including nonlinear transformations of previously introduced derived variables and cross products among previously introduced derived variables.

Alternatively, one can choose not to include any further derived variables beyond those described above. This approach can be beneficial from a practical standpoint because each successive set of cross products approximately squares the number of derived variables, causing the number of derived variables to grow exponentially and to become unmanageable with the introduction of each successive set of cross products.

One can also choose not to introduce cross products at all, in which case level of modeling that is performed by the linear regression model object will be more akin to generalized additive modeling (T. J. Hastie and R. J. Tibshirani, *Generalized Additive Models*, Chapman & Hall, New York, 1990).

A fourth option would be to use the limit on the effective degrees of freedom to limit not only the extent of the nonlinear transformations and cross products that are considered, but also the number of derived variables that are thereby obtained that can appear in a regression equation. For example, a limit of one might allow at most one derived variable obtain via a nonlinear transformation or cross product to appear in a regression equation. A limit of two might allow at most two such derived variables to appear, a limit of three might allow at most three, etc. Alternatively, the number of derived variables obtained via nonlinear transformations and/or cross products much increase by factors of two, etc. The motivation for these limits is that, as the number of derived variables increases, so too does the effective degrees of freedom, often in direct proportion to the number of derived variables.

It can, however, be beneficial to include nonlinear transformations of the input data fields among the derived variables when the limit on the effective degrees of freedom is set to zero, instead of waiting until the limit is set to one. This approach allows some nonlinearities to be modeled via linear regression without having to resort to segmentation, particularly when combined with the top-down tree building process shown in FIG. 29.

It should also be noted that, when constructing derived variables, the input data fields that can be used in their construction are limited to those specified in the limits that have been imposed on the explanatory input data fields that can be used by the model object in question. Thus, any limits placed on the explanatory input data fields of a regression model object will likewise limit the number of derived variables that are constructed.

The above approach—that of constructing derived variables for regression modeling based on limits imposed on the explanatory input data fields and effective degrees of freedom that can be employed—is a unique and novel aspect of the present invention. Although similar derived variables are constructed by the MARS program (see J. H. Friedman, 1991, previously cited), their construction is not based on limits imposed on the explanatory input data fields and effective degrees of freedom that can be employed by the resulting regression model.

When set-data-scan-options interface functions 331 are used to set the training mode of a regression model object to one of Modes 1, 2, 4, 5, 8, or 9, the mean and covariance matrices that are needed for calculating regression coefficients using Normal Equations should be initialized with zero entries when the begin-data-scan interface function 332 of the regression model object is invoked. In addition, the value of the flag returned by the begin-data-scan interface function 332 should indicate that a data scan is required. For the aforementioned training modes, the mean and covariance matrices must be calculated from scratch using based on the training data presented to the regression model object via invocations of the object's scan-data-record interface function.

However, in the case of Training Modes 3 and 6, no modifications need to be made to either the mean and covariance matrices of the regression object or the regression equations constructed on the basis of these matrices. For these training modes, the value of the flag returned by the begin-data-scan interface function 332 of a regression model object should indicate that no data scan is required.

Similarly, no modifications need to be made to the mean and covariance matrices of a regression object or its regression equations when the regression object is trained in Mode 7. However, in order to calculate non-zero ValVar values (see Table 3) for each alternative regression equation that is constructed, an additional scan over the validation data is needed because ValVar values are not calculated in the other training modes using the method described below. Thus, for Training Mode 7, the value of the flag returned by the begin-data-scan interface function 332 of a regression model object should indicate that a data scan is required when ValVar values are to be calculated.

When a data scan is required, the scan-data-record interface function 333 used to train a regression object must update the object's mean and covariance matrices for each invocation of the interface function—except in Training Modes 3, 6, and 7 wherein the mean and covariance matrices would already have been calculated in a previous training mode. In the latter three training modes, no updated to the mean and covariance matrices would be performed.

When updates are performed, three different pairs of mean and covariance matrices would in fact be updated: two pairs for the training data records and one pair for the validation data records. Two pairs of mean and covariance matrices are needed for training data because the variable selection algorithm disclosed below for regression model objects is based on dividing the input training data into two separate subsets. The first subset is used to determine the order in which derived variables are introduced into a regression equation by a forward selection procedure. The second subset is used to select the optimum number of derived variables to use when (a) a regression model object is trained in Mode 1, (b) when a regression model object is trained in Mode 8 but no validation data is presented, and (c) when calculating TrainFit scores for a regression model object that was trained in Modes 2 through 7. In addition a pair of mean and covariance matrices is needed for validation data in order to calculate ValFit scores.

As previously discussed, a flag is associated with each data record to indicate whether it is a training record or a validation record. This flag is used to distinguish validation data from training data. The two subsets of training data are distinguished by making use of the numerical value previously discussed that is associated with each data record for cross-validation purposes. This cross-validation value is compared to a threshold value. Those training records whose cross-validation values fall at or below the threshold are classified as Train/Train (T/T) records; those whose cross-validation values fall above the threshold are classified as Train/Evaluate (T/E) records. The threshold is selected so that the T/T and T/E subsets of training data have roughly the same number of records.

To specify how the mean and covariance matrices for the above three subsets of data (i.e., T/T, T/E, and validation) are calculated, let $\xi_i = [x_{i1} \cdots x_{iL} y_i]^T$ denote the column vector that is extracted from the i'th data record from one of these subsets, where $x_{i1}, \ldots, x_{iL}$ denote the values of the L derived variables constructed from explanatory data fields as described above, and where $y_i$ denotes the value of the data field that is to be predicted. Let $\{\xi_i\}_{i=1}^{m}$ denote the column vectors that have been extracted from the data records seen thus far from the subset of data being considered. The current mean $\mu_m$ and covariance $S_m$ matrices constructed thus far for that subset would then be given by $$\mu_m = \frac{1}{m}\sum_{i=1}^{m}\xi_i,$$

-continued $$S_m = \sum_{i=1}^{m} (\xi_i - \mu_m)(\xi_i - \mu_m)^T.$$

When a new data record arrives that belongs the subset, the column vector $\xi_{m+1}$ extracted from this data record would be used to update the corresponding mean and covariance matrices for the subset using the equations $$\mu_{m+1} = \frac{m\mu_m + \xi_{m+1}}{m+1},$$

$$S_{m+1} = S_m + \frac{m+1}{m}(\mu_{m+1} - \xi_{m+1})(\mu_{m+1} - \xi_{m+1})^T.$$

The update to the mean vector μ is straightforward. The update to the covariance matrix S amounts to a rank-one update to a symmetric matrix that can be stored in packed format and can be carried out using standard BLAS numerical analysis library subroutines (see Golub and Van Loan, 1989, previously cited).

Note that each data record that is passed as input to the training scan-data-record interface function 333 can belong to only one of the three possible subsets of data (i.e., T/T, T/E, and validation), as determined by the validation flag and the numerical cross-validation value associated with the data record. Hence, only one of the three corresponding pairs of mean and covariance matrices is updated using the above equations each time the training scan-data-record interface function 333 is invoked.

In Training Modes 3, 6, and 7, the mean and covariance matrices are not updated when the training scan-data-record interface function 333 is invoked. Instead, ValVar scores are calculated for the sequence of alternative regression models constructed when training was performed in a different training mode. The calculation of these ValVar scores is discussed below after presenting a method for constructing a sequence of alternative regression models.

When the data-scan-complete interface function 334 of a regression model object is invoked, a sequence of alternative regression models is constructed based on the training data. However, in the case of Training Modes 3, 6, and 7, the sequence that would be constructed would be the same as was previously constructed in a different training mode. Thus, for Modes 3, 6, and 7, there is no need to repeat this construction process.

A sequence of regression models is constructed by introducing derived variables one at a time in a forward stepwise fashion in order to create a sequence of regression equations. Each derived variable is selected so as to maximally reduce the variance of the resulting regression model as measured on the T/T subset of the training data. Excluded from consideration are those derived variables that are highly collinear with respect to (i.e., nearly linearly dependent on) the derived variables that have already been introduced earlier in the sequence. Such derived variables are excluded in order to avoid numerical instability in the calculation of regression models.

Collinearity is detected by examining the model variance obtained when a regression equation is constructed that uses the derived variables already introduced to predict the next candidate derived variable to be introduced. The ratio of the residual variance of the resulting regression model, divided by the variance of the candidate derived variable, is calculated and compared to a threshold. If the ratio falls below the threshold, then that candidate derived variable is declared to be collinear and is omitted from further consideration. A threshold of 0.001 has been found to work well in practice, which corresponds to a situation in which the derived variables already selected account for at least 99.9% of the variance observed in a candidate derived variable.

Once a sequence of derived variables has been selected using the T/T subset of the training data, a best subset of derived variables is identified based on the regression models that were constructed as each variable was introduced. Specifically, the best subset of derived variables is the one whose corresponding regression model maximizes the likelihood of the predicted data field as measured on the T/E portion of the training data.

After selecting a best subset of derived variables, the mean and covariance matrices of the T/T and T/E subsets of training data are merged (as described below) and the resulting merged matrices are used to re-estimate the coefficients and variances of the regression models that were constructed. After performing the above calculations, the data-scan-complete interface function 334 then returns a flag whose value indicates that another data scan is not required.

Many well-known methods can be used to implement the above calculations (see, for example, A. Bjorck, 1996, previously cited). In particular, a method based on Cholesky factorization can be used to simultaneously solve for the coefficients of the regression equations and to identify the best derived variable to be added next in the series of regression equations that are produced. Although Cholesky factorization is more complicated than other methods, it has the benefit of reducing the effect of numerical instability due to roundoff error.

Cholesky factorizations can be defined as follows (see, for example, A. Bjorck, 1996, previously cited). Note that the covariance matrices that are calculated as described above have all variables centered about their estimated means. Consequently, the "intercept" terms of the resulting regression equations do not have to be explicitly calculated. For a subset of M data records, let the M×(L+1) centered data matrix be given by $$[X \quad y] = \begin{bmatrix} x_{11} & \cdots & x_{1L} & y_1 \\ \vdots & & \vdots & \vdots \\ x_{M1} & \cdots & x_{ML} & y_M \end{bmatrix}.$$

The (L+1)×(L+1) covariance matrix S calculated from this subset of data as described above is therefore equal to $$S = \begin{bmatrix} X^T X & X^T y \\ y^T X & y^T y \end{bmatrix},$$

where $X^T X$ denotes the covariance of the L derived variables, $X^T y$ denotes the correlation of the derived variables with the field to be predicted, and $y^T y$ denotes the variance of the field to be predicted.

The Cholesky factorization of S with the same partitioning as the above equation, but with row and column permutations applied to the leading L rows and columns of S (i.e., excluding the last row and column which are held fixed), is given by $$S = \begin{bmatrix} P(X^TX)P^T & PX^Ty \\ y^TXP^T & y^Ty \end{bmatrix} = \begin{bmatrix} R^T \\ Z^T & \rho \end{bmatrix} \begin{bmatrix} R & z \\ & \rho \end{bmatrix},$$

where in the above equation P is a row permutation matrix that defines the permutation that has been applied.

If all L derived variables are allowed to appear in the regression equation, then the regression coefficient vector a is obtained by solving the linear system $a=P^TR^{-1}z$. The predicted value of y produced by the resulting regression equation is therefore given by Xa. The total squared error of these predictions (i.e., $(y-Xa)^T(y-Xa)$) is given by $\rho^2$, where $\rho$ appears in the lower right entries of the Cholesky factorization matrices.

In general, the regression coefficient vector a can be calculated based on only a subset of derived variables. In this case, the submatrix of S that corresponds to the subset of derived variables would be constructed and a Cholesky factorization would be performed for that submatrix.

It should be noted that the above Cholesky factorization with a symmetric permutation can be carried out in-place on matrix S using the BLAS numerical analysis library subroutines (see Golub and Van Loan, 1989, previously cited) when S is stored in packed format.

The process for selecting derived variables utilizes the matrix S calculated from the T/T subset of the training data. A sequence of symmetric permutations are chosen to include the most useful derived variables for modeling the field to be predicted, while excluding collinear features that degrade numerical accuracy. The symmetric permutations effectively select the submatrix of S on which to perform a Cholesky factorization.

Consider the Cholesky factorization as a sequence of in-place transformations of the matrix S of the form $$S \equiv S_{(0)} \to P_{(1)}S_{(1)}P_{(1)}^T \to \cdots \to P^{(n)}S_{(n)}P_{(n)}^T,$$

where $P_{(i+1)}=\Pi_{(i+1)}P_{(i)}$ are permutation matrices with $\Pi_{(i+1)}$ denoting a row permutation in the (i+1) row of the matrix, with the i'th transition above only modifying the lower (L+1−i)×(L+1−i) submatrix, and where n is less than or equal to L (i.e., because some derived variables will be excluded due to collinearity). For example, consider the transition from $S_{(0)}$ to $S_{(1)}$ after applying a specific symmetric permutation (to be chosen as described below) of the leading L×L submatrix. The matrix $S_{(1)}$ is then given by $$S_{(1)} = \begin{bmatrix} \|x_1\|^2 & \cdots & \hat{x}_1^Tx_i & \cdots & \hat{x}_1^Ty \\ & \ddots & & & \vdots \\ & & \|x_i - (\hat{x}_1^Tx_i)\hat{x}_1\|^2 & \cdots & \frac{x_i^Ty - (\hat{x}_1^Tx_i)(\hat{x}_1^Ty)}{\|x_1 - (\hat{x}_1^Tx_i)\hat{x}_1\|} \\ & & & \ddots & \vdots \\ & & & & \|y - (\hat{x}_1^Ty)\hat{x}_1^T\|^2 \end{bmatrix},$$

where $\hat{x}_1=x_1/\|x_1\|$ is the unit vector in the $x_1$ direction. Note that only the upper-triangular part of the symmetric matrix is displayed, in which ultimately the strict upper triangular part contains the elements, and the diagonal contains the square of the elements in the corresponding Cholesky factor. The lower right diagonal entry $\|y-(\hat{x}_1^Ty)\hat{x}_1^T\|^2$ of matrix $S_{(1)}$ is the total residual squared prediction error after including the derived variable $x_1$. This prediction error is minimized by selecting the derived variable $x_1$ so as to maximize $\hat{x}_1^Ty$. With $x_1$ selected, the row permutation $\Pi_{(1)}$ and the corresponding column permutation have the effect of moving $x_1$ so that it corresponds to the first explanatory variable in matrix $S_{(1)}$.

Proceeding recursively, the application of step i of the Cholesky factorization replaces the lower (L+1−i)×(L+1−i) submatrix by the covariance matrix for the remaining (L−i) derived variables and the predicted field, with all the features being adjusted for their partial correlations on the first i selected derived variables.

At each step i, collinear derived variables are detected by examining the diagonal of the matrix $S_{(i-1)}$ for small-valued entries. The lower (L+1−i) diagonal entries correspond to the total squared errors obtained when regression equations are constructed that use the derived variables already introduced (i.e., that correspond to rows 1 through i−1 of matrix $S_{(i-1)}$) to predict the next candidate derived variables that could be introduced (i.e., that correspond to rows i through L of matrix $S_{(i-1)}$). If the ratios of these diagonal entries divided by the corresponding diagonal entries of the original matrix S fall below a specified threshold, then the corresponding derived variables are declared to be collinear with the variables already selected and are eliminated from consideration for selection. A threshold of 0.001 has been found to work well in practice, which corresponds to a situation in which the derived variables already selected account for at least 99.9% of the variance observed in a candidate derived variable.

Of the remaining candidate derived variables not excluded because of collinearity, a best derived variable is selected at step i so as to minimize the lower right diagonal entry of the resulting matrix $S_{(i)}$.

The above procedure thus introduces non-collinear derived variables into the linear regression model in such a way that every new variable that is added leads to a maximum decrease in the residual variance of the prediction error, as measured over the T/T subset of the training data. The procedure terminates after identifying L'≦L variables when no further non-collinear variables can be found.

From the resulting order list of L' derived variables, the optimum subset of derived variables is selected from this order list so as to maximize the likelihood of the predicted data field as measured on the T/E portion of the training data when the regression model that corresponds to the selected subset of derived variables is applied to the T/E data.

Let $a_{(i)}$ denote the vector of linear regression coefficients obtained at the i'th step of the stepwise selection process described above. The vector $a_{(i)}$ will thus have zero entries except for the coefficient estimates of the first i derived variables selected during the stepwise selection procedure. The corresponding residual error $\tilde{\rho}_{(i)}^2$ on the T/E subset of training data is then given by $$\tilde{\rho}_{(i)}^2 = [-a_{(i)}^T \quad 1][\tilde{S} - \tilde{M}(\tilde{\mu}-\mu)(\tilde{\mu}-\mu)^T]\begin{bmatrix} -a_{(i)} \\ 1 \end{bmatrix},$$

where $\tilde{M}$ is the number of data records in the T/E subset of the training data, $\tilde{\mu}$ and $\tilde{S}$ are the mean vector and covariance matrix, respectively, calculated from the T/E subset, and $\mu$ is the mean vector calculated from the T/T subset of the training data. The above equation effectively re-centers the T/E covariance matrix $\tilde{S}$ about the mean vector of the T/T data.

Except when training in Mode 9, the optimum number $\hat{L}$ of derived variables to include in the regression equation is determined by minimizing the negative log-likelihood of the data field to be predicted as measured on the T/E subset of training data. In Mode 9, on the other hand, the number of derived variables to use is set equal to the minimum of the number of non-collinear derived variables L' and optimum number $\hat{L}$ of derived variables that was determined while previously training in a mode other than Mode 9.

Note that minimizing negative log-likelihood is equivalent to maximizing likelihood. The negative log-likelihood $\tilde{\Lambda}_{(i)}$ measured on the T/E data for the i'th regression model is given by $$\tilde{\Lambda}_{(i)} = \frac{1}{2}\left[\tilde{M}\ln(2\pi\sigma_{(i)}^2) + \frac{\tilde{\rho}_{(i)}^2}{\sigma_{(i)}^2}\right],$$

where $$\sigma_{(i)}^2 = \frac{b_{(i)}}{M - i - 1}$$

is the estimated residual variance of the i'th regression model, M is the number of data records in the T/T subset of the training data, and $b_{(i)}$ is the lower right diagonal entry in the matrix $S_{(i)}$ obtained at the i'th step of the Cholesky factorization process discussed above that defines the total squared prediction error obtained on the T/T subset of the training data after selecting the first i derived variables.

The optimum number $\hat{L}$ of derived variables for training modes other than Mode 9 is therefore given by $$\hat{L} = \underset{i}{\operatorname{argmin}}\tilde{\Lambda}_{(i)}, 0 \le i \le L^l.$$

Note that if $\hat{L}=0$ (i.e., if no derived variables are selected for inclusion in the regression model), then the value predicted by the model will simply be the mean of the data field to be predicted as calculated on the training data.

Having determined the optimum $\hat{L}$ derived variables to include in the linear regression model, the mean and covariance matrices calculated from the T/T and T/E subsets of the training data are merged to obtain the mean and covariance matrices for the union of the subsets (i.e., the entire training data). More accurate estimates for the coefficients of the selected derived variables are then calculated from the merged mean and covariance matrices. Cholesky factorization is used again to determine the final sequence of alternative regression models; however, the optimum number of variables based on the training data alone is given by $\hat{L}$ as calculated above.

To calculate the final sequence of alternative regression models, the mean vector and covariance matrix for the merged training data subsets are obtained using the following equations. These equations can be used to merge any two pairs $\mu_m, S_m$ and $\mu_n, S_n$ of mean and covariance matrices that have been calculated from disjoint subsets of data of sizes m and n records, respectively:

$$\mu_{m+n} = \frac{m\mu_m + n\mu_n}{m+n},$$

$$S_{n+m} = S_n + S_m + \frac{n(n+m)}{m}(\mu_{m+n} - \mu_n)(\mu_{m+n} - \mu_n)^T.$$

Note that the above variable selection process can be readily modified to employ 2-fold cross validation. In this case, the variable selection process would be performed twice before constructing a final sequence of alternative regression models. The first time variable selection would be performed as described above. The second time, the roles of the T/T and T/E subsets of training data would be switched, so that variables are selected and regression models are constructed on the basis of the T/E subset of training data. The second time through, the selection process terminates after identifying $\tilde{L}' \le L$ variables when no further non-collinear variables can be found, where the number of non-collinear variables $\tilde{L}'$ can be different than the first time through. Negative log-likelihoods $\Lambda_{(i)}$ would then be calculated for each regression model i based on the T/T subset of training data. Finally, the optimum number of derived variables $\hat{L}$ would be determined by combining the negative log-likelihoods $\tilde{\Lambda}_{(i)}$ and $\Lambda_{(i)}$ from the two selection processes according to the equation $$\hat{L} = \underset{i}{\operatorname{argmin}}(\hat{\Lambda}_{(i)} + \Lambda_{(i)}), 0 \le i \le \min(L^l, \tilde{L}^l).$$

Note that the above calculation is not performed when training in Mode 9.

As previously discussed, three degree-of-fit-score interface functions 335 need to be implemented by each model object. The first should return a table of ModNum, DegFree, TrainFit, ValFit, ValPts, and ValVar values, such as that illustrated in Table 3. In the case of regression model objects, the ModNum values would identify the various regression models in the sequence of such models that was constructed. The DegFree values would be equal to one plus the number of derived variables that appear in the corresponding regression models. The TrainFit and ValFit scores would be the negative log-likelihoods calculated from the training and validation data records, respectively, in the following manner.

Let $\dot{\mu}$ and $\dot{S}$ be the mean vector and covariance matrix, respectively, for the training data as computed by merging the mean vectors and covariance matrices of the T/T and T/E subsets of the training data. Then the TrainFit score $\dot{\Lambda}_{(i)}$ for the i'th regression model is given by $$\dot{\Lambda}_{(i)} = \frac{M + \tilde{M}}{2}[\ln(2\pi\dot{\sigma}_{(i)}^2) + 1],$$

where $\dot{\sigma}_{(i)}^2$ is the residual variance of the i'th regression model calculated from $\dot{\mu}$ and $\dot{S}$. As previously discussed, M and $\tilde{M}$ are the numbers of data records in, respectively, the T/T and T/E subsets of training data.

Let $\check{\mu}$ and $\check{S}$ be the mean vector and covariance matrix, respectively, for the validation data, and let $\check{M}$ be the number of validation data records. In the case in which $\check{M}>0$, the ValFit score $\check{\Lambda}_{(i)}$ for the i'th regression model would be given by $$\check{\Lambda}_{(i)} = \frac{1}{2}\left[\check{M}\ln(2\pi\dot{\sigma}_{(i)}^2) + \frac{\check{\rho}_{(i)}^2}{\dot{\sigma}_{(i)}^2}\right],$$

where $\check{\rho}_{(i)}^2$ is given by $$\check{\rho}_{(i)}^2 = [-\dot{a}_{(i)}^T \quad 1]\left[\check{S} - \check{M}(\check{\mu} - \dot{\mu})(\check{\mu} - \dot{\mu})^T\right]\begin{bmatrix}-\dot{a}_{(i)} \\ 1\end{bmatrix},$$

and where $\dot{a}_{(i)}$ is the vector of coefficients of the i'th regression model calculated from $\hat{\mu}$ and $\hat{S}$. The value of ValPts would, of course, be $\check{M}$.

For the case in which $\check{M}=0$, ValFit would have to be calculated from TrainFit. One reasonable approach would be to add a penalty term to the TrainFit score that reflects the number of derived variables utilized in the corresponding regression model. For example, if the Bayesian Information Criterion were used (see, for example, G. Schwartz, "Estimating the dimension of a model," *Annals of Statistics*, Vol. 6, pp. 461-464, 1985), then ValFit would be given by $$\check{\Lambda}_{(i)} = \hat{\Lambda}_{(i)} + \frac{i+1}{2}\ln(M + \tilde{M}).$$

The value of ValVar would need to be calculated by means of a separate data scan for the case in which $\check{M}>0$. For the case in which $\check{M}=0$, ValVar would simply be zero. The separate data scan would be performed at block 265 of FIG. 26 and at block 295 of FIG. 29 when a regression model object is trained in Mode 7. As previously discussed, no updates to the mean and covariance matrices of a regression object would be made when training in Mode 7, only the ValVar values would be calculated for the regression models already constructed in the following manner.

Let $\dot{y}_{(i),j}$ be the prediction of the j'th validation data record that is made by the i'th regression model constructed for a model object. Let $\lambda_{(i),m}$ be the negative log-likelihood of the m'th validation data record calculated using the i'th regression model, let $\delta_{(i),m}$ be the average negative log-likelihood calculated for the i'th regression model based on the first m validation data records, and let $V_{(i),m}$ be the current estimate of ValVar for the i'th regression model based on the first m validation data records. Then $\lambda_{(i),m}$, $\delta_{(i),m}$, and $V_{(i),m}$ are given by $$\lambda_{(i),m} = \frac{1}{2}\left[\ln(2\pi\hat{\sigma}_{(i)}^2) + \frac{(y_m - \dot{y}_{(i),m})^2}{\hat{\sigma}_{(i)}^2}\right]$$

$$\delta_{(i),m} = \frac{1}{m}\sum_{j=1}^{m}\lambda_{(i),m}$$

$$V_{(i),m} = \sum_{j=1}^{m}(\delta_{(i),m} - \lambda_{(i),m})^2.$$

Each time the training scan-data-record interface function 333 of a regression model object is invoked in Training Mode 7, the values of $\delta_{(i),m}$ and $V_{(i),m}$ can be updated according to the equations $$\delta_{(i),m+1} = \frac{m\delta_{(i),m} + \lambda_{(i),m+1}}{m+1},$$

$$V_{(i),m+1} = V_{(i),m} + \frac{m+1}{m}(\delta_{(i),m+1} - \lambda_{(i),m+1})^2.$$

The value of ValVar is then $V_{(i),\check{M}}$.

A second degree-of-fit-score interface function 335 is needed that returns a TrainFit score which is used to guide the bottom-up and top-down segmentation processes. The appropriate TrainFit score in this case would be $\hat{\lambda}_{(\hat{L})}$, where $\hat{L}$ is the number of derived variables of the optimum model constructed based on training data alone.

A third degree-of-fit-score interface function 335 is also needed that returns a ValFit score which is used for trial pruning during top-down tree building. The appropriate ValFit score in this case would be $$\min_i \check{\Lambda}_{(i)};$$

that is, the minimum of the ValFit scores for all alternative regression models constructed by the regression model object.

The select-alt-model interface function 336 of a regression model object could be implemented either by eliminating all but the selected alternative regression model, or by storing the ModNum of the selected alternative model within the model object's data area.

The merge-with-model interface function 337 of a regression model object would be implemented by merging the object's mean and covariance matrices with those of the regression model object that is passed as an argument to the merge-with-model interface function 337. The merge operation would employ the same equations presented above for merging pairs of mean and covariance matrices. Note that the two regression objects would have to employ the same derived variables and data field to be predicted in order for the merge operation to succeed. If this is not the case, then the value of the flag returned by merge-with-model interface function 337 should indicate that the merge was not successful and, hence, a data scan is required to recompute the mean and covariance matrices for the merged model. If the two regression objects do employ the same derived variables and data field to be predicted, then a sequence of alternative regression models should be constructed as described above for the implementation of the data-scan-complete interface function 334.

Finally, the make-copy interface function 338 would be implemented so as to make a duplicate copy of a regression model object, subject to the requirements previously discussed that pertain to the make-copy interface functions 338 of all model objects.

A second illustrative embodiment of a modeling technique that employs the object interface shown in FIG. 33 is disclosed below for naive Bayes modeling (see, for example, P. Langley and S. Sage, "Induction of selective Bayesian classifiers," Proceedings of the Tenth Conference on Uncertainty in Artificial Intelligence, Morgan Kaufman Publishers, San Francisco, 1994). Given the values of a set of explanatory random variables $X_1, \ldots, X_L$, Bayesian modeling attempts to calculate the posterior probability of the data field to be predicted Y using estimates of the conditional probability of the explanatory random variables given the value of the data field to be predicted. By Bayes Rule, the posterior probability of Y given $X_1, \ldots, X_L$ is given by $$p(Y \mid X_1, \ldots, X_L) = \frac{p(X_1, \ldots, X_L \mid Y)p(Y)}{p(X_1, \ldots, X_L)}$$

$$= \frac{p(X_1, \ldots, X_L \mid Y)p(Y)}{\sum_y p(X_1, \ldots, X_L \mid Y=y)p(Y=y)}.$$

Although the above equations hold true in general, the calculation of the conditional probability $p(X_1, \ldots, X_L \mid Y)$ is problematic for large L because of the size of the probability tables that would be required. The naive Bayes approach attempts to simplify the calculation by assuming that the explanatory variables are mutually independent given the value of the data field to be predicted. With this assumption, the posterior probability distribution over Y simplifies to $$p(Y \mid X_1, \ldots, X_L) \approx \frac{p(X_1 \mid Y)p(X_2 \mid Y) \ldots p(X_L \mid Y)p(Y)}{p(X_1, \ldots, X_L)}$$

$$= \frac{p(Y)\prod_{i=1}^{L} p(X_i \mid Y)}{\sum_{y} p(Y = y)\prod_{i=1}^{L} p(X_i \mid Y = y)}.$$

The above naive Bayes equation is much more amenable to practical application because tables for conditional probabilities $p(X_i|Y)$ can be readily constructed based on training data. In particular, if $N_{i,x,y}$ is the number of training data records for which $X_i=x$ and $Y=y$, then $p(X_i=x|Y=y)$ can be estimated as $$p(X_i = x \mid Y = y) = \frac{N_{i,x,y} + \alpha_{i,x}}{\sum_{x}(N_{i,x,y} + \alpha_{i,x})},$$

and $p(Y=y)$ can be estimated as $$p(Y = y) = \frac{N_y + \alpha_y}{\sum_{y}(N_y + \alpha_y)},$$

where the α's are smoothing constants that stabilize the probability estimates (see, for example, J. Cussens, "Bayes and pseudo-Bayes estimates of conditional probability and their reliability," in P. B. Brazdil, editor, *Machine Learning: ECML-93*, pp. 136-152, Lecture Notes in Artificial Intelligence 667, Springer-Verlag, New York, 1993). For example, $\alpha_{i,x}=\alpha_y=1$ would correspond to Laplace smoothing. The above equations for estimating probabilities assume that the explanatory data fields and the data field to be predicted are all categorical fields. The values of numerical data fields would first have to be discretized into bins before the above estimation equations can be applied.

Because of its simplicity, naive Bayes modeling using all allowed explanatory input fields can be readily implemented using the object interface shown in FIG. 33. One pass over the training data would be needed to estimate the record counts needed for the probability estimates. A second pass over the data would then be needed to calculate TrainFit and ValFit scores. These scores would be the negative log-likelihoods of the values of the data field to be predicted as measured on the training and validation data sets, respectively. The negative log-likelihood scores would be calculated using the equation $$\Lambda = \sum_{k} \ln p(Y = y_k) + \sum_{k}\sum_{i} \ln p(X_i = x_{k,i} \mid Y = y_k) - \sum_{k} \ln\left(\sum_{y} p(X_i = x_{k,i} \mid Y = y_k)p(Y = y_k)\right),$$

where the sum over data records k would be taken over training data records for the TrainFit score and over validation data records for the ValFit score. The above equation simplifies to $$\Lambda = \sum_{y} K_y \ln p(Y = y) + \sum_{i,x,y} K_{i,x,y} \ln p(X_i = x \mid Y = y) - \sum_{k} \ln\left(\sum_{y} p(X_i = x_{k,i} \mid Y = y_k)p(Y = y_k)\right),$$

where $K_y$ is the number of records in the data set being considered for which $Y=y$, and $K_{i,x,y}$ is the number of records in that data set for which $X_i=x$ and $Y=y$. Thus, the first two terms in the above negative log-likelihood score can be calculated based on the record counts gathered during the first data scan. However, the third term cannot be calculated directly from these records count alone without a data scan because the third term does not decompose appropriately. Thus, at least two data scans are required.

Unfortunately, the statistical independence assumption that naive Bayes incorporates does not always hold in practice. Consequently, the estimated probabilities can be inaccurate. Fortunately, however, this inaccuracy can be minimized in practice by selecting a suitable subset of explanatory input fields to include in a naive Bayes model.

A forward stepwise variable selection process could be employed in which explanatory input fields are introduced one at a time with new explanatory field selected so as to minimize the negative log-likelihood score of the resulting model as measured on the training data. However, the number of data scan required by such an approach would be one plus the number of candidate explanatory data fields. This approach is therefore prohibitively expensive for the purpose of using naive Bayes in combination with the bottom-up and top-down segmentation processes disclosed above.

An alternative approach would be to select an ordering over the candidate explanatory input fields based on the conditional probabilities estimated during a first pass over the training data. With the ordering held fixed, the negative log-likelihoods of all forward stepwise combinations of explanatory input fields could then be calculated in a second pass over the data. The resulting two-pass approach could then be used in combination with the bottom-up and top-down segmentation processes disclosed above without incurring a huge penalty in terms of execution time.

Natarajan and Pednault (R. Natarajan and E. Pednault, "Using simulated pseudo data to speed up statistical predictive modeling," *Proceedings of the First SIAM International Conference on Data Mining*, SIAM, Philadelphia, 2001) present an approach for selecting such an ordering over explanatory input fields based on using a Monte Carlo estimate of the third term in the equation for the negative log-likelihood Λ presented above. This approach can likewise be employed for the purpose of the present invention. Alternatively, a deterministic approximation of third term can be employed by assuming that the values of the explanatory data fields are (approximately) unconditionally independent:

$$p(X_1, \ldots, X_L) \approx \prod_{i=1}^{L} p(X_i).$$

Using this approximation, the negative log-likelihood score with respect to a given data set can be approximated by $$\hat{\Lambda} = \sum_y K_y \ln p(Y=y) + \sum_{i,x,y} K_{i,x,y} \ln p(X_i = x \mid Y = y) - \sum_{i,x} K_{i,x} \ln p(X_i = x),$$

where $K_{i,x}$ is the number of records in the data set being considered for which $X_i = x$, and where $p(X_i = x)$ is estimated from the training data using the equation $$p(X_i = x) = \frac{N_{i,x} + \alpha_{i,x}}{\sum_x (N_{i,x} + \alpha_{i,x})},$$

where $N_{i,x}$ is the number of training records for which $X_i = x$.

Explanatory data fields can thus be selected after a single data scan using a forward stepwise process where at each step an explanatory field is selected that minimizes the resulting approximate negative log-likelihood $\hat{\Lambda}$. A second data scan can then be performed to calculate exact negative log-likelihoods $\Lambda$ for each subset of explanatory data fields selected by the stepwise process.

To implement a naive Bayes model object using the interface shown in FIG. 33, the set-data-scan-options interface functions 331 would define the candidate explanatory input data fields that can potentially enter into a naive Bayes model. The limits on the effective degrees of freedom would be ignored because the approach described above does not provide a way of increasing the effective degrees of freedom without introducing a new explanatory data field. In view of this fact, the set-data-scan-options interface function 331 for setting the training mode to Mode 5 should return a flag that indicates that this training mode is not supported.

The begin-data-scan interface function 332 of a naive Bayes model object should set up and initialize record count arrays for the various record counts that needed to estimate probabilities according to the equations presented above. The initialization should only be performed for Training Modes 1, 2, 4, 8, and 9. In the case of Modes 3, 6, and 7, the record count arrays that should already have been created during a previous training scan would be reused for subsequent calculations. In the case of Mode 5, an internal error flag should be set that will then cause the degree-of-fit interface functions 335 to return abnormally high values for all TrainFit and ValFit scores. The flag returned by the begin-data-scan interface function 332 of a naive Bayes model object should indicate that a data scan is needed, except when training in Mode 5. In the latter case, a data scan is not required.

In Training Mode 9, only one scan of the training data would be performed to re-estimate the probabilities for the explanatory data fields that were previously selected while training in another mode. The scan-data-record interface function 333 would increment the relevant entries of the record count arrays and the data-scan-complete interface function 334 would calculate the resulting probability estimates. The flag returned by the data-scan-complete interface function 334 would thus indicate that no further data scan are needed.

In Training Modes 1, 7, and 8, two data scan would be performed. During the first data scan, three sets of record count arrays would be updated: one set of arrays for Train/Train (T/T) data records, one set for Train/Evaluate (T/E) data records, and another for validation data records. The data records that belong to each subset of data are identified in the same manner as for regression model objects. When the data-scan-complete interface function 334 is invoked at the end of the first data scan, the record counts for the T/T and T/E subsets of training data are combined and an ordering is constructed for the candidate explanatory data fields using the stepwise process described above in which approximate negative log-likelihoods $\hat{\Lambda}$ are calculate from the combined training data, either by means of a Monte Carlo simulation or by assuming unconditional independence of the explanatory data fields. The value of the flag returned by the data-scan-complete interface function 334 should then indicate that an additional data scan is needed.

During the second data scan, the scan-data-record interface function 333 would calculate three exact negative log-likelihood scores for each naive Bayes models constructed from the subsets of explanatory data fields defined by the ordering. One exact negative log-likelihood score $\tilde{\Lambda}_{(i)}$ would be calculated from the T/E data for the i'th naive Bayes model using probabilities estimated from the counts obtained for the T/T data. Another exact negative log-likelihood score $\Lambda_{(i)}$ would be calculated from the T/T data for the i'th naive Bayes model using probabilities estimated from the T/E data. A third exact negative log-likelihood score $\dot{\Lambda}_{(i)}$ would be calculated from the validation data for the i'th naive Bayes model using probabilities estimated from the combined counts obtained for the T/T and T/E subsets of data. The TrainFit score of the i'th naive Bayes model is then given by $\dot{\Lambda}_{(i)} = \Lambda_{(i)} + \tilde{\Lambda}_{(i)}$. The corresponding ValFit score is $\dot{\Lambda}_{(i)}$.

In addition, in the case of Training Mode 7, the variance of the negative log-likelihood score for the validation data would be calculated in a manner analogous to that used for regression model objects. Let $p_{(i)}(y_m | \vec{X}_m)$ be the posterior probability calculated for the m'th validation data record using the i'th naive Bayes model constructing from the combined T/T and T/E training data. Let $\delta_{(i),m}$ be the average negative log-likelihood for this i'th naive Bayes model based on the first m validation data records, and let $V_{(i),m}$ be the current estimate of ValVar for the i'th naive Bayes model based on the first m validation data records. Then $\delta_{(i),m}$ and $V_{(i),m}$ are given by $$\delta_{(i),m} = \frac{1}{m} \sum_{j=1}^{m} \ln p_{(i)}(y_m | \vec{X}_m),$$

$$V_{(i),m} = \sum_{j=1}^{m} (\delta_{(i),m} - \ln p_{(i)}(y_m | \vec{X}_m))^2.$$

Each time the training scan-data-record interface function 333 of a naive Bayes object is invoked in Training Mode 7, the values of $\delta_{(i),m}$ and $V_{(i),m}$ can be updated according to the equations $$\delta_{(i),m+1} = \frac{m \delta_{(i),m} + \ln p_{(i)}(y_{m+1} | \vec{X}_{m+1})}{m+1},$$

$$V_{(i),m+1} = V_{(i),m} + \frac{m+1}{m}(\delta_{(i),m+1} - \ln p_{(i)}(y_{m+1} | \vec{X}_{m+1}))^2.$$

The value of ValVar is then $V_{(i),M}$, where M is the number of validation records (i.e., ValPts).

If no validation data is presented to a naive Bayes model object, then the ValFit score should be calculated from the TrainFit score using a BIC penalty term:

$$\check{\Lambda}_{(i)} = \Lambda_{(i)} + \tilde{\Lambda}_{(i)} + \frac{i}{2}\ln(M + \tilde{M}).$$

The ValVar value in this case is zero, as is the ValPts value.

When the data-scan-complete interface function is invoked at the end of the second data scan, a best alternative naive Bayes model based on the training data alone is identified by selecting the model i that minimizes the TrainFit score $\dot{\Lambda}_{(i)}$ calculated as described above. Note that these TrainFit scores are calculated via two-fold cross validation. In training Mode 8, the model i would be selected by minimizing the ValFIt score $\dot{\Lambda}_{(i)}$. The value of the data-scan-complete return flag should indicate that no further data scans are required.

In Training Mode 2, only one scan of the data is performed. Only two sets of record count arrays are initialized by the begin-data-scan interface function 332 and subsequently updated by the scan-data-record interface function 333 for the T/T and T/E subsets of training data records. The validation data records are ignored. When the data-scan-complete interface function 334 is invoked, a single naive Bayes model is constructed using the same explanatory variables that were incorporated into the best alternative naive Bayes model based on training data alone of the model object that was used as the reference when Training Mode 2 was invoked. An approximate, two-fold cross-validated negative log-likelihood score is calculated as the TrainFit score for the single naive Bayes model that is constructed, either by performing a Monte Carlo approximation or by assuming unconditional independence of the explanatory data fields. The value of the data-scan-complete return flag should indicate that no further data scans are required.

In Training Mode 3, a single scan of the data is also performed. In this case, an exact two-fold cross-validated negative log-likelihood score on the training data is calculated by the scan-data-record interface function 333 for the single naive Bayes model that was constructed when the model object was trained in Mode 2. This score is used as the TrainFit score. In addition, three sets of record count arrays are initialized by the begin-data-scan interface function 332 and then updated by the scan-data-record interface function 333 for T/T, T/E, and validation data records as described above in the case of Training Modes 1, 7, and 8. The calculations are performed by the scan-data-record 333 and data-scan-complete 334 interface functions in the manner described above. When the data-scan-complete interface function 334 is invoked, the record counts for the T/T and T/E subsets of training data are combined and an ordering is constructed for the candidate explanatory data fields as in the case of Training Modes 1, 7, and 8. The value of the data-scan-complete return flag should indicate that no further data scans are required.

In Training Mode 4, two data scans are performed. The first scan is analogous to Training Mode 2. Only two sets of record count arrays are initialized by the begin-data-scan interface function 332 and subsequently updated by the scan-data-record interface function 333 for the T/T and T/E subsets of training data records. The validation data records are ignored. When the data-scan-complete interface function 334 is invoked, a single naive Bayes model is constructed using the explanatory data field specified when Training Mode 4 was invoked, together with the explanatory fields that were incorporated into the best alternative naive Bayes model based on training data alone of the model object that was used as the reference when Training Mode 4 was invoked. The data-scan-complete interface function 334 then indicates that another data scan is required.

The second data scan is analogous to Training Mode 3. An exact two-fold cross-validated negative log-likelihood score on the training data is calculated for the single naive Bayes model that was constructed during the first data scan. This score is used as the TrainFit score. In addition, three sets of record count arrays are initialized and updated for T/T, T/E, and validation data records as described above in the case of Training Modes 1, 7, and 8. The calculations are performed by the scan-data-record 333 and data-scan-complete 334 interface functions in the manner described above. When the data-scan-complete interface function 334 is invoked, the record counts for the T/T and T/E subsets of training data are combined and an ordering is constructed for the candidate explanatory data fields as in the case of Training Modes 1, 7, and 8. The value of the data-scan-complete return flag should then indicate that no further data scans are required.

In Training Mode 6, only one data scan is performed. This data scan is analogous to the second data scan of Modes 1, 7, and 8. In this case, the scan-data-record interface function 333 would calculate three sets of exact negative log-likelihood scores for the naive Bayes models constructed from the subsets of explanatory data fields defined by the ordering. One set of exact negative log-likelihood scores would be calculated from the T/E data, another set from the T/T data, and a third set from the validation data in the same manner as described above in the case of Modes 1, 7, and 8. When the data-scan-complete interface function is invoked, a best alternative naive Bayes model based on the training data alone is identified by selecting the model i that minimizes the TrainFit score calculated as described above for Modes 1, 7, and 8. The value of the data-scan-complete return flag should indicate that no further data scans are required.

The degree-of-fit interface functions 334 of a naive Bayes model object should return the scores calculated as described above. In cases where validation data is not presented to or is ignored by a naive Bayes model object, the ValFit score would be calculated from the TrainFit score as described above in the case of Training Modes 1, 7, and 8.

The select-alt-model interface function 336 of a naive Bayes model object could be implemented either by eliminating all but the selected alternative model, or by storing the ModNum of the selected alternative model within the naive Bayes model object's data area.

The merge-with-model interface function 337 of a naive Bayes model object would be implemented by merging the record count arrays of the objects being merged. In the case of two model objects trained Mode 2 using the same reference naive Bayes model object, an approximate negative log-likelihood score would be calculated and used as the TrainFit score as described above for Training Mode 2. In addition, the value of the flag returned by merge-with-model interface function 337 would indicate that the merge was successful. For all other training modes, the return flag would indicate that a data scan would be required in order to obtain properly constructed models.

Finally, the make-copy interface function 338 would be implemented so as to make a duplicate copy of a naive Bayes model object, subject to the requirements previously discussed that pertain to the make-copy interface functions 338 of all model objects.

As previously discussed, it can be beneficial to employ generate-alternative-decomposition objects at block 262 of FIG. 26 and at block 321 of FIG. 32 to generate alternative decompositions of tree nodes prior to performing bottom-up merging. For example, in order to employ nearest-neighbor techniques to generate alternative decompositions based on randomly sampled sets of seed data records, training data must first be scanned to collect such random samples of seed records. Likewise, training data must be scanned in order to obtain pairs of data records when Hinton and Revow's method is used to define splits for decision trees (see G. E. Hinton and M. Revow, 1996, previously cited).

Figure 36:
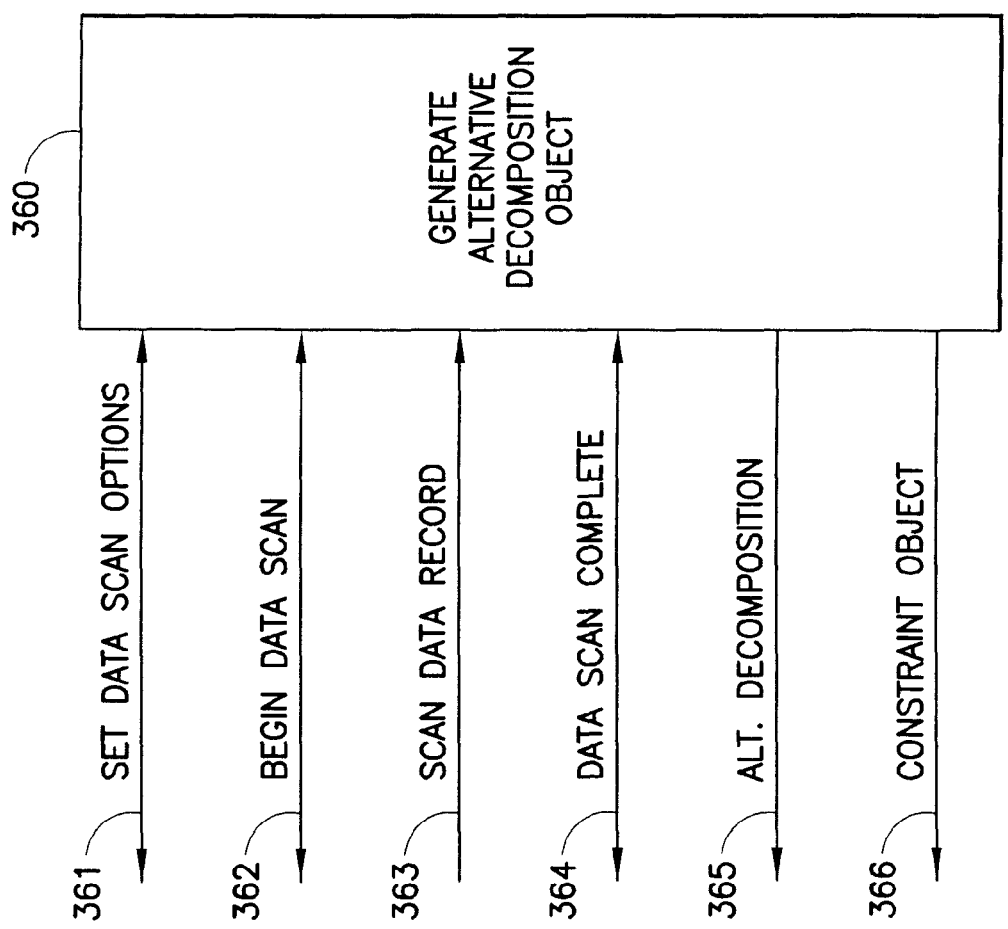
FIG. 36 illustrates an interface for generate-alternative-decomposition objects.

FIG. 36 illustrates an interface for generate-alternative-decomposition objects 360. The interface is comparable to that presented in FIG. 33 for model objects in that training data is supplied to generate alternative-decomposition objects using set-data-scan-options 361, begin-datascan 362, scan-data-record 363, and data-scan-complete 364 interface functions. In fact, data would be provided to generate-alternative decomposition objects using the same process as illustrated in FIG. 34, but with respect to a current generate-alternative-decomposition object in place of a current model object.

A first set-data-scan-options interface function 361 is needed to provide a generate-alternative-decomposition object with a model object to use as a reference model should model objects need to be trained in the process of generating alternative decompositions. For example, to implement Hinton and Revow's method of using pairs of data records to define alternative decompositions (see G. E. Hinton and M. Revow, 1996, previously cited), multiple pairs of data records would have to be considered, and pairs of segment model objects would have to be trained for the resulting pairs of data segments. The best pair of data records would then be selected by minimizing the sum of the degree of fit scores of the corresponding pair of model objects.

Thus, a generate-alternative-decomposition object that implements Hinton and Revow's method would be responsible for sampling pairs of input training records and then training the corresponding pairs of segment model objects. The model object that is passed as an input argument to the first set-data-scan-options interface function 361 would be used as a reference model object for creating and then training such segment model objects. Such segment model objects could be created by repeated invocation of the make-copy interface function 338 of the reference model object. In this case, the input flag to the make-copy function should indicate that pre-training-state copies should be made of the reference model object. The resulting copies would thus inherit the constraints imposed on the reference model object with regard to the explanatory input data fields and the effective degrees of freedom that can be utilized. These copies could then be trained on corresponding segment data to obtain trained segment model objects.

By contrast, a generate-alternative-decomposition object that produces multiway splits based on the value of a categorical data field X would not require training data to construct the alternative decomposition that corresponds to the split. Instead, the alternative decomposition can be constructed simply by creating one child node for each of the possible categorical values of X.

The interface shown in FIG. 36 accommodates both types of generate-alternative-decomposition objects, as well innumerably many others. As is the case with the interface for model objects shown in FIG. 33, the begin-data-scan interface function 362 of generate-alternative-decomposition objects returns a flag that indicates whether a data scan is needed.

As a rule, the generate-alternative-decomposition object that is used by a bottom-up modeling object to generate alternative decompositions must also obey the same modeling restrictions as the bottom-up modeling object itself. For example, in Hinton and Revow's segmentation method, pairs of data records define separating hyperplanes and it is these separating hyperplanes that define the corresponding data segments for pairs of data records. Because the equations for the separating hyperplanes become part of the definition of the resulting segmentation-based model, any restrictions on the explanatory input data fields that can be utilized by a bottom-up modeling object should likewise apply to the equations that define separating hyperplanes when Hinton and Revow's method is used to generate segmentations.

Additional set-data-scan-options interface functions 361 are therefore needed for generate-alternative-decomposition object to set limits on the allowed explanatory input data fields that can be used by a generate-alternative-decomposition object, as well as to set limits on the effective degrees of freedom that can be utilized.

The first set-data-scan-options interface function 361 as well as the above additional set-data-scan-options interface functions 361 would be invoked at block 262 of FIG. 26 and at block 321 of FIG. 32 in order to provide generate-alternative-decomposition objects with reference model objects and to set the above limits for generate-alternative-decomposition objects to be the same as the corresponding limits that have been imposed on bottom-up modeling objects that utilize those generate-alternative-decomposition objects. In the case of the process step at block 262, the reference model object would the model object associated with the reference node used for bottom-up tree building. In the case of the process step at block 321, the reference model object would the model object associated with the current leaf node that is being expanded during top-down tree building.

Once the data scan options for a generate-alternative-decomposition object have been set, the analogous process steps as that shown in FIG. 34 for supplying data to a model object is used at block 262 of FIG. 26 and at block 321 of FIG. 32 to supply data to a generate-alternative-decomposition object. Thus, the object's begin-data-scan interface function 362 is invoked (block 345) and the return flag of this interface function is examined (block 346) to determine whether a data scan is required. If not, the process for supplying data to the generate-generate-alternative-decomposition object terminates. Otherwise, the object's scan-data-record interface function 363 is invoked (block 347) in order to present the object with data. Once all data has been presented, the data-scan-complete interface function 364 of the generate-generate-alternative-decomposition object is invoked (block 348) and the return flag is examined (block 349) to determine whether the object needs another data scan. If so, the data is presented over again (block 347); otherwise, the process for supplying data to the generate-generate-alternative-decomposition object terminates.

After presenting data to a generate-generate-alternative-decomposition object at block 262 of FIG. 26 and at block 321 of FIG. 32, the alt-decomposition 365 and constraint-object 366 interface functions of the generate-alternative-decomposition object are invoked in order to obtain, respectively, an alternative decomposition of the tree node that is being expanded and a corresponding constraint object.

Figure 37:
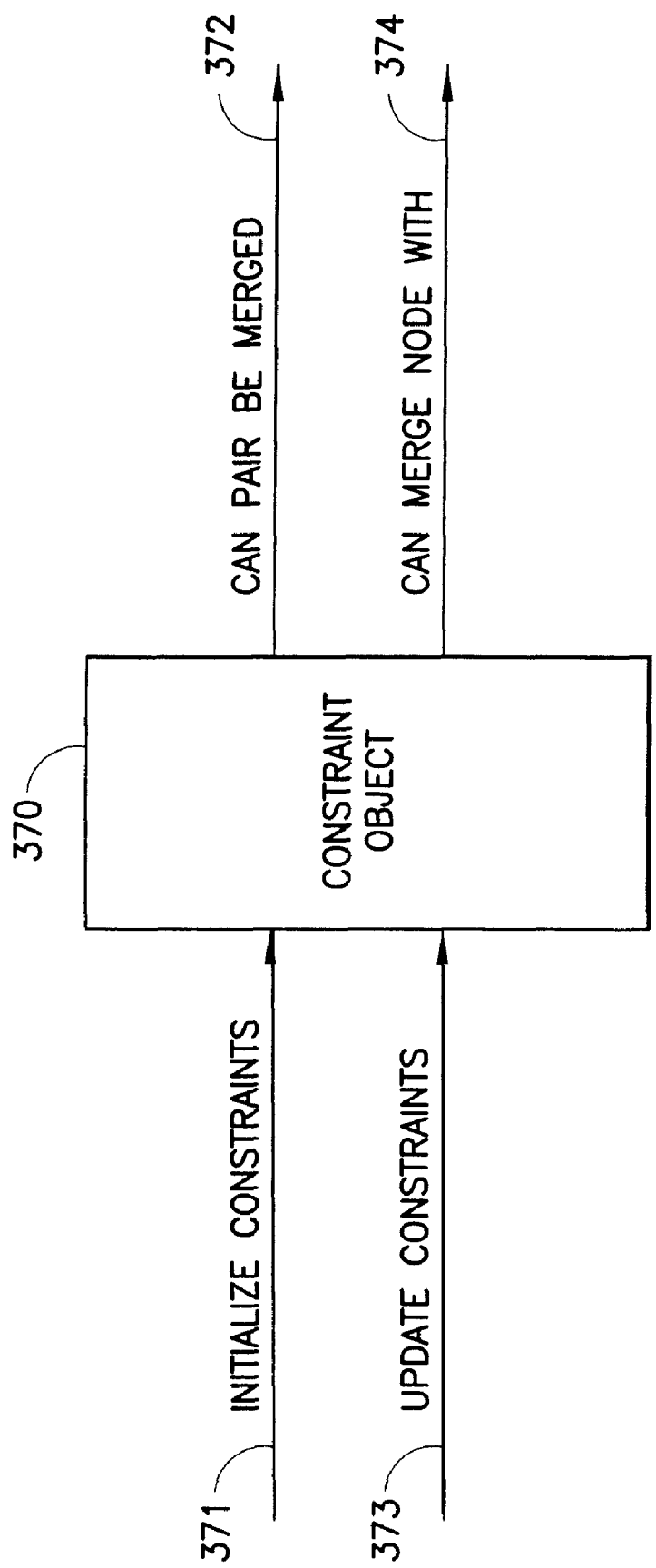
FIG. 37 illustrates an interface for constraint objects that can be used during bottom-up merging.

An interface for constraint objects 370 is illustrated in FIG. 37. As previously discussed, constraint objects require one or more initialize-constraints interface functions 371 to enable generate-alternative decomposition objects to initialize the internal states of constraint objects when they are created for an alternative decomposition. Given that different types of alternative decompositions can require different types of constraint objects, it is appropriate that the initialize-constraints interface functions 371 be specified at the derived-class level instead of the base-class level because the nature of the initializations might be different from one derived class of constraint objects to another. At the base-class level, a can-pair-be-merged interface function 372 is needed to test whether two nodes in the current frontier are allowed to be merged, and an update-constraints interface function 373 is needed to update the constraints defined by a object based on the pairs of nodes that are selected for merging and on the newly constructed nodes that then replace the selected pairs in the current frontier.

To efficiently loop over all pairs of nodes that can be merged as part of the process step at block 281 of FIG. 28, it is beneficial for constraint objects to have a base-level can-merge-node-with interface function 374 that, when given a node in the current frontier as input, returns a list of sister nodes in the current frontier that can be merged with the input node. Alternatively, the can-merge-node-with interface function 374 can return a suitable iterator object (analogous to iterator objects found in the C++ Standard Template Library) that can be used to sequentially access such sister nodes. To loop over all pairs of nodes that can be merged, an outer loop would be used to first loop over all nodes in the current frontier and an inner loop would then invoke the can-merge-node-with interface function 374 to loop over all sister nodes that can be merged with the node defined by the outer loop variable. To loop over all nodes that can be merged with the node that was most recently created via merging, a single loop would be used to loop over the nodes that are identified when the can-merge-node-with interface function 374 is invoked on the node defined by the loop variable used in the bottom-up merging process shown in FIG. 27 to keep track of the node that was most recently created via merging. Depending on the nature of the merging constraint defined by a constraint object, the above methods of looping can much more efficient than looping over all pairs of nodes and then using the can-pair-be-merged interface function 372 to identify those pairs than can be merged.

To avoid duplicate pairs of nodes from being considered, can-merge-node-with interface functions 374 must be non-commutative. Specifically, if a node A can be merged with a node B and node B appears in the list of nodes identified when can-merge-node-with (A) is invoked, then A should not appear in the list identified when can-merge-node-with (B) is invoked. In addition, when a can-merge-node-with interface function 374 is invoked on the node that was most recently created via merging (i.e., the node identified by the most recent invocation of the update-constraints interface function 374), the return value of the can-merge-node-with interface function 374 should identify all nodes in the current frontier that can be merged with this most-recently-created node.

The above properties can be achieved by having constraint objects assign distinct numeric sequence numbers to nodes in the current frontier, and by having can-merge-node-with interface functions 374 return only those nodes that can be merged with the specified input node that have sequence numbers that are strictly less than the sequence number of the input node. In addition, such constraint objects would need assign sequence numbers to newly created nodes that are strictly greater than any of the sequence numbers of the nodes in the current frontier. Note that this latter assignment would be performed when newly created nodes are passed as input to the update-constraint interface function 374 of a constraint object. The sequence numbers assigned by initialize-constraints interface functions 371 can be arbitrary, as long as each node in the current frontier is assigned a distinct number.

For technical reasons, constraint objects should be created and initialized by a generate-alternative-decomposition object as soon as the object has finished constructing an alternative decomposition. Accordingly, constraint objects would then be created and initialized by either the begin-data-scan 362 or data-scan-complete 364 interface functions of generate-alternative-decomposition objects. In addition, the alt-decomposition 365 and constraint-object 366 interface functions of generate-alternative-decomposition objects should return alternative decompositions and constraint objects, respectively, by reference (e.g., via pointers), and all references to these objects that are stored internally within generate-alternative-decomposition objects should be dropped as a result of invoking the respective alt-decomposition 365 and constraint-object 366 interface functions. The caller of the alt-decomposition 365 and constraint-object 366 interface functions would then be responsible for deallocating the memory assigned to the alternative decompositions and constraint objects, respectively, that are returned.

The technical reason for adopting the above policy is that it can be beneficial for a constraint object to store at least some constraint information as part of the node objects that belong to the current frontier.

For example, a highly useful class of constraint objects is one in which pairs of nodes that can be merged are represented using links between each such pair, and updates to these links are performed according to the laws of graph homomorphism when nodes are merged. According to these laws, if a node A can be merged with a node B, and these nodes are then merged to produce a node C, then the nodes that can be merged with node C are precisely those that could have been merged with either node A or node B prior to merging. Consequently, node C would then inherit the union of the links involving nodes A and B, except for the link between nodes A and B. The latter exclusion is required because nodes cannot be merged with themselves.

Figure 38:
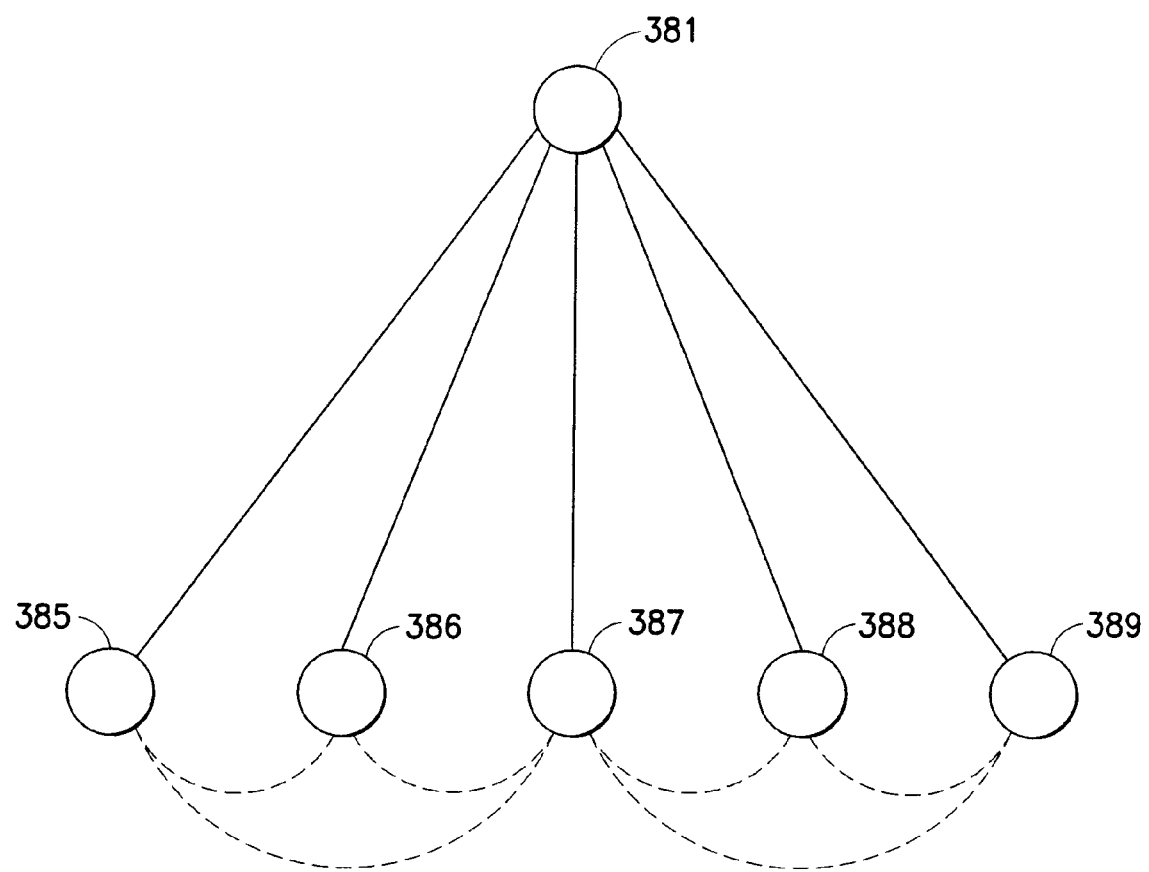
FIG. 38 provides an illustrative example of how to impose adjacency constraints on nodes during bottom-up merging.
Figure 39:
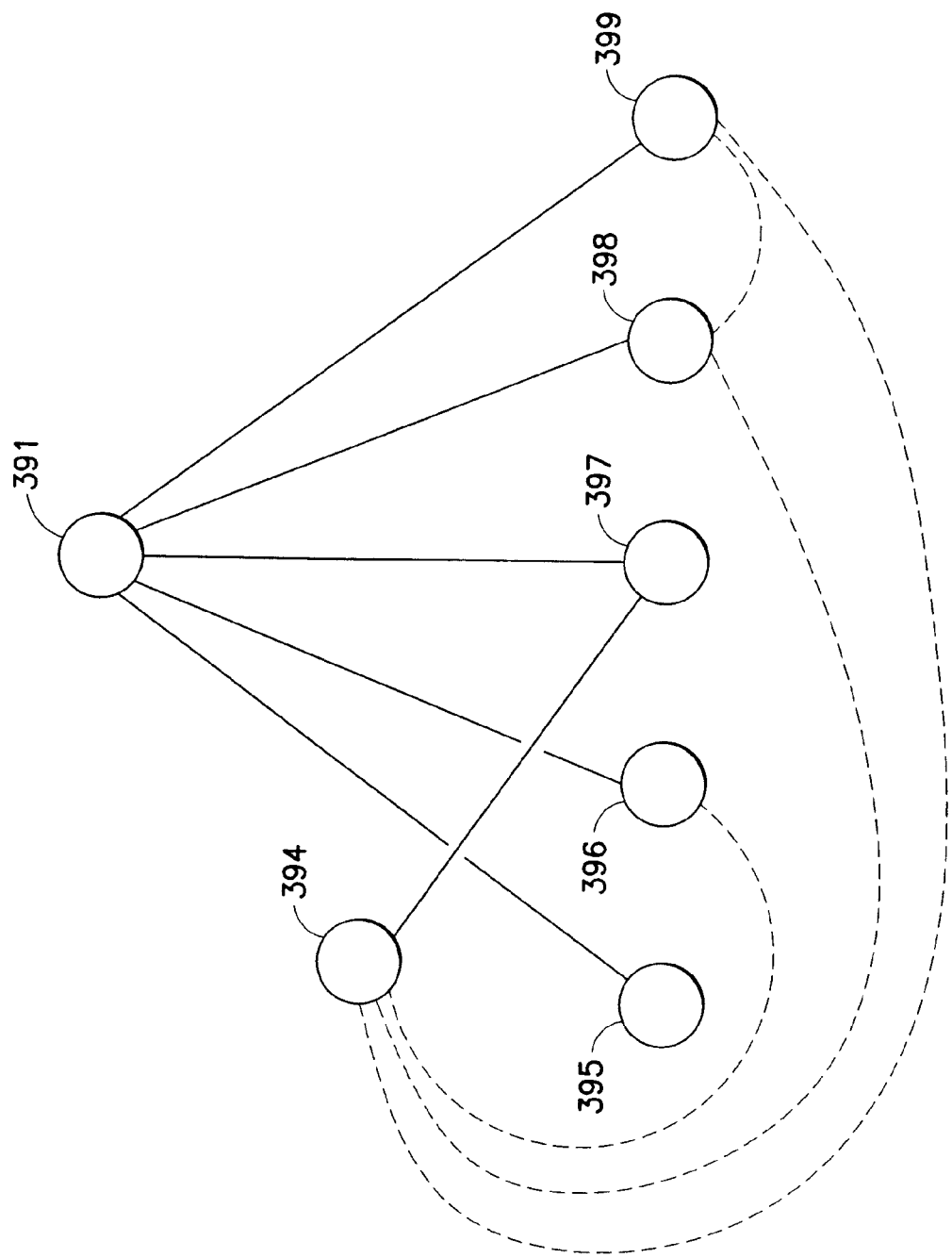
FIG. 39 provides an illustrative example of how adjacency constraints are updated when two nodes are merged.

An illustrative example of the merging operations that would be performed by this class of constraint objects is shown in FIGS. 38 and 39. FIG. 38 shows an alternative decomposition rooted at node 381 that comprises leaf nodes 385 through 389. FIG. 38 also shows dashed lines that represent links between pairs of leaf nodes that specify which leaf nodes can be merged with which other leaf nodes. Thus, node 385 can be merged with nodes 386 and 387; node 387 can be merged with nodes 385, 386, 388, and 389; and so forth.

FIG. 39 shows the link structure that results when nodes 385 and 387 are merged. In FIG. 39, nodes 395 through 399 correspond, respectively, to nodes 385 through 389. Node 394 represents the newly created node obtained by merging nodes 385 and 387. As illustrated in FIG. 39, all nodes that could have been merged with either node 385 or 387 in FIG. 38 can now be merged with the newly created node 394 in FIG. 39, and all pairs of nodes in FIG. 38 not involving nodes 385 or 387 can still be merged in FIG. 39. Node 394, however, cannot be merged with itself. Note also that all links involving nodes 385 and 387 in FIG. 38 have been removed in FIG. 39 because nodes 385 and 387 are removed from the current frontier as a result of merging.

The information needed by such a constraint object can be distributed between the constraint object itself and the nodes that comprise the current frontier. Within the node objects, lists of pointers to other nodes could be maintained that specify which nodes can be merged with which other nodes. The sequence numbers of the nodes could likewise be stored within the node objects. The only information that would then need to be stored within such a constraint object is the maximum sequence number that has thus far been assigned to a node. This maximum number would be used to assign a distinct sequence number to each new node as the constraints are initialized and updated.

To implement such a derived class of constraint objects, initialize-constraints interface functions 371 would be provided to initialize the above information for a given alternative decomposition. The update-constraints interface function 373 of the derived class would update the above information as previously described, and the can-pair-be-merged 372 and can-merge-node-with 374 interface functions would query the above information. Specifically, the can-pair-be-merged interface function 372 would test whether a link exists between the pair of input nodes (which would be passed by reference), and the can-merge-node-with interface function 374 would return a (possibly empty) list of pointers to the sister nodes that can be merged with the input node (which would also be passed by reference) and that have sequence numbers that are strictly less than the sequence number of the input node. Alternatively, the can-merge-node-with interface function 374 could return an iterator object that would provide sequential access to these sister nodes.

Because of the way the above information is distributed between constraint objects and node objects, the interface functions 371 through 374 of such constraint objects can perform their processing in a highly efficient and straightforward manner.

It should be discerned that, in order for arbitrary constraint object to store arbitrary information within node objects, node objects need only provide enough storage to hold a pointer to a constraint information object. Suitable constraint-information objects can then be created by constraint objects and associated with node objects.

Note, however, that storing constraint information within node objects thereby establishes a linkage between constraint objects and corresponding alternative decompositions. This linkage is preserved if alternative decompositions and constraint objects are returned by reference when the alt-decomposition 365 and constraint-object 366 interface functions of generate-alternative-decomposition objects are invoked. To simplify memory management issues, it can therefore be beneficial to require the caller of alt-decomposition 365 and constraint-object 366 interface functions to be responsible for deallocating the memory assigned to the alternative decompositions and constraint objects, respectively, that are returned by these interface functions.

It should also be discerned that the above class of constraint objects is highly advantageous in that it can be used to impose many of the constraints that have been discussed above in connection with bottom-up merging.

For example, if the leaf nodes of an alternative decomposition represent geographical regions and we wish to enforce the constraint that only adjacent geographical regions can be merged, then the above class of constraint objects can be employed to enforce this constraint by using initialize-constraints interface functions 371 to add links only between pairs of leaf nodes that present adjacent geographical regions. Subsequent merging operations will then obey the adjacency constraint. Note that this same approach can likewise be applied to regions in an image for image-segmentation purposes.

Similarly, if the leaf nodes of an alternative decomposition represent the possible values of an ordinal data field (i.e., a categorical data field with values that can be ordered from high to low, such as tall, medium, short), and if the presence of a link indicates that two categorical values are adjacent in the value ordering, then the use of the above class of constraint objects will implement the constraint that only adjacent intervals of categorical values can be merged. This approach for ordinal data values can likewise be used for categorical data fields whose values are circularly ordered (i.e., the values can be placed in a repeating sequence, such as Sunday, Monday, Tuesday, Wednesday, Thursday, Friday, Saturday). For circularly-ordered categorical values, the link structure between nodes would form a ring.

If the leaf nodes of an alternative decomposition represent intervals of possible values of a numeric data field, and if the presence of a link indicates that two intervals are adjacent, then use of the above class of constraint objects will implement the constraint that only adjacent numeric intervals can be merged. This approach for numeric intervals can likewise be used for numerical intervals that are circularly ordered (i.e., the intervals can be placed in a repeating sequence, such as 0000 hours to 0800 hours, 0800 hours to 1600 hours, 1600 hours to 0000 hours).

Figure 40:
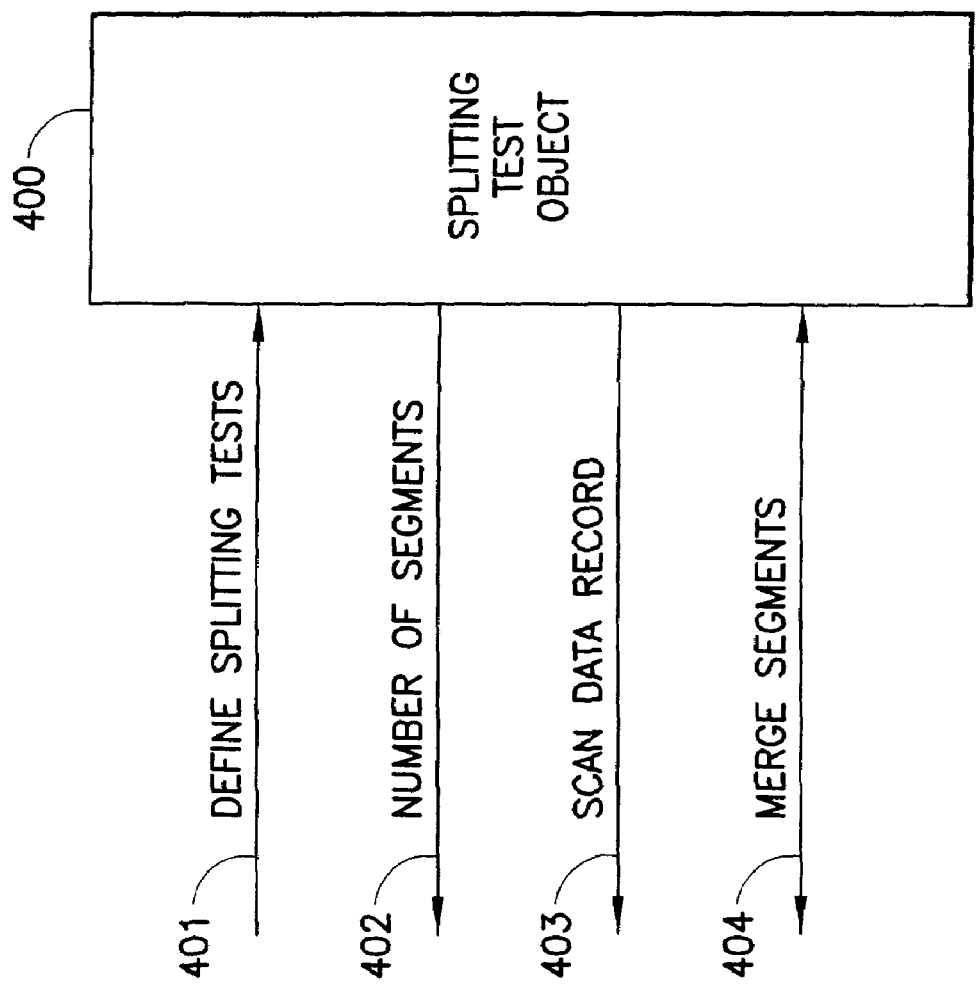
FIG. 40 illustrates an interface for splitting test objects that can be used to define splitting tests within a generalized tree.

To fully exploit the advantages offered by generate-alternative-decomposition objects and constraint objects, the splitting tests that define segmentations can also be implemented in an object-oriented fashion. FIG. 40 illustrates an interface for splitting-test objects that enables arbitrary segmentations to be defined while at the same time supporting the requirements of the bottom-up and top-down segmentation processes presented above. All splitting-test objects 400 would provide one or more define-splitting-tests interface functions 401 that would be used by generate-alternative-decomposition objects to define segmentations. As with the initialize-constraints interface functions 371 of constraint objects, it is appropriate that the define-splitting-tests interface functions 401 be specified at the derived-class level instead of the base-class level because different types of splitting tests would generally require different types of information to be specified in order to define the tests. For example, when splitting on a categorical data field, the splitting test would involve equality tests between the values of the categorical field and the sets of such values that define each branch of a split. By contrast, Hinton and Revow's method of using pairs of data records to define separating hyperplanes would involve calculating dot products and comparing the results to corresponding thresholds (see G. E. Hinton and M. Revow, 1996, previously cited).

In order to apply splitting tests, all splitting-test objects would provide a number-of-segments interface function 402 and a scan-data-record interface function 403 at the base-class level for determining, respectively, the number of segments that appear in the segmentation defined by a splitting-test object, and the identification number of the segment to which a given input data record belongs. These interface functions provide a general method that can be used throughout the bottom-up and top-down segmentation processes presented above to apply splitting tests and use their results without requiring specific information about the exact nature of the splitting tests. The interface functions permit literally any splitting test to potentially be defined by a splitting-test object.

A merge-segments interface function 404 would also be defined at the base-class level in order to support the process step at block 324 of FIG. 32. As previously discussed, the process shown in FIG. 32 generates binary splits for a current leaf node during top-down tree building by first generating a multiway split at block 321, performing a bottom-up merge at block 323, and then using the top two nodes produced via bottom-up merging as the new child nodes for the current leaf node. Splitting tests must therefore be added to the current leaf node in order to define the data segments that are represented by these new child nodes. Note that each child node represents the union of one or more data segments defined by the multiway split, and that the multiway split itself would be implemented as splitting-test object. Thus, what is needed is a way to create a new splitting-test object that defines the segmentation obtained by taking the appropriate unions of the segments defined by the multiway split. The merge-segments interface function 404 performs precisely this operation. The input to the merge-segments interface function 404 would be an array or other suitable data structure that specifies a mapping from the segment identification numbers defined by a given splitting-test object to the segment identification number of the desired splitting-test object. The output of the merge-segments interface function 404 would then be the desired splitting-test object.

The merge-segments interface function 404 could be implemented by storing the mapping array internally as part of the new splitting-test object and then using the mapping array when calculating segment identification numbers when the scan-data-record interface function 403 of the new splitting-test object is invoked, as well as when calculating the number of segments defined by the splitting test when the number-of-segments interface function 402 of the new splitting-test object is invoked.

The above approach for implementing merge-segments interface functions 404 would be appropriate, for example, if the splits are internally defined via nearest-neighbor distances to a collection of seed data records. However, for other types of splitting tests, such as splits on categorical data fields, the tests that would be required by the new splitting test object might be definable in terms of the define-splitting-tests interface functions 401 provided by that class of splitting-test objects. In this latter case, it would likely be more efficient to define the required tests directly.

Having thus described our invention, what we claim as new and desire to secure by Letters Patent is as follows:

1. A method for a process performed on a computer for training multivariate segment model objects, the method comprising:
   1) accessing a collection of training data records comprising examples of input values that are available to a multivariate segment model object, together with corresponding desired output value(s) that a multivariate segment model is intended to predict;
   2) presenting, as executed by a processor on a computer, the training data records to the multivariate segment model object by calling one or more scan-data-record interface functions, wherein the multivariate segment model object responds by generating and pruning pluralities of data segments and associated segment models, at least one of which comprises a training-data-based multivariate segment model for the multivariant segment model; and
   3) repeating said accessing and said presenting until the multivariate segment model object indicates that it does not need to have the training records presented over again, as determined by calculating whether a predictive accuracy of the data segments and associated segment models is optimal, based on an evaluation using validation data records different from said training data records.

2. A non-transitory, signal-bearing storage medium tangibly embodying a program of machine-readable instructions executable by a digital processing apparatus to perform the method of claim 1.

3. A digital processing apparatus configured with a program of machine-readable instructions to perform the method of claim 1.

4. The method of claim 1, wherein said generating said plurality of data segments comprises at least one of:
   a top-down decision-tree-like segmentation;
   a bottom-up agglomerative-clustering-like segmentation;
   a hybrid of said top-down decision-tree-like segmentation and said bottom-up agglomerative-clustering-like segmentation; and
   a nearest-neighbor approach wherein a new data segment is defined based on a shortest distance between sets of seed records.

5. The method of claim 4, wherein said generating said plurality of data segments comprises at least one constraint placed on how said data segments are generated.

6. The method of claim 1, wherein an object-oriented embodiment is used for a module executing at least one of:
   said generating said data segments;
   said generating said segment model; and
   said pruning.

7. The method of claim 1, wherein said generating of the plurality of associated segments models comprises:
   varying degrees of freedom of a segment model.

8. The method of claim 7, wherein optimum degrees of freedom are determined using said training data records alone and holdout validation data is used for making a globally optimal choice among alternative segmentations and segment models.

9. The method of claim 1, wherein said pruning so as to optimize the predictive accuracy of a resulting segmentation-based predictive model comprises:
   simultaneously considering both a number of generated data segments and degrees of freedom of the generated segment models.

10. The method of claim 1, wherein said pruning comprises:
    selecting a subset of tree nodes and alternative models for each selected node so as to minimize a sum of degrees of fit.

11. The method of claim 10, wherein said degrees of fit comprise statistical confidence intervals for true expected values of said degrees of fit and said selecting further comprises consideration of upper confidence bounds for said true expected values.

12. The method of claim 10, wherein said selecting of alternative segment models is based upon only said training data, said selecting of alternative segment models comprising one of:
    a cross validation of said training data; and
    Bayesian scores as a measure of degree of fit.

13. The method of claim 1, wherein said one or more scan-data-record interface functions comprise one or more of:
    an interface function for setting data scan options that determine how a model object is to be trained;
    an interface function for informing a model object that a data scan is about to begin and for obtaining from the model object an indication of whether a data scan is needed by the model object;
    an interface function for presenting data records to the model object; and
    an interface function for informing the model object that a data scan is complete and for obtaining from the model object an indication of whether another data scan is needed by the model object.

14. An apparatus, comprising:
    at least one processor; and
    a memory interface to a database containing a collection of training data records comprising examples of input values that are available to a multivariate segment model object, together with corresponding desired output value(s) that a multivariate segment model is intended to predict, along with validation data records different from said training data records, wherein said at least one processor executes a method for training multivariate segment model objects, the method comprising:

1) accessing the collection of training data records;
2) presenting the training data records to the multivariate segment model object by calling one or more scan-data-record interface functions, wherein the multivariate segment model object responds by generating and pruning pluralities of data segments and associated segment models, at least one of which comprises a training-data-based multivariate segment model for the multivariate segment model; and
3) repeating said accessing and said presenting until the multivariate segment model object indicates that it does not need to have the training records presented over again, as determined by calculating whether a predictive accuracy of the data segments and associated segment models is optimal, based on an evaluation using validation data records different from said training data records.

15. The apparatus of claim 14, wherein said one or more scan-data-record interface functions comprise one or more of:

an interface function for setting data scan options that determine how a model object is to be trained;

an interface function for informing a model object that a data scan is about to begin and for obtaining from the model object an indication of whether a data scan is needed by the model object;

an interface function for presenting data records to the model object; and an interface function for informing the model object that a data scan is complete and for obtaining from the model object an indication of whether another data scan is needed by the model object.

* * * * *